(12) United States Patent
Nomura

(10) Patent No.: US 12,309,332 B2
(45) Date of Patent: May 20, 2025

(54) IMAGE INSPECTION SYSTEM FOR PRINT SETTING CORRECTION

(71) Applicant: Konica Minolta, Inc., Tokyo (JP)

(72) Inventor: Shoichi Nomura, Machida (JP)

(73) Assignee: Konica Minolta, Inc., Tokyo (JP)

( * ) Notice: Subject to any disclaimer, the term of this patent is extended or adjusted under 35 U.S.C. 154(b) by 0 days.

(21) Appl. No.: 18/381,370

(22) Filed: Oct. 18, 2023

(65) Prior Publication Data

US 2024/0146854 A1 May 2, 2024

(30) Foreign Application Priority Data

Oct. 27, 2022 (JP) .................... 2022-172207

(51) Int. Cl.
*G06T 7/00* (2017.01)
*H04N 1/00* (2006.01)
*H04N 1/60* (2006.01)

(52) U.S. Cl.
CPC ....... *H04N 1/00806* (2013.01); *G06T 7/0004* (2013.01); *H04N 1/00824* (2013.01); *H04N 1/6027* (2013.01); *G06T 2207/30168* (2013.01)

(58) Field of Classification Search
CPC ........... H04N 1/00806; H04N 1/00045; H04N 1/6027; H04N 1/00724; H04N 2201/0005; H04N 2201/325; G06T 7/0004

USPC ......... 358/1.9, 3.23, 3.24, 504, 1.18; 399/72
See application file for complete search history.

(56) References Cited

U.S. PATENT DOCUMENTS

| | | | |
|---|---|---|---|
| 2007/0133026 A1* | 6/2007 | Kumada | H04N 1/6033 |
| | | | 358/1.9 |
| 2013/0162702 A1* | 6/2013 | Tombs | B41M 5/0047 |
| | | | 347/1 |
| 2016/0303878 A1* | 10/2016 | Andrea Tallada | B41J 29/393 |
| 2017/0227904 A1* | 8/2017 | Matsuoka | H04N 1/54 |

FOREIGN PATENT DOCUMENTS

JP    2009029017 A   *   2/2009
JP    2011-73306 A       4/2011

* cited by examiner

*Primary Examiner* — Jamares Q Washington
(74) *Attorney, Agent, or Firm* — RANKIN, HILL & CLARK LLP

(57) ABSTRACT

An image inspection system includes: a hardware processor that controls image formation by an image former based on a read image generated by reading, by a reader, a medium on which a patch is formed, wherein the hardware processor causes the image former to form, on the medium, a patch corresponding to an image formed on a medium by the image former.

17 Claims, 41 Drawing Sheets

FIG. 23
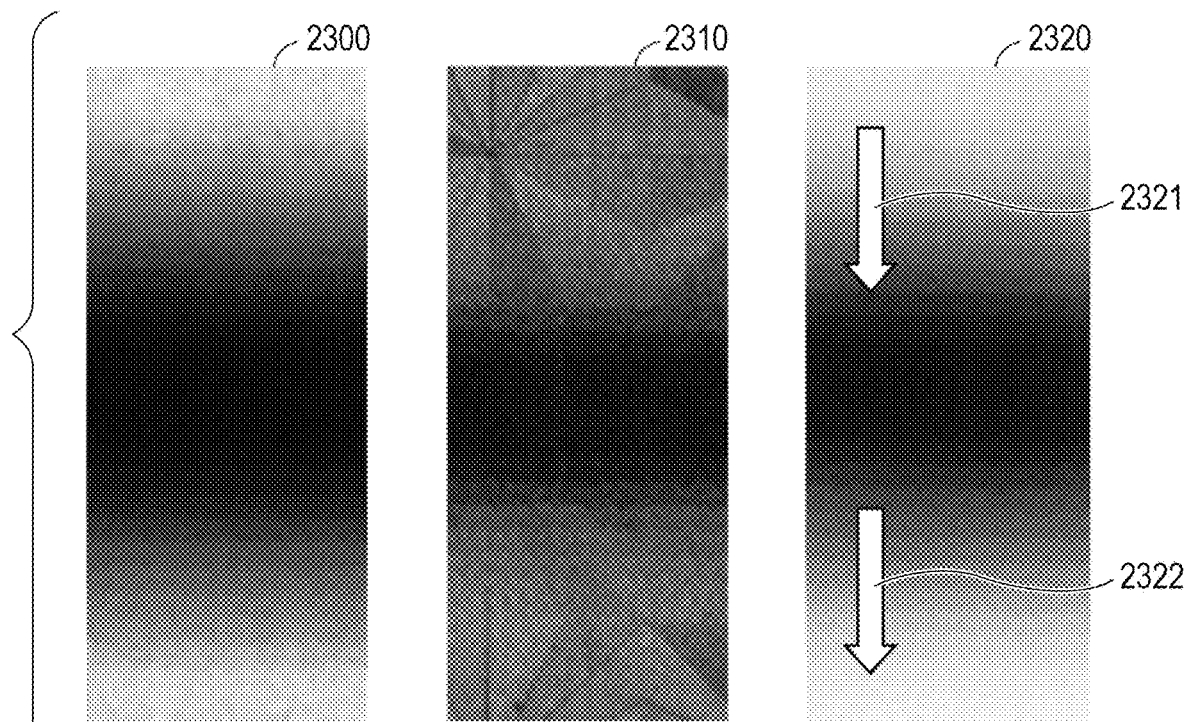
WHITE PATCH IMAGE EXAMPLE ON VARIOUS BACKGROUNDS
| RENDERING ON TRANSPARENT FILM BLACK BACKGROUND | RENDERING ON TRANSPARENT FILM YELLOW RELEASE PAPER | RENDERING ON TRANSPARENT FILM WHITE RELEASE PAPER |
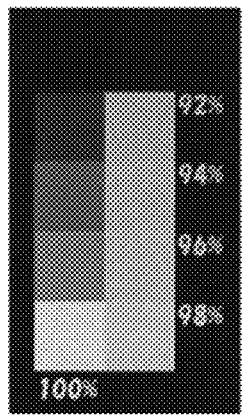 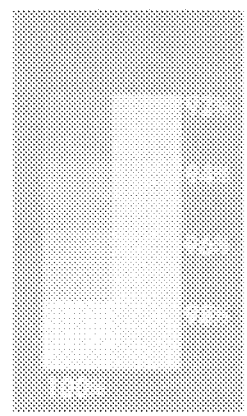 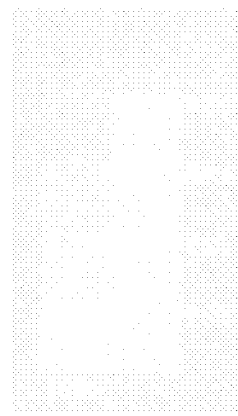

FIG. 28
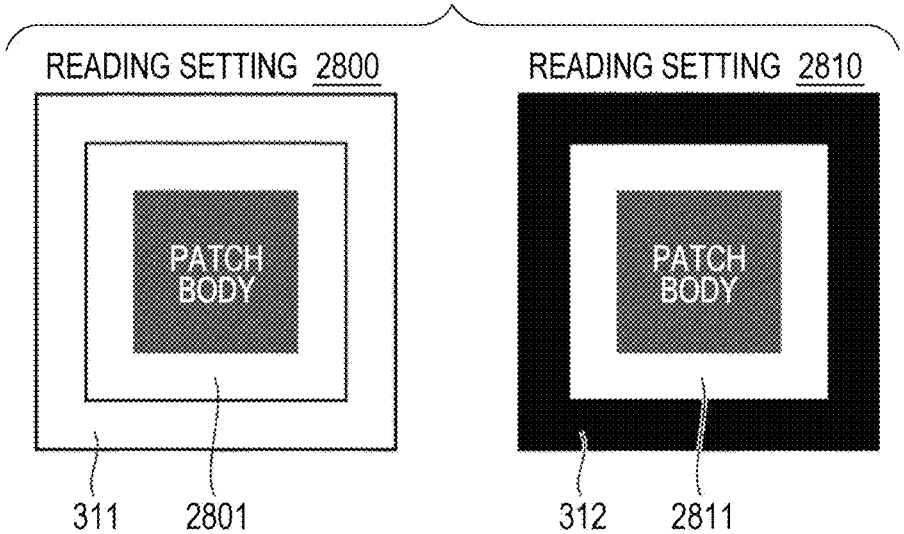
FIG. 29
WHITE PATCH ON TRANSPARENT FILM
AND BLUE RELEASE PAPER
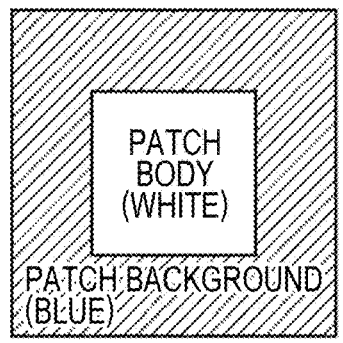
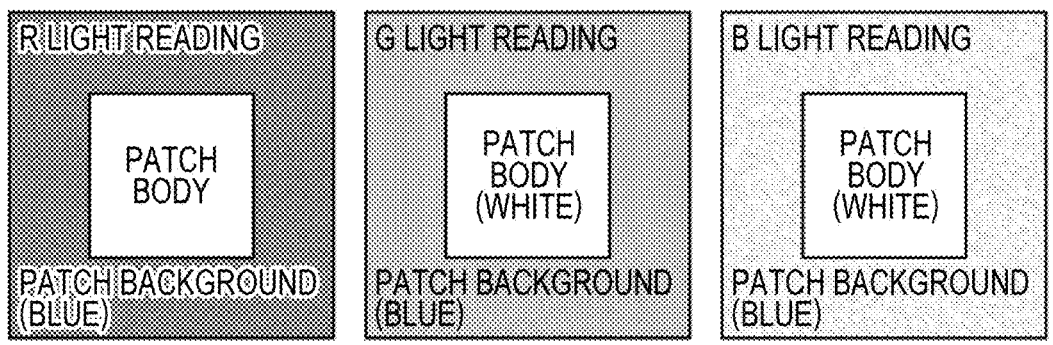
SELECT R LIGHT WITH MAXIMUM CONTRAST (S/N RATIO)
BETWEEN PATCH AND BACKGROUND (MEDIUM)

FIG. 30
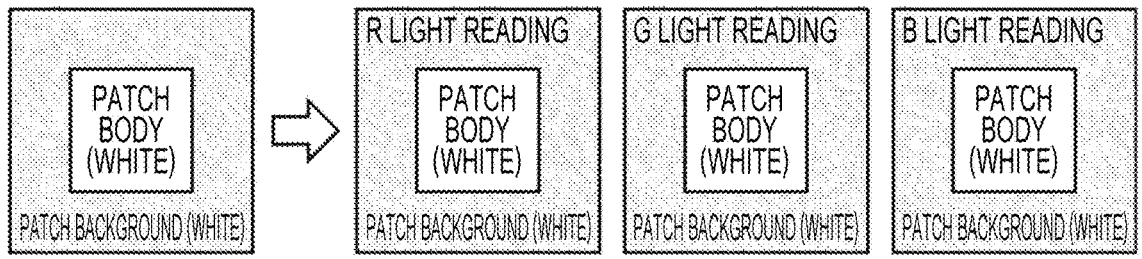
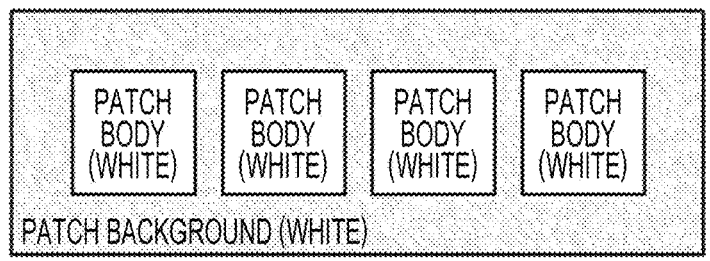
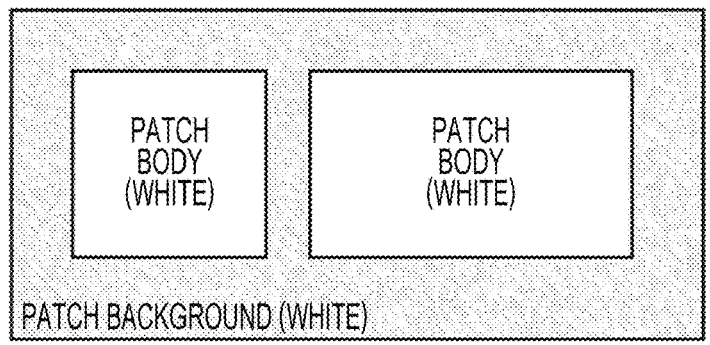
FIG. 31
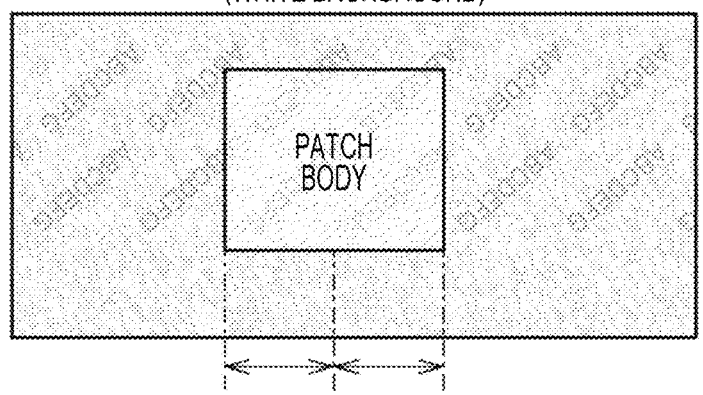

FIG. 33
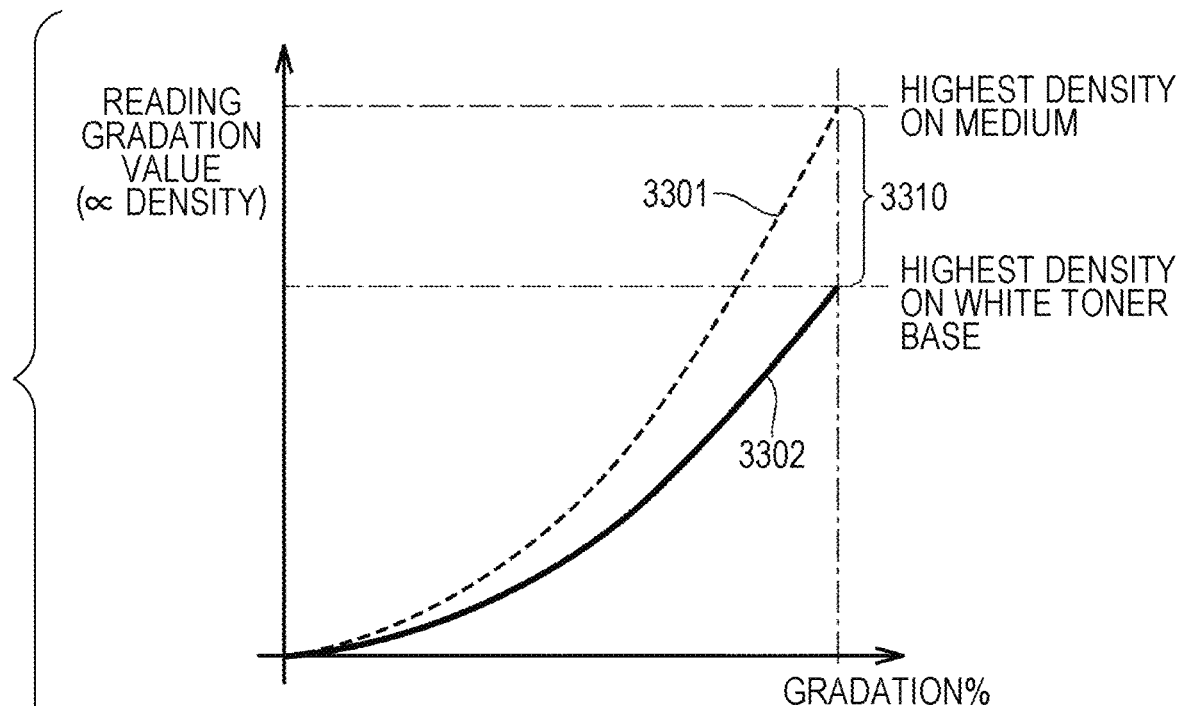
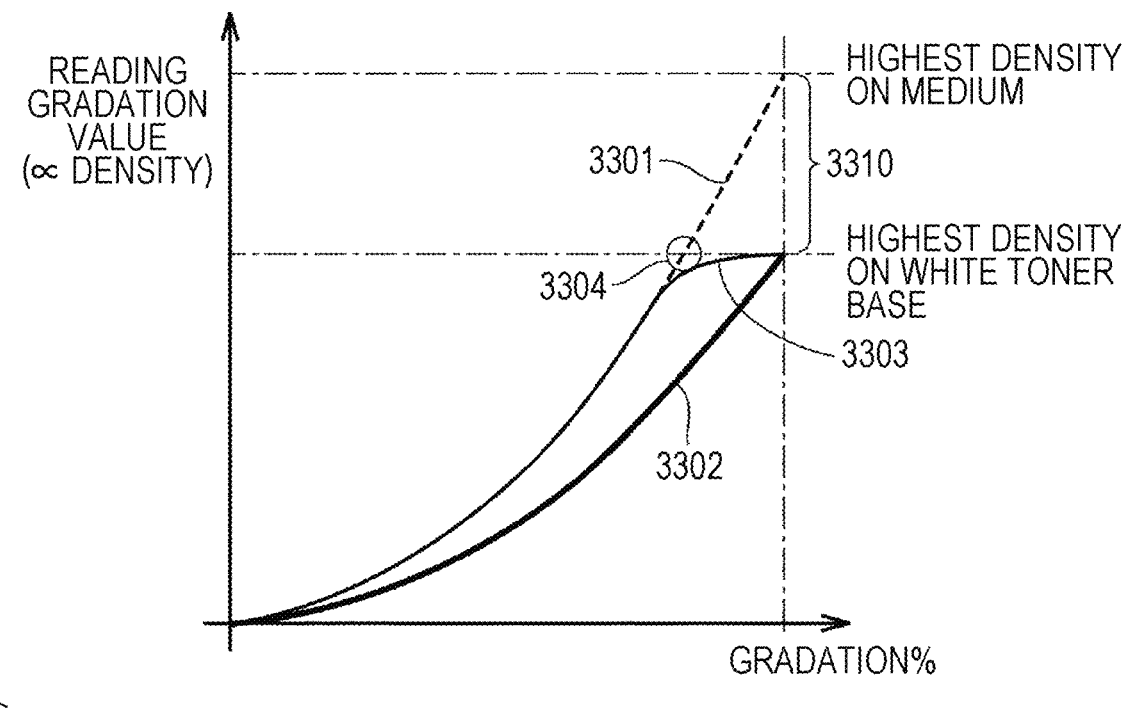

CHANGE COLOR TO BE INCLUDED
IN PATCH BASED ON
COMPONENT COLOR AND
TARGET OF MIXED COLOR

| COMBINATION NUMBER | COLOR OF BACKGROUND PLATE | PRESENCE OR ABSENCE OF WHITE BASE | CHART DESIGN (PRESENCE OR ABSENCE OF PATCH ENLARGEMENT) | SELECTION FREQUENCY |
|---|---|---|---|---|
| 1 | BLACK | PRESENT | PRESENT | 0 |
| 2 | BLACK | PRESENT | ABSENT | 0 |
| 3 | BLACK | ABSENT | PRESENT | 0 |
| 4 | BLACK | ABSENT | ABSENT | 0 |
| 5 | WHITE | PRESENT | PRESENT | 128 |
| 6 | WHITE | PRESENT | ABSENT | 0 |
| 7 | WHITE | ABSENT | PRESENT | 25 |
| 8 | WHITE | ABSENT | ABSENT | 0 |

4201 4202 4203 4204 4205

FIG. 43
EXAMPLE OF CROSSMARK
(FIRST CROSSMARK)
ON TRANSPARENT FILM
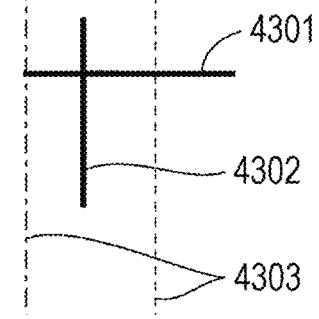
EXAMPLE OF CROSSMARK
(SECOND CROSSMARK)
ON WHITE BASE
ON TRANSPARENT FILM
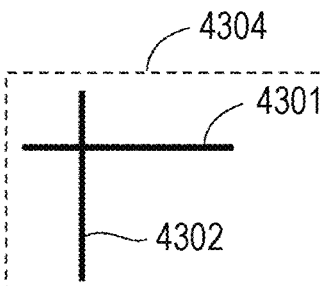
EXAMPLE OF CROSSMARK
(THIRD CROSSMARK)
WITH DESIGN CHANGED
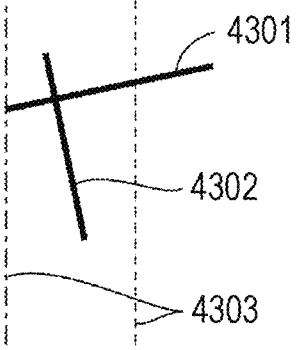

IMAGE INSPECTION SYSTEM FOR PRINT SETTING CORRECTION

The entire disclosure of Japanese patent Application No. 2022-172207, filed on Oct. 27, 2022, is incorporated herein by reference in its entirety.

BACKGROUND

Technological Field

The present disclosure relates to an image inspection system, and more specifically, to a patch reading technique.

Description of the Related Art

In the field of image forming devices, there is known a technique of printing a patch on a medium and reading the patch to perform various corrections to print settings in order to maintain print quality on the medium.

An image forming device such as a label printer using a roll-shaped medium prints an image on various media such as a colored separator (release paper or the like), a transparent film, a metal vapor deposited film of gold and silver, and hologram paper in addition to normal white paper. Thus, the image forming device may read patches printed on a wide variety of media or combination media (such as films and covering materials).

However, depending on the type of medium or combination of media, the image forming device may not be able to accurately read the patch printed on the medium. Therefore, there is a need for a technique for accurately reading patches printed on a wide variety of media or combination media.

Regarding a patch reading technique, for example, JP 2011-073306 A discloses a method for acquiring an error in the adhesion amount of ink to be adhered on a transparent print medium. The error acquisition method includes "forming a white patch, a black patch, and a chromatic color patch on a transparent print medium by attaching each of a white ink, a black ink, and a chromatic color ink independently on the transparent print medium by a standard printing device and a target printing device, measuring colors of the black patch and the chromatic color patch in a state where the transparent print medium is installed on a white background, measuring colors of the white patch in a state where the transparent print medium is installed on a black background, and acquiring errors between colorimetric values of the white ink, the black ink, and the chromatic color ink formed by the standard printing device and colorimetric values of the white ink, the black ink, and the chromatic color ink formed by the target printing device as errors of adhesion amounts of the white ink, the black ink, and the chromatic color ink" (see [Abstract]).

According to the technique disclosed in JP 2011-073306 A, there is a possibility that image correction cannot be accurately performed in a case where the same film has different release paper, in a case where a logo is described on the release paper, in a case where a patch shadow is formed on a white background, in a case where a white background and a white ink (toner) are used, or the like. Therefore, there is a need for a technique for changing at least one of a patch generation method, a patch reading method, or an image correction method according to the type of medium.

SUMMARY

The present disclosure has been made in view of the above background, and an object in an aspect is to provide a technique for changing at least one of a patch generation method, a patch reading method, and an image correction method according to a type of a medium or a toner configuration.

To achieve the abovementioned object, according to an aspect of the present invention, an image inspection system reflecting one aspect of the present invention comprises: a hardware processor that controls image formation by an image former based on a read image generated by reading, by a reader, a medium on which a patch is formed, wherein the hardware processor causes the image former to form, on the medium, a patch corresponding to an image formed on a medium by the image former.

BRIEF DESCRIPTION OF THE DRAWINGS

The advantages and features provided by one or more embodiments of the invention will become more fully understood from the detailed description given hereinbelow and the appended drawings which are given by way of illustration only, and thus are not intended as a definition of the limits of the present invention:

FIG. 23 is a diagram illustrating an example of a fourth problem in the patch reading process of the image forming device;

FIG. 28 is a diagram illustrating an example of a fourth solution method for solving at least one of the first to fifth problems in the patch reading process of the image forming device;

FIG. 29 is a diagram illustrating an example of a fifth solution method for solving at least one of the first to fifth problems in the patch reading process of the image forming device;

FIG. 30 is a diagram illustrating an example of a sixth solution method for solving at least one of the first to fifth problems in the patch reading process of the image forming device;

FIG. 31 is a diagram illustrating an example of a seventh solution method for solving at least one of the first to fifth problems in the patch reading process of the image forming device;

FIG. 33 is a diagram illustrating an example of a ninth solution method for solving at least one of the first to fifth problems in the patch reading process of the image forming device;

FIG. 42 is a diagram illustrating an example of setting combination information to be used; and FIG. 43 is a diagram illustrating an example of reading a crossmark or selecting a design.

DETAILED DESCRIPTION OF EMBODIMENTS

Figure 1:
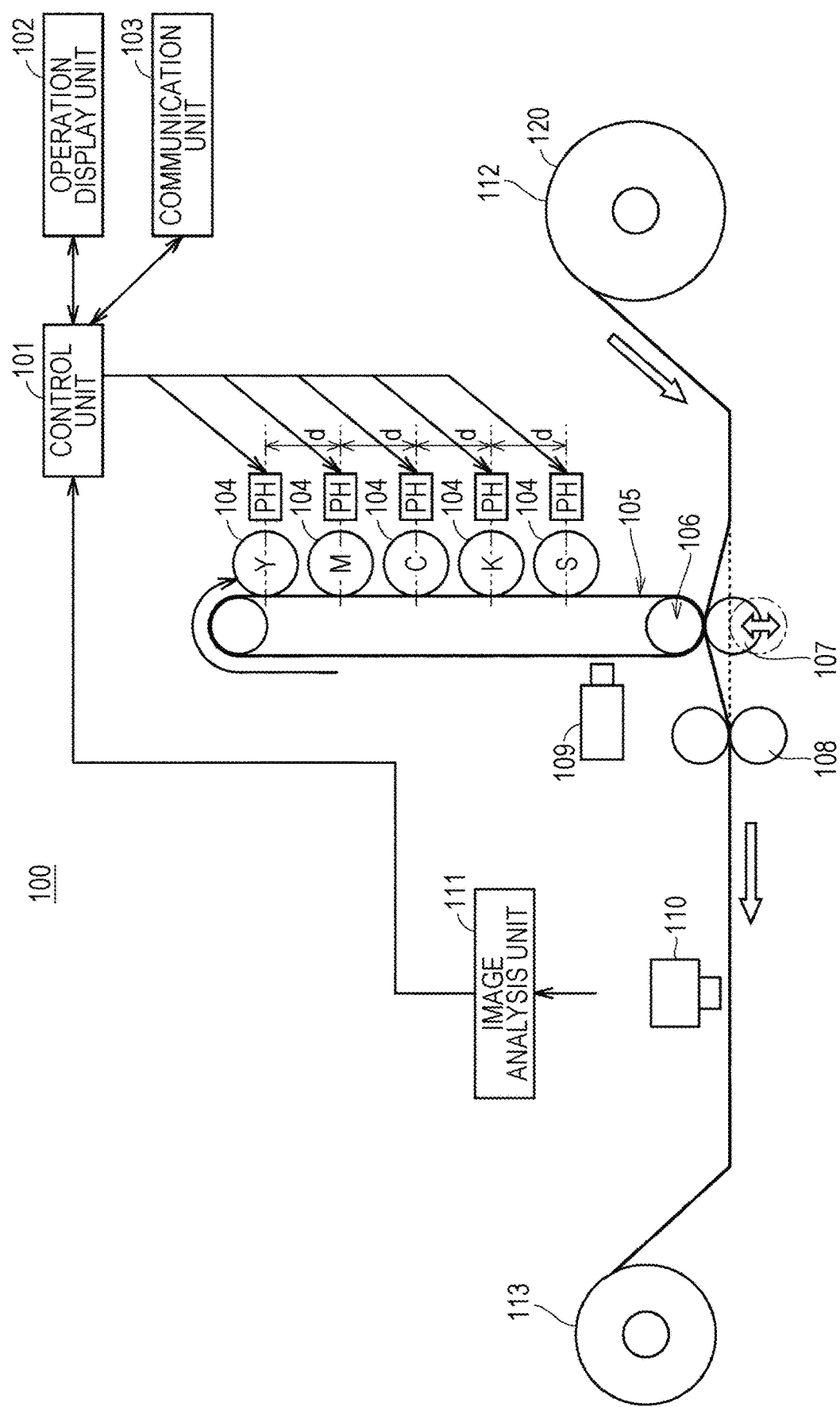
FIG. 1 is a view illustrating an example of a configuration of an image forming device according to the present embodiment.

Hereinafter, one or more embodiments of the present invention will be described with reference to the drawings. However, the scope of the invention is not limited to the disclosed embodiments.

<A. Overview of Technology of the Present Disclosure>

First, an outline of the technology of the present disclosure will be described. The technology of the present disclosure relates to a technology for correcting an image during continuous printing and maintaining print quality constant regardless of the type of medium or toner in an image forming device capable of using a wide variety of media and toners.

Note that the technology of the present disclosure is also applicable to an image forming device using ink. Therefore, "toner" in the following description may be replaced with "ink". In addition, hereinafter, the technology of the present disclosure will be described using an image forming device using a roll-shaped medium as an example, but the image forming device to which the technology of the present disclosure can be applied is not limited to an image forming device using a roll-shaped medium. In an aspect, the technology of the present disclosure can also be applied to an image forming device (also referred to as a "sheet-fed machine") that uses a cut medium used in an office.

In the present specification, the "medium" is a medium on which an image is printed by an image forming device, and includes paper, a film, a colored separator (a mount for a seal, etc.), a metal vapor deposited film, hologram paper, other any print media, or a combination thereof.

The technology of the present disclosure is particularly effective for an image forming device 100 (see FIG. 1) and the like using a roll-shaped medium such as a production printer. Hereinafter, an outline of the technology of the present disclosure will be described using the image forming device 100 as an example.

In a case where an image is continuously printed on a medium, the image forming device 100 prints an image or a figure called a patch in a margin or the like of the medium in order to correct a deviation of the image, a change in color, and the like. The image forming device 100 can read the patch on the medium with a built-in image scanner to change the print parameters and correct image deviation, color change, and the like.

The patch reading process by the image forming device 100 using the roll-shaped medium is more difficult than the patch reading process by the image forming device using normal white paper mainly due to the following four reasons.

The first reason is that, in the image forming device 100, a wide variety of media other than normal white paper is used, such as a colored separator (a mount for a seal or the like), various types of color sealing media on the separator, a transparent film, a metal vapor deposited film of gold and silver, and hologram paper. Depending on the medium, light transmission characteristics, easiness of patch shadow formation, and the like are different. Therefore, the patch reading conditions and various threshold values may change depending on the medium.

The second reason is that a combination of a plurality of media such as a seal and a mount (colored separator) thereof is used in the image forming device 100. Furthermore, the combination of the media may change. For example, although the seal is the same, the color of the mount may change. In this way, even when only one of the combinations of the media is changed, the patch reading conditions are changed.

The third reason is that in the image forming device 100, in addition to color developing toners such as yellow (Y), magenta (M), cyan (C), and black (key plate) (K), a special toner (white toner, metallic color toner, fluorescent color toner, spot color toner, transparent toner, and the like) serving as a base for forming an image on a medium such as a transparent film or a dark color paper or a covering material for finishing is used. Reading these special toner patches may require a different procedure than reading the color developing toner patches.

The fourth cause is that since the image forming device 100 uses a roll-shaped medium, the image forming device 100 can read only the patch on the medium after printing. The sheet-fed machine has a function of separating the intermediate transfer belt from the secondary transfer roller. The sheet-fed machine separates the intermediate transfer belt from the secondary transfer roller in the middle of the continuous printing, and prints a patch on the intermediate transfer belt after the patch is not transferred onto the medium. Then, the sheet-fed machine can correct the printing condition by acquiring and analyzing the image of the patch on the intermediate transfer belt by a toner image sensor (sometimes referred to as a monocular sensor). However, unlike the sheet-fed machine, since the image forming device 100 using the roll-shaped medium performs printing on the roll-shaped medium, the intermediate transfer belt cannot be separated from the secondary transfer roller in the middle of printing. Therefore, the image forming device 100 is required to read the patch image on the medium after printing.

In order to solve the above problems, the image forming device 100 according to the present embodiment changes at least one of the patch generation method, the patch reading method, or the printed image correction method based on the type of medium, the combination of the media, the type of toner or ink to be used, or a combination thereof. Details of the functions provided by the image forming device 100 will be described later.

<B. Image Forming Device>
(a. Hardware Configuration)

Next, a hardware configuration of an image forming device to which the technology of the present disclosure can be applied and an image scanner included in the image forming device will be described with reference to FIGS. 1 to 4. The image scanner is hardware for reading the medium 120 or images and patches printed on the medium 120. The image forming device 100, 200 adjusts a patch to be read by the image scanner, or a patch reading process of the image scanner, or both according to the medium 120 or the toner (ink). As a result, the image forming device 100, 200 can appropriately read the patch and adjust the print setting (correct the printed image) in each of a wide variety of medium and toner (ink) combinations.

FIG. 1 is a diagram illustrating an example of a configuration of an image forming device 100 according to the present embodiment. The image forming device 100 is an image forming device using the roll-shaped medium 120, and is, for example, a production printer or the like.

The image forming device 100 mainly includes a control unit 101, an operation display unit 102, a communication unit 103, an image former 104, an intermediate transfer belt 105, a belt driving roller 106, a secondary transfer roller 107, a fixing unit 108, a toner image sensor 109, an image scanner 110, an image analysis unit 111, a sheet feeder 112, and a sheet ejector 113.

The control unit 101 controls the entire image forming device 100. For example, the control unit 101 can control a process of displaying various settings on the operation display unit 102, a process of a command input from the operation display unit 102, a process of printing by the image former 104, and the like. In addition, the control unit 101 executes part or all of processing such as printing of a patch, analysis of a patch, and change in print setting based on an analysis result of a patch. Furthermore, the control unit 101 can execute part of processing such as printing of a patch, analysis of a patch, and change in print setting based on an analysis result of a patch in cooperation with another configuration (image former 104, image scanner 110, and the like).

In an aspect, the control unit 101 may include a processor (not shown), a memory (not shown), and a storage (not shown). In this case, the processor executes or refers to various programs and data read into the memory. In an aspect, the processor may include one or more central processing units (CPUs), a field programmable gate array (FPGA), at least one application specific integrated circuit (ASICs), a combination thereof, or the like.

The memory stores a program executed by the processor and data referred to by the processor. In an aspect, the memory may be realized by a dynamic random access memory (DRAM), a static random access memory (SRAM), or the like.

The storage is a nonvolatile memory, and may store a program executed by the processor and data referred to by the processor. In this case, the processor executes a program read from the storage to the memory, and refers to data read from the storage to the memory. In an aspect, the storage may be implemented by a hard disk drive (HDD), a solid state drive (SSD), an erasable programmable read only memory (EPROM), an electrically erasable programmable read only memory (EEPROM), a flash memory, or the like.

In another aspect, the control unit 101 may be realized as a system on chip (SoC), a system on module (SoM), a printed circuit board (PCB) on which any electronic component is mounted, or a combination thereof.

The operation display unit 102 includes a display unit such as a display, and an operation unit such as a touch panel and a button. The touch panel may be incorporated in the display unit. The display unit may be a liquid crystal display, an organic electro luminescence (EL) display, or any other display unit. The display unit can display a user interface (UI) and various types of information based on a command from the control unit 101. The operation unit can receive an operation input from the user to output a signal of the operation input to the control unit 101.

The communication unit 103 is connected to another device via a wired network or a wireless network. The communication unit 103 can receive a job from the terminal of the user, for example. The communication unit 103 outputs the print job to the control unit 101. The control unit 101 executes the printing process by controlling the image former 104 based on the job. In an aspect, the communication unit 103 may be realized by a wired local area network (LAN) port, a wireless fidelity (Wi-Fi (registered trademark)) module, or the like. In another aspect, the communication unit 103 may transmit and receive data using a communication protocol such as a transmission control protocol/internet protocol (TCP/IP) or a user datagram protocol (UDP).

The image former 104 forms a toner image or an ink image on the intermediate transfer belt 105. The image forming device 100 includes an image former 104 for each of a plurality of colors. As an example, the image forming device 100 includes a Y (yellow) image former 104, an M (magenta) image former 104, a C (cyan) image former 104, a K (black (key plate)) image former 104, and an S (special toner) image former 104. Furthermore, the image forming device 100 may include an image former 104 of any color other than YMCKS. The toner-type image former 104 includes a photosensitive member, a charger, an exposer, a developing station, and a cleaner. The toner-type image former 104 transfers the toner image formed on the photosensitive member to the intermediate transfer belt 105. The ink-type image former 104 includes an inkjet nozzle. The inkjet nozzle forms an image on the intermediate transfer belt 105.

The intermediate transfer belt 105 is a belt for forming a toner image (or an ink image) by the image former 104. The intermediate transfer belt 105 is driven by the belt driving roller 106. The toner image on the intermediate transfer belt 105 is conveyed to the path of the printing medium 120, and is transferred to the medium 120 by the secondary transfer roller 107.

The fixing unit 108 nips the medium 120 by the pressure roller and the heating roller to melt the toner image on the medium 120. The toner image is heated and melted by the heating roller to be fixed to the medium 120.

The toner image sensor 109 reads a toner image formed on the intermediate transfer belt 105 to output reading result data to the control unit 101. The secondary transfer roller 107 is movable by a motor or the like. When the toner image sensor 109 is used, the control unit 101 moves the secondary transfer roller 107 to separate the intermediate transfer belt 105 from the medium 120. As a result, the toner image on the intermediate transfer belt 105 passes in front of the toner image sensor 109. The control unit 101 analyzes the reading result data acquired from the toner image sensor 109 and changes the print setting, thereby correcting the toner image that has changed due to the influence of temperature, humidity, or the like.

However, unlike the sheet-fed machine, the image forming device 100 using the roll-shaped medium cannot separate the intermediate transfer belt 105 from the medium 120 in the middle of printing. When the intermediate transfer belt 105 is separated from the medium 120 in the middle of printing, printing on the medium 120 is interrupted at that point, and a failure may occur in a subsequent process. This is because, as a result, all printing is performed again. Therefore, the image forming device 100 using the roll-shaped medium can correct the image without interrupting printing (during continuous printing) and maintain the quality of printing at a constant level by performing the correction process using the image scanner 110.

The image scanner 110 reads the surface of the medium 120 on which an image is printed to output reading result data to the image analysis unit 111. The control unit 101 can correct the deviation of the printing position, the change in the color of the image, and the like by changing the print setting based on the image analysis result acquired from the image analysis unit 111. A detailed configuration of the image scanner 110 will be described with reference to FIG. 3.

The image analysis unit 111 analyzes reading result data acquired from the image scanner 110. As an example, the image analysis unit 111 can analyze a deviation in the printing position of the image, a change in each color included in the image on the medium 120, and the like. The image analysis unit 111 outputs the analysis result to the control unit 101. In an aspect, the control unit 101 may have the function of the image analysis unit 111.

The sheet feeder 112 supplies the medium 120 toward the conveyance path of the medium 120. For example, the sheet feeder 112 may be a roller for setting the roll-shaped medium 120. In this case, the sheet feeder 112 rotates to supply the medium 120 toward the conveyance path.

The sheet ejector 113 is a place where the medium 120 is ejected. For example, the sheet ejector 113 may be a roller for winding the medium 120 on which an image is printed. In this case, the sheet ejector 113 rotates in conjunction with the sheet feeder 112 to wind the medium 120 on which the image is printed.

Figure 2:
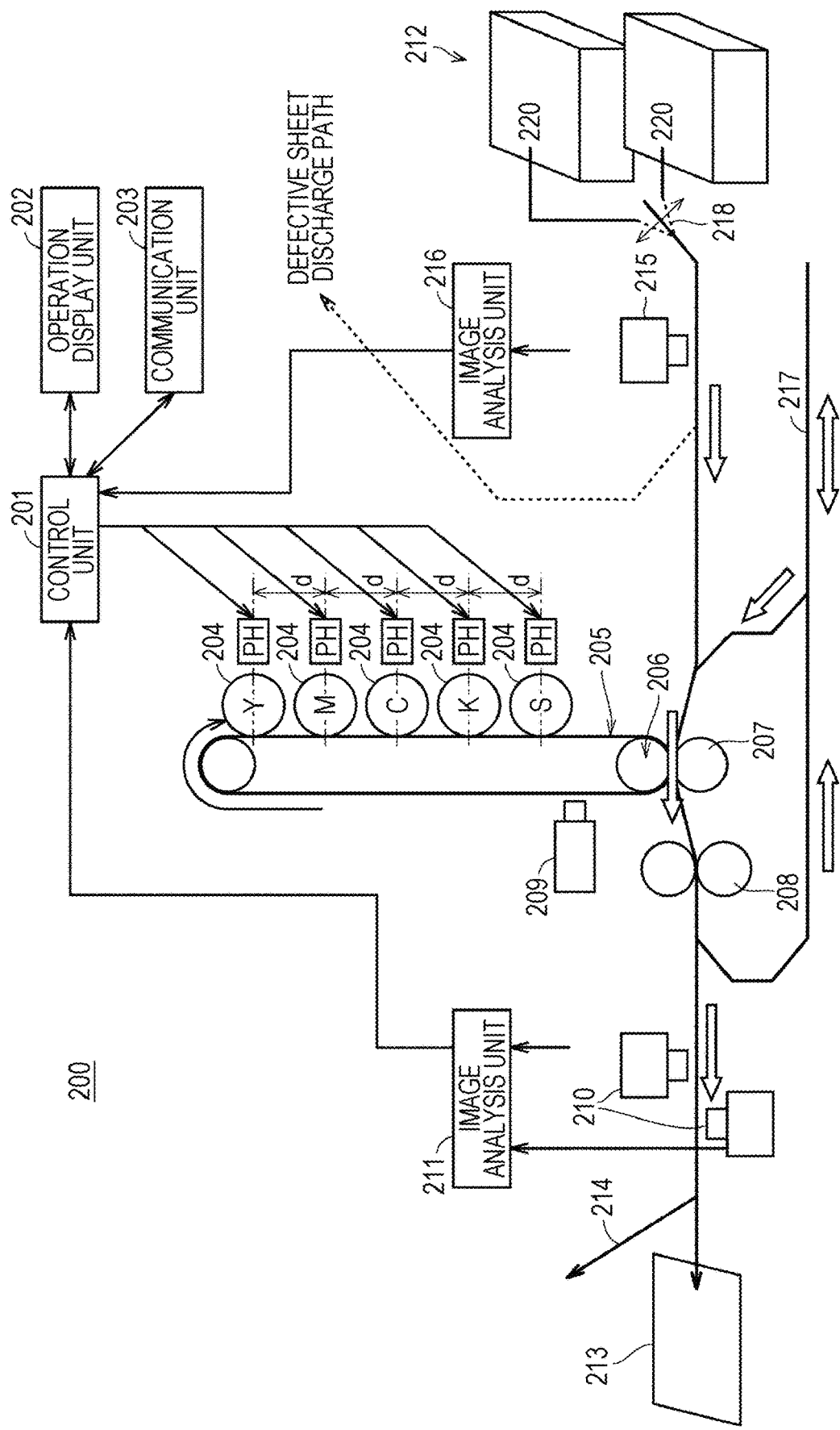
FIG. 2 is a diagram illustrating an example of a configuration of an image forming device according to the present embodiment.

FIG. 2 is a diagram illustrating an example of a configuration of an image forming device 200 according to the present embodiment. Unlike the image forming device 100, the image forming device 200 prints an image on a cut medium 220. For example, the image forming device 200 is a sheet-fed machine such as an office multifunction peripheral (MFP). The technology of the present disclosure is particularly effective for the image forming device 100 using the roll-shaped medium 120, and is also applicable to a sheet-fed machine such as the image forming device 200.

The image forming device 200 includes a control unit 201, an operation display unit 202, a communication unit 203, an image former 204, an intermediate transfer belt 205, a belt driving roller 206, a secondary transfer roller 207, a fixing unit 208, a toner image sensor 209, an image scanner 210, an image analysis unit 211, a sheet feeder 212, and a sheet ejector 213 as the same configuration as the image forming device 100. Further, the image forming device 200 includes a defective print sheet ejector 214, an upstream image scanner 215, an upstream image analysis unit 216, a sheet reversing unit 217, and a switching unit 218 as a configuration of a sheet-fed machine.

The defective print sheet ejector 214 is a place to eject the medium 220 with a printing defect. For example, the defective print sheet ejector 214 may be a sheet ejection tray.

The upstream image scanner 215 reads the surface of the medium 220 before an image is printed to output reading result data to the upstream image analysis unit 216. In an aspect, the upstream image scanner 215 may have the same hardware configuration as the image scanner 210. In addition, the image forming device 200 may include a sensor (not illustrated) that identifies the type of sheet by measuring physical properties (sheet thickness, weight, moisture content, smoothness of sheet surface, rigidity of sheet, and the like) of the medium 220 in series with the upstream image scanner 215. In this case, the image forming device 200 may use the information about the type of the medium obtained by the sensor for various types of processing to be described later.

The upstream image analysis unit 216 analyzes the reading result data acquired from the upstream image scanner 215. As an example, the upstream image analysis unit 216 can analyze the type of the medium 220. The upstream image analysis unit 216 outputs an analysis result to the control unit 201. The control unit 201 can change the print setting based on the analysis result (type of medium 220, etc.). In an aspect, the control unit 201 may have the function of the upstream image analysis unit 216.

The sheet reversing unit 217 is a mechanism that reverses the medium 220 when double-sided printing is performed. The control unit 201 can reverse the medium 220 by controlling motors provided at various places of the sheet reversing unit 217 or drivers of the motors.

The switching unit 218 switches the sheet feed source of the printing medium 220. The sheet feeder 212 of the image forming device 200 includes a plurality of sheet feeding racks. The sheet feeder 212 switches a sheet feeding rack in a supply source of the medium 220.

Figure 3:
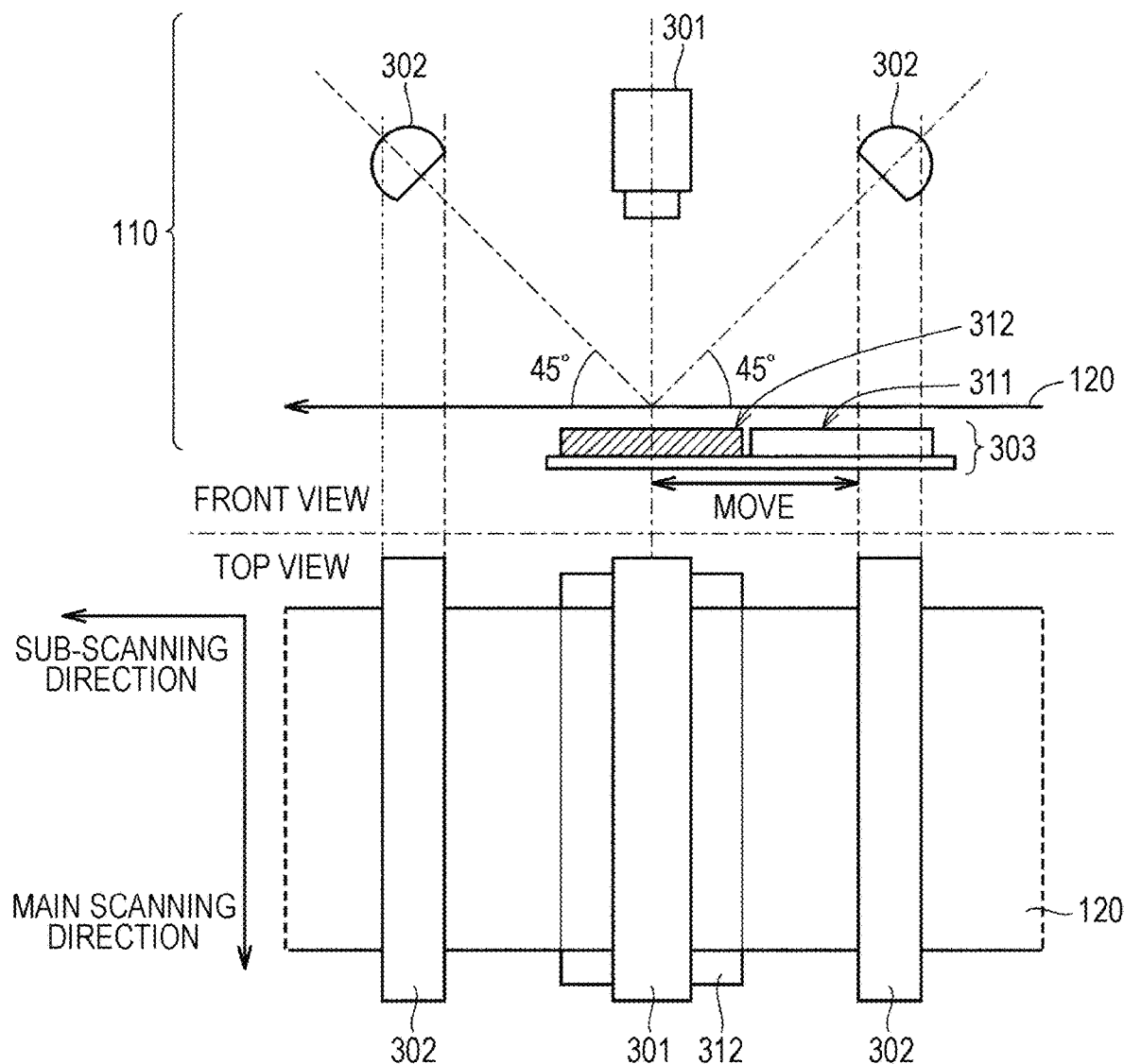
FIG. 3 is a diagram illustrating an example of a configuration of an image scanner according to the present embodiment.

FIG. 3 is a view illustrating an example of a configuration of the image scanner 110 according to the present embodiment. Note that the image scanner 210 also has a hardware configuration similar to that of the image scanner 110.

The image scanner 110 mainly includes an image sensor 301, a light 302, and a background plate 303. In addition to these components, the image scanner 110 also includes a conveyance unit that conveys the medium 120 at a constant speed, a calibration plate 400 (see FIG. 4) for maintaining a constant reading characteristic of the image sensor 301, a control device that calibrates the image sensor 301, and the like. Note that the image sensor 301, the light 302, and the background plate 303 are not necessarily integrated, and may be separated from each other as long as they cooperate to realize the function as the image scanner 110. For example, the image scanner 110 may include the image sensor 301 and the light 302, and may be separate from the background plate 303.

The image sensor 301 is disposed immediately above (the conveyance path of) the medium 120, and reads an image printed on the medium 120. The image sensor 301 may be a line sensor (linear image sensor). In an aspect, the image sensor 301 may be a contact image sensor (CIS) sensor, a complementary metal oxide semiconductor (CMOS) sensor, or a charge coupled device (CCD) sensor. For example, the line sensor (linear image sensor) may include a configuration of focusing by combining an image forming lens of a reduction system with these various sensors.

The medium 120 passes immediately below the image sensor 301 at a constant speed. The image sensor 301 reads images on the medium 120 at regular intervals. A reading direction of an image by the image sensor 301 is defined as a main scanning direction, and a conveyance direction of the medium 120 orthogonal to the main scanning direction is defined as a sub-scanning direction. In this case, the resolution of the read image in the main scanning direction is determined by the number of sensor elements of the image sensor 301. The resolution of the read image in the sub-scanning direction is determined by a value obtained by dividing the image reading interval of the image sensor 301 by the conveyance speed of the medium 120. As an example, when the conveyance speed of the sheet decreases due to the transfer process or the fixing process, the movement amount of the sheet per image reading interval of the image sensor 301 decreases, and thus, the resolution of the read image in the sub-scanning direction increases.

The light 302 illuminates the medium 120. In an aspect, the light irradiation direction of the light 302 may be 45° with respect to the medium 120. As a result, the specular reflection component of the illumination light is suppressed from entering the image sensor 301, and the chromaticity and density of the object to be measured (image printed on the medium 120) can be appropriately measured. The image scanner 110 may also include a plurality of lights 302. In other aspects, the light 302 may be a light emitting diode (LED), a fluorescent tube, any other light source, or a combination thereof.

The amount of light of the light 302 is determined so that the image sensor 301 can read the image on the medium 120 and the amount of light does not saturate the bright portion of the image on the medium 120.

The amount of light of the light 302 can be adjusted by controlling the intensity of the illumination, the illumination time within the image reading period of one line, or both. The image scanner 110 can adjust the image reading characteristics of the image sensor 301 by adjusting the amount of light and the like of the light 302.

In an aspect, in a case where the light 302 is a general white LED, the image scanner 110 can adjust the amount of light of the light 302 by uniformly adjusting the entire measurement color (white light itself). In another aspect, in a case where the illumination element of the light 302 is independent for each color light (red, yellow, blue, etc.), the image scanner 110 can adjust the amount of light of the light 302 for each color light.

In another aspect, in a case where the image sensor 301 includes an image sensor for each color light, and each image sensor reads a color component of an image in time series, the image scanner 110 can adjust the amount of light for each color light by adjusting the light emission intensity and time of the light 302 in accordance with the reading timing of each image sensor.

In another aspect, the image scanner 110 (or the image analysis unit 111) can adjust image reading characteristics of the image sensor 301 by adjusting various parameters such as a gain before an analog signal output from the image sensor 301 is analog/digital (AD) converted to a digital signal.

The background plate 303 reflects light emitted from the light 302. The background plate 303 includes a white background plate 311 and a black background plate 312. The background plate 303 is provided at a position facing the image sensor across the path of the medium 120. The background plate 303 is movable by a drive device (not illustrated). As the background plate 303 moves, the background at the time of an image reading process by the image sensor 301 is switched between the white background plate 311 and the black background plate 312. The control unit 101 or the image analysis unit 111 can select the color of the background plate at the time of image reading by the image sensor 301 according to the type of the medium 120 or the toner (ink). In an aspect, the control device of the image scanner 110 may have a function of selecting the color of the background plate at the time of image reading by the image sensor 301.

Figure 4:
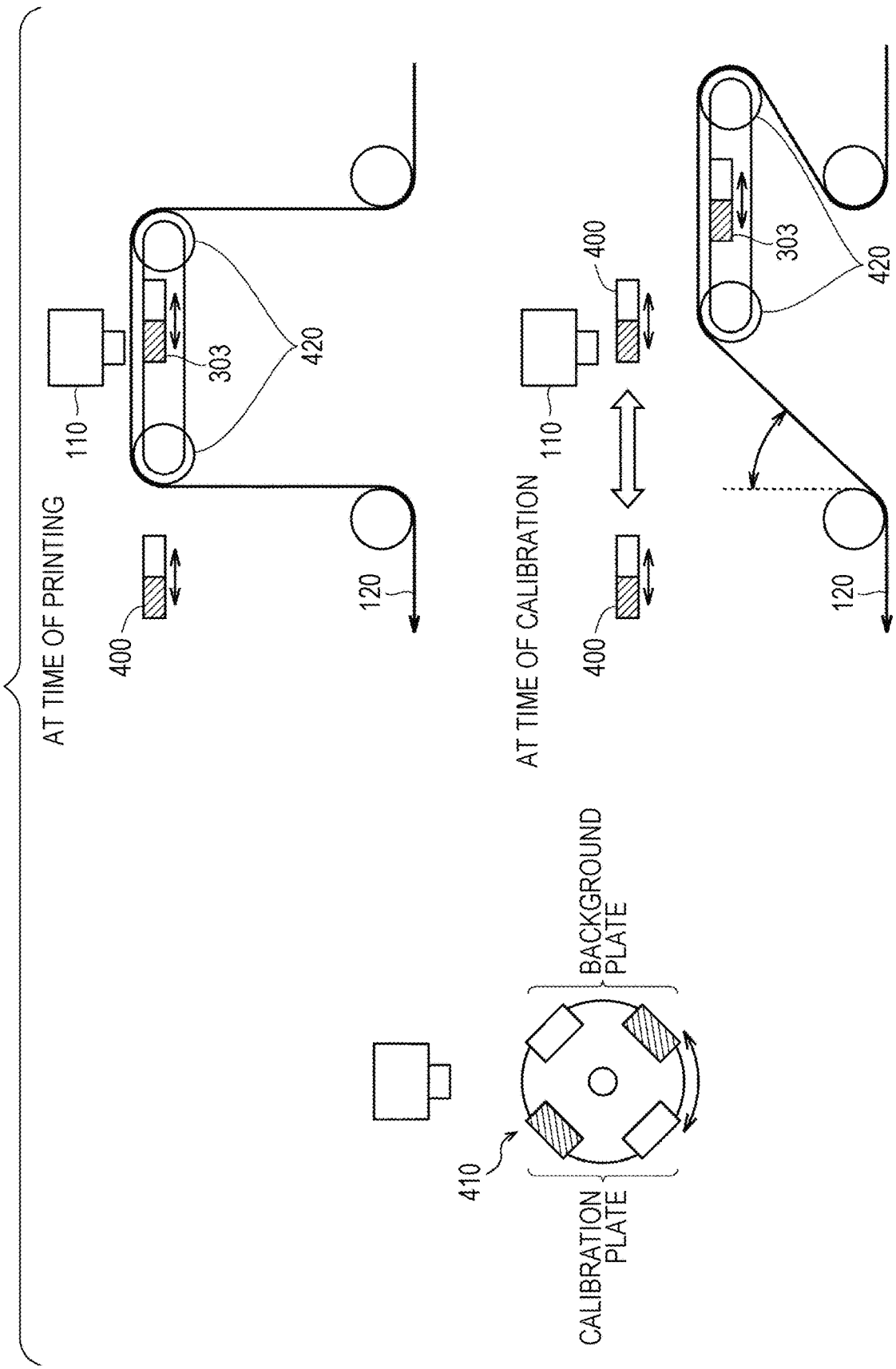
FIG. 4 is a diagram illustrating an example of a configuration of a calibration plate included in the image forming device according to the present embodiment.

FIG. 4 is a diagram illustrating an example of a configuration of the calibration plate 400 included in the image forming device 100 according to the present embodiment. The calibration plate 400 will be described in comparison with a calibration plate 410 of the sheet-fed machine. The calibration plate is for adjusting an image reading characteristic of the image scanner, and includes a white calibration plate and a black calibration plate. The image sensor is required to directly read the calibration plate. A sheet-fed machine (such as the image forming device 200) can interrupt printing to create a state where there is no medium between the image scanner and the background plate even during printing. Therefore, for example, by providing the cylindrical calibration plate 410 having the background plate and the calibration plate, the sheet-fed machine can switch and use the background plate and the calibration plate.

On the other hand, in the image forming device 100 using the roll-shaped medium 120, since the medium 120 is not interrupted during printing, a mechanism different from the sheet-fed machine is required. When the image scanner 110 is calibrated, the image sensor 301 is required to directly read the calibration plate, but this is because the medium 120 is not interrupted. Therefore, the image forming device 100 includes the calibration plate 400 separately from the background plate 303. The calibration plate 400 includes a white calibration plate 401 and a black calibration plate 402. At the time of calibration, the image forming device 100 moves the calibration plate 400 directly below the image sensor 301 by avoiding placing the background plate 303 and the medium 120 directly below the image sensor 301. For example, the calibration plate 400 may be moved by a drive mechanism (not shown). The conveyance rollers 420 and the background plate 303 of the medium 120 may also be moved by a drive mechanism (not shown).

The image scanner 110 uses the calibration plate 400 to calibrate the reading characteristics of the image scanner 110. Calibration of the reading characteristics of the image scanner 110 can include correction of an image gain by the image analysis unit 111, correction of amount of light unevenness of the image scanner itself (so-called shading correction), correction of an analysis value or the like, adjustment of the amount of light of the light 302, and the like. Calibration plate 400 includes a white background plate and a black background plate. By repeating printing, the background plate 303 may be contaminated with paper dust or may be scratched by being rubbed against transfer paper or the like. Therefore, it is desirable that calibration plate 400 be provided separately from background plate 303. In an aspect, in a case where the background plate 303 is not largely contaminated even after repeated printing, the image scanner 110 may use the background plate 303 as the calibration plate 400. In this case, the image scanner 110 may include a cleaning unit for the background plate 303.

The image scanner 110 reads the image of the white calibration plate 401 and the image of the black calibration plate 402 at the time of calibration. Then, the image scanner 110 adjusts the image reading characteristics of the image scanner 110 (image analysis unit 111) such that the reading gradation of the image on the white calibration plate 401 is a predetermined value. In addition, the image scanner 110 adjusts the image reading characteristics of the image scanner 110 (image analysis unit 111) such that the reading gradation of the image on the black calibration plate 402 is a predetermined value. The reading gradation of the image is a signal value of the image information. For example, it is assumed that there is a color image in which each of r (red light) g (green light) b (blue light) is expressed by 8 bits. In this case, the brightness of the color image formed on the medium is expressed with a gradation value of 0 to 255 (8 bits can express the color in 256 steps) for each rgb. The image analysis unit 111 executes various types of analysis and/or correction of the print setting based on a change in reading gradation. When the reading gradation of the image is greatly deviated from a predetermined range, an error may occur in the analysis or correction result. In addition, when the reading gradation of the image is greatly deviated from the predetermined range, there is a possibility that the patch position, the marker, the crossmark, or the patch position cannot be identified on the image when various adjustment patches to be described later are read.

Note that the reading gradation of the image of the black calibration plate 402 does not change significantly in many cases. Therefore, in an aspect, the image scanner 110 may read only the image of the white calibration plate 401 and adjust the image reading characteristic of the image scanner 110 (image analysis unit 111) such that the reading gradation of the image of the white calibration plate 401 is a predetermined value.

The image scanner 110 evaluates variation in reading gradation for each position in the main scanning direction. When the variation in the reading gradation is larger than a predetermined value, it is determined that either the image sensor 301 or the calibration plate 400 is contaminated or scratched. In the image scanner 110, a cleaning unit (not illustrated) cleans the lens of the image sensor 301, a protective glass window for protecting the lens from dirt such as paper dust, the calibration plate 400, or all of them, based on determining that there is dirt or a scratch on either the image sensor 301 or the calibration plate 400. When the variation in the reading gradation is not improved even when the lens of the image sensor 301, the calibration plate 400, or both of them are cleaned once or a plurality of times, the image scanner 110 displays an error message on the operation display unit 102. In an aspect, the image scanner 110 may transmit an error message from the communication unit 103 to the terminal of the operator.

Unlike the image sensor 301 and the calibration plate 400, the background plate 303 may not be cleaned. This is because the background plate 303 is simply used as the background of the medium 120, so that even when the background plate 303 is slightly dirty, the image reading by the image sensor 301 is not affected.

However, in a case where medium 120 is a transparent medium such as a transparent film, dirt on background plate 303 may appear in an image read by the image sensor 301. As a result, dirt on the background plate 303 appearing in the image read by the image sensor 301 may affect the image inspection result.

Therefore, the image scanner 110 reads a portion, of the medium 120, where no image is printed or a margin portion of printing during printing, an adjustment mode, a patch reading operation before printing, or the like. Then, the image scanner 110 (image analysis unit 111) can analyze an image of a portion, of the medium 120, where no image is printed or a margin portion of printing, and can determine whether there is dirt on the background plate 303 to such an extent as to affect image inspection.

In a case where there is dirt with intensity that affects the image inspection on the background plate 303, the image forming device 100 may display a message prompting cleaning of the background plate 303 on the operation display unit 102. Note that the image forming device 100 cannot interrupt the printing process. Therefore, in an aspect, in order to enable at least the processing during printing to be normally completed, the image forming device 100 may display a message prompting cleaning of the background plate 303 at timing when dirt to an extent that does not affect image inspection is detected on the background plate 303. In this way, the operator can clean background plate 303 before dirt on background plate 303 affects the image inspection.

In another aspect, the image forming device 100 may include a cleaning unit (not illustrated) for the background plate 303. In another aspect, the image forming device 100 may display, on the operation display unit 102, a message prompting the user to clean the background plate 303 and a message prompting the user to check whether the medium 120 includes a texture (for example, a picture or the like printed on a mount of a seal) that may affect the image inspection.

(b. Configuration of Image Inspection System)

The image forming device 100, 200 includes a configuration for implementing an image inspection system. Hereinafter, a configuration of an image inspection system according to the present embodiment will be described.

Figure 5:
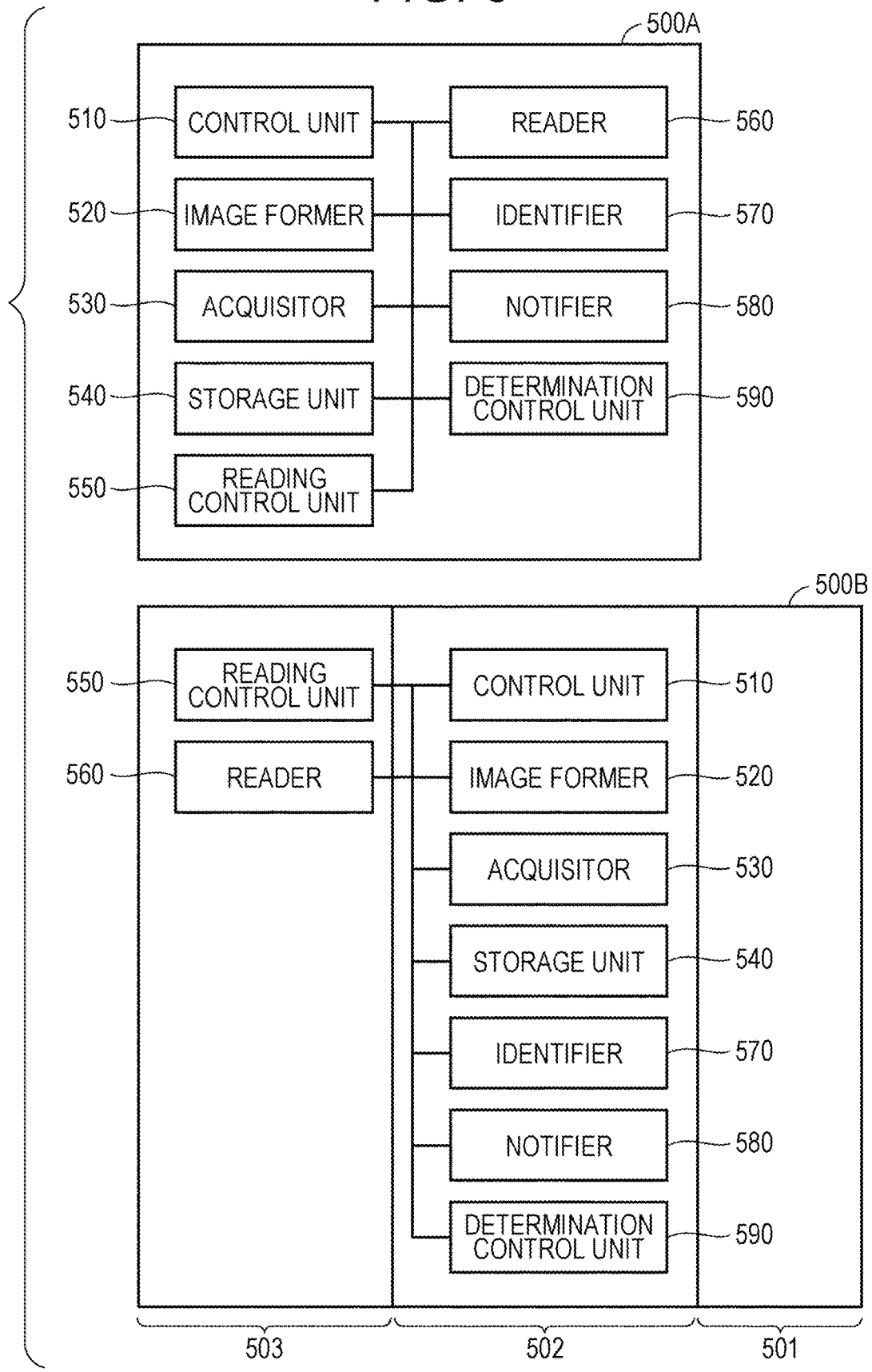
FIG. 5 is a diagram illustrating an example of a configuration of image inspection systems according to the present embodiment.

FIG. 5 is a diagram illustrating an example of a configuration of the image inspection systems 500A, 500B according to the present embodiment. With reference to FIG. 5, configurations of the image inspection systems 500A, 500B (hereinafter, when the image inspection systems 500A, 500B are collectively referred to, they are simply referred to as an "image inspection system") according to the present embodiment will be described.

In a case where the image forming device 100, 200 is realized as one device, the image inspection system according to the present embodiment can also be realized as one device like the image inspection system 500A.

In a case where the image forming device 100, 200 is realized by connecting a plurality of devices, the image inspection system according to the present embodiment can also be realized by connecting a plurality of devices like the image inspection system 500B. The plurality of devices constituting the image forming device 100, 200 is, for example, a sheet feeding device 501, an image forming device 502, an inspection device 503, and the like. Furthermore, the image forming device 100, 200 may further include any device such as a sheet ejection device.

An image inspection system 500 includes, as a configuration, a control unit 510, an image former 520, an acquisitor 530, a storage unit 540, a reading control unit 550, a reader 560, an identifier 570, a notifier 580, and a determination control unit 590. In an aspect, part or all of each configuration of the image inspection system may be realized by hardware of the image forming device 100, 200 executing a program. In another aspect, part or all of each component of the image inspection system may be hardware included in the image forming device 100, 200.

The control unit 510 controls the entire image inspection system. The control unit 101 may also serve as the control unit 510 of the image inspection system. In an aspect, the control unit 510 can execute an image forming process (patch printing process or the like), patch reading control, patch quality determination control, patch reading result correction control, image forming correction control, and the like in cooperation with other functional units.

The image former 520 forms an image on a medium. The image former 520 may include the image former 104 and its peripheral circuits. The image former 520 may print patches and user content on the medium based on instructions from the control unit 510.

The acquisitor 530 acquires information about the medium such as the type and the characteristic of the medium. In an aspect, the acquisitor 530 may include a touch panel and a peripheral circuit thereof. In another aspect, the acquisitor 530 may include an image sensor located upstream of the image former 104. In another aspect, the acquisitor 530 may include both the touch panel and its peripheral circuit, and the image sensor. The acquisitor 530 outputs the acquired information about the medium to at least one of the control unit 510, the reading control unit 550, and the determination control unit 590.

The storage unit 540 stores a use history of the user, a patch print setting in past printing, a patch reading setting, a patch quality determination setting, a user content print correction control setting based on a patch reading result, and the like. These various settings can be stored in the storage unit 540 in association with an identifier (ID) of the user.

The reading control unit 550 controls patch reading by the reader 560. In an aspect, the reading control unit 550 may control the patch reading by the reader 560 based on the use history of the user stored in the storage unit 540. In another aspect, the reading control unit 550 may reflect the information about the medium obtained from the acquisitor 530 in part of the setting of the control of the patch reading by the reader 560.

The reader 560 reads the patch and the user content printed on the medium by the image former 520. The reader 560 may include the image sensor 301 and its peripheral circuits.

The identifier 570 identifies the type, characteristics, and the like of the medium. The identifier 570 can identify the type, characteristics, and the like of the medium from the image obtained by the image sensor and/or the reader 560 (image sensor 301) upstream of the image former 104. In an aspect, the identifier 570 may include an image sensor and/or the reader 560 (image sensor 301).

The notifier 580 makes various notifications to the user. As an example, in a case where at least one of the print setting of the patch used in the previous printing, the patch reading setting, the patch quality determination setting, and the correction control of the printing of the user content based on the patch reading result is reused when the medium is replaced, the notifier 580 may notify the user that the past setting is reused. As another example, in a case where at least one of the print setting of the patch used in the previous printing, the patch reading setting, the patch quality determination setting, and the correction control of the printing of the user content based on the patch reading result is changed when the medium is replaced, the notifier 580 may notify the user that various settings are changed or a new setting is used. Furthermore, the notifier 580 may notify the user of other any errors, warnings, and the like. In an aspect, the notifier 580 may include a touch panel and peripheral circuits thereof. In another aspect, the notifier 580 may include a communication circuit. In this case, the notifier 580 can transmit the notification to the terminal or the like of the user.

The determination control unit 590 performs patch quality determination. In an aspect, the determination control unit 590 may perform the quality determination of the patch by the reader 560 based on the use history of the user stored in the storage unit 540. In another aspect, the determination control unit 590 may reflect the information about the medium obtained from the acquisitor 530 in part of the setting of the quality determination of the patch by the reader 560.

Note that the arrangement of each configuration illustrated in FIG. 5 is an example, and in an aspect, each functional unit can be distributed and disposed in any device. In another aspect, the control unit 510 may also serve as any or all of the image former 520, the reading control unit 550, the identifier 570, and the determination control unit 590. In addition, some or all of the reading control unit 550, the identifier 570, and the determination control unit 590 may be realized as one functional unit different from the control unit 510. Furthermore, in another aspect, each configuration illustrated in FIG. 5 may be implemented as hardware, software, or a combination of hardware and software. The following various processes may be read as being executed by any functional unit of the image inspection system.

<C. Types of Patches>

Next, types of main patches used in the image forming device 100 will be described. There are mainly three types of patches: a density unevenness measurement patch, a gradation adjustment patch, and a real-time adjustment patch.

Figure 6:
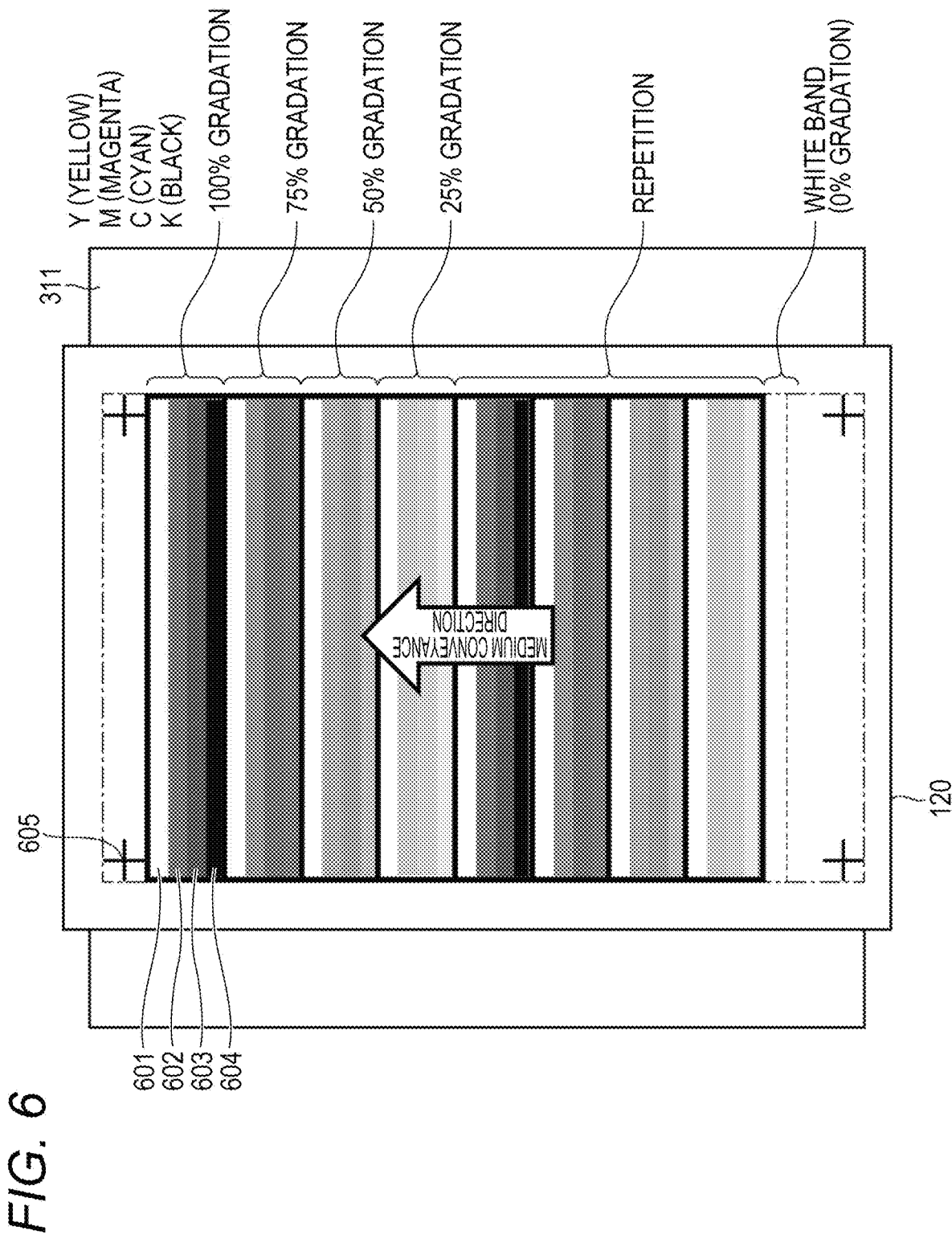
FIG. 6 is a view illustrating an example of a density unevenness measurement patch.

FIG. 6 is a view illustrating an example of the density unevenness measurement patch. With reference to FIG. 6, a density unevenness measurement patch printed on the medium 120 will be described by exemplifying a case where the image forming device 100 prints an image on white paper using the YMCK toner (color developing toner).

The density unevenness measurement patch is used to correct the density unevenness in the main scanning direction (the direction perpendicular to the conveyance direction of the medium). The density unevenness measurement patch is an image printed with uniform gradation in the main scanning direction of the medium. The "gradation" is a level of light and shade of a color.

Since the image forming device 100 using the roll-shaped medium 120 cannot print the density unevenness measurement patch during the execution of the job, the density unevenness measurement patch is printed on the medium 120 at the timing before the execution of the job.

The image forming device 100 prints an image of each color with a uniform gradation in the main scanning direction. For example, the patch 601 is a Y (yellow) image with a gradation of 100%. The patch 602 is an M (magenta) image with a gradation of 100%. The patch 603 is a C (cyan) image with a gradation of 100%. The patch 604 is a K (black) image with a gradation of 100%. The image forming device 100 repeatedly prints an image of each color with uniform gradation in the main scanning direction while switching gradation such as 100%, 75%, 50%, and 25%. The marker 605 indicates a start position, an end position, and the like of the patch, is a positioning index for identifying an accurate position of various patches on the image, and is also referred to as a crossmark. In the example of FIG. 6, the white background plate 311 is used as the background, but the black background plate 312 may be used as the background.

The image scanner 110 (image analysis unit 111) reads and analyzes the density unevenness measurement patch. The image scanner 110 determines whether the density of each color is uniform in the main scanning direction for each gradation. For example, the patches 601 should be of uniform density anywhere. The image scanner 110 (image analysis unit 111) determines whether a color difference of each place in the main scanning direction of each image is a predetermined threshold value or more. For example, in a case where the density at the right end of the patch 601 is lower than the density at other portions, the image forming device 100 can correct the image by changing the print setting to increase the density on the right side of the medium 120 at the time of printing the Y (yellow) image.

Figure 7:
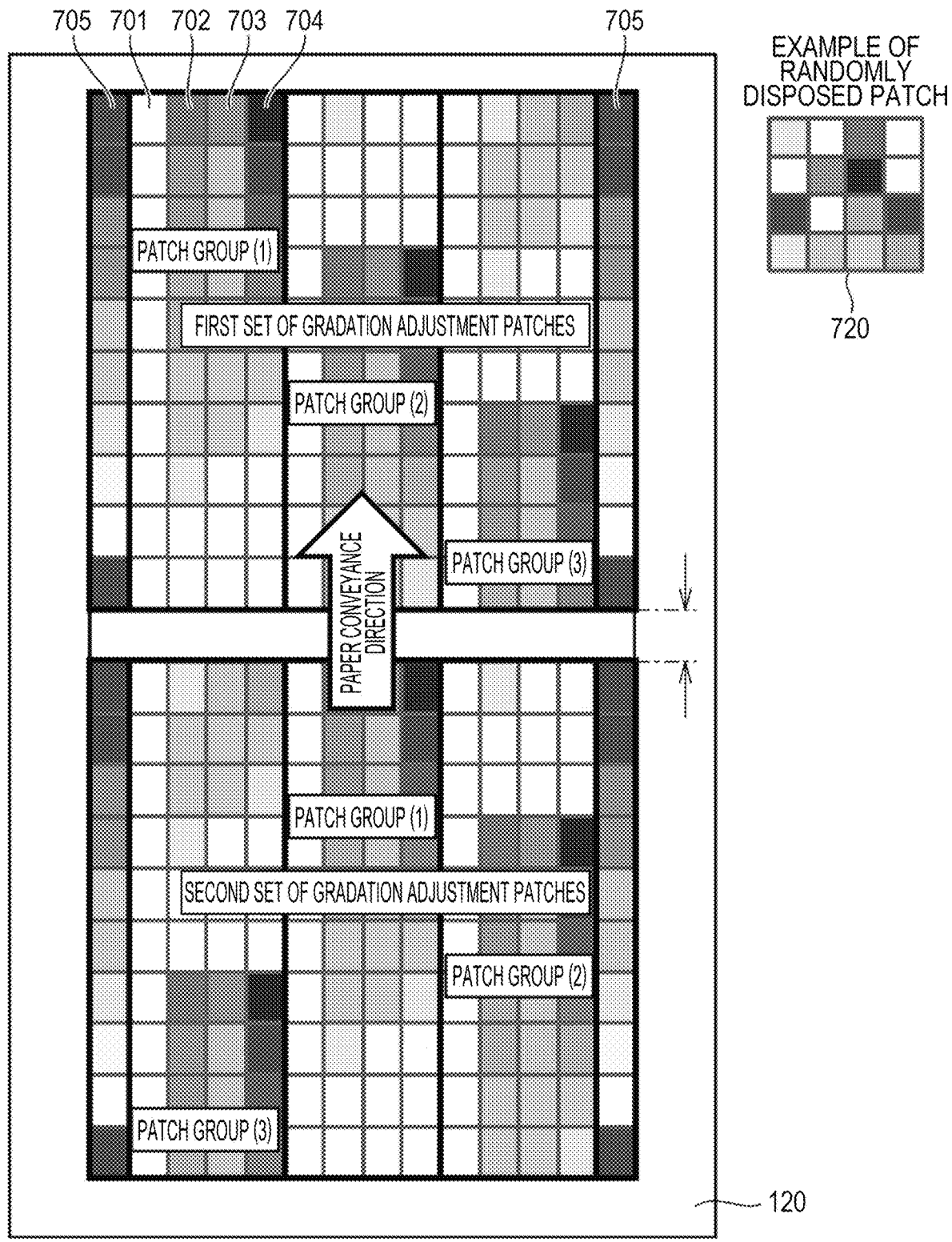
FIG. 7 is a view illustrating an example of a gradation measurement patch.

FIG. 7 is a diagram illustrating an example of a gradation measurement patch. A gradation measurement patch printed on the medium 120 will be described with reference to FIG. 7 by exemplifying a case where the image forming device 100 prints an image on white paper using the YMCK toner (color developing toner).

The gradation adjustment patch is for adjusting a characteristic (density, color tone, etc.) of each color in each gradation. For example, by analyzing the gradation adjustment patch, the image forming device 100 can detect a state in which the density of the Y (yellow) image of gradation 100% is too low and the density of the Y (yellow) image of gradation 50% is too high, and adjust the print setting (can correct the printed image).

Since the image forming device 100 using the roll-shaped medium 120 cannot print the gradation adjustment patch in the middle of execution of the job, the gradation adjustment patch is printed on the medium 120 at a timing before execution of the job.

The image forming device 100 prints a plurality of color tone patches necessary for gradation adjustment side by side on the medium 120. In the example of FIG. 7, the image forming device 100 prints a patch while switching gradation stepwise using each color of the YMCK toner. For example, the patch 701 is formed by disposing rectangles (patches) printed by changing gradation of the Y (yellow) toner stepwise. The patch 702 is formed by disposing rectangles (patches) printed by changing the gradation of the M (magenta) toner stepwise. The patch 703 is formed by disposing rectangles (patches) printed by changing gradation of the C (cyan) toner stepwise. The patch 704 is formed by disposing rectangles (patches) printed by changing gradation of the black (K) toner stepwise. The patch 705 is printed in the vicinity of both ends of the medium 120, and upper and lower ends thereof are configured by dark color patches so as to also serve as the crossmark in the density unevenness measurement patch described above. However, the patch may be a patch of a color having a high frequency of use such as black, or a patch of any other toner.

The gradation adjustment patch of FIG. 7 is an example, and the example of the gradation adjustment patch is not limited thereto. In an aspect, the image forming device 100 may appropriately change the number of patches or the patch layout. For example, the image forming device 100 may print the randomly disposed gradation adjustment patches 720 on the medium 120. The image forming device 100 can average the density unevenness of each patch or the influence between adjacent patches by randomly disposing the patches of each color.

In another aspect, the image forming device 100 may print only one set of gradation adjustment patches or two or more sets of gradation adjustment patches side by side on the medium 120. The image forming device 100 can reduce the influence of the density unevenness by detecting the density unevenness that can occur in the conveyance direction of the medium 120 or averaging the density unevenness by disposing two or more sets of gradation adjustment patches and printing on the medium 120.

In another aspect, each patch may have a rectangular shape, a square shape, or any other shape. In addition, the size of each patch may be different. In addition, the patch may include not only a patch of a monochromatic toner but also a mixed color patch.

Figure 8:
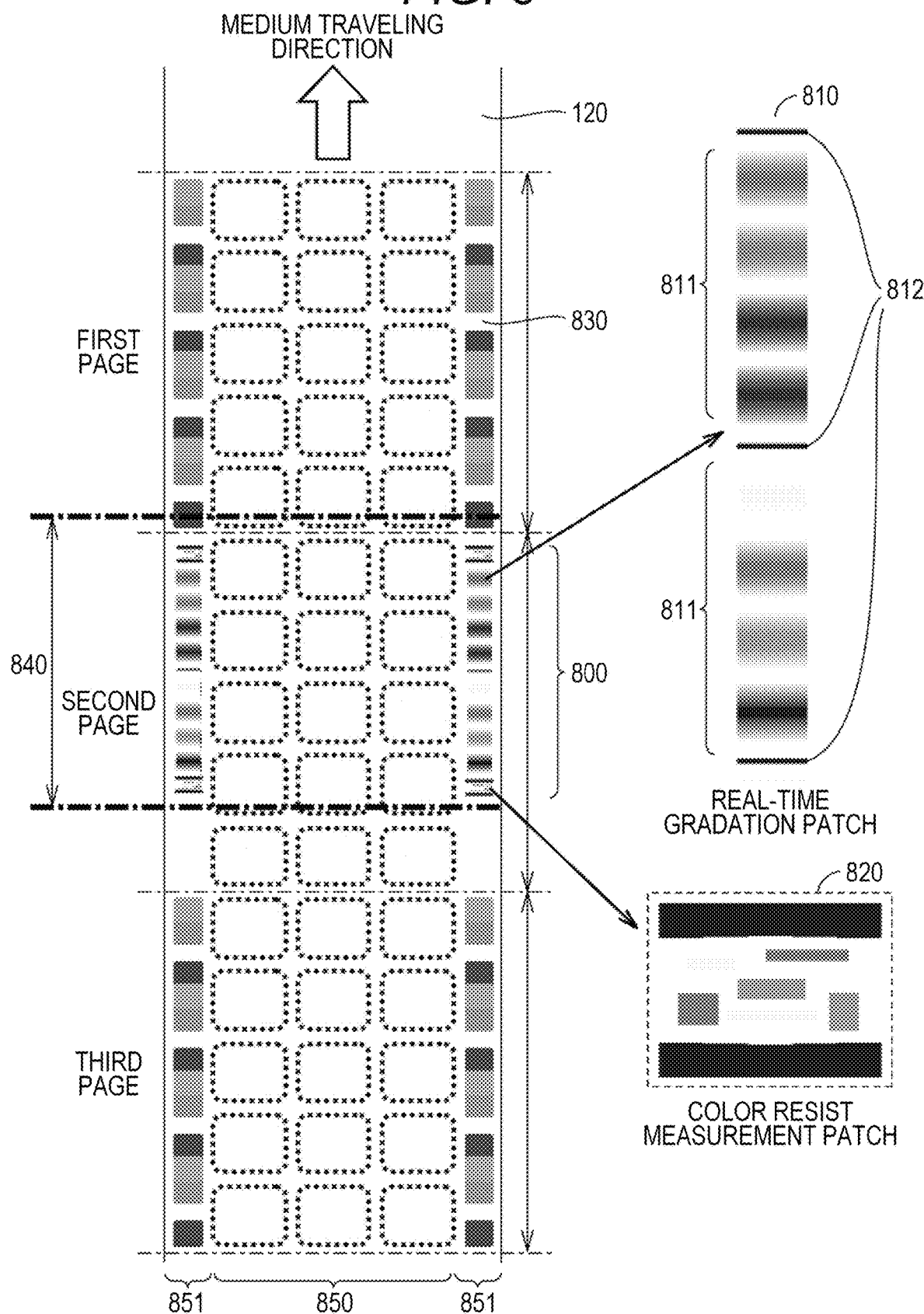
FIG. 8 is a diagram illustrating an example of a real-time adjustment patch.

FIG. 8 is a diagram illustrating an example of a real-time adjustment patch. A gradation measurement patch printed on the medium 120 will be described with reference to FIG. 8 by exemplifying a case where the image forming device 100 prints an image on white paper using the YMCK toner (color developing toner). A real-time adjustment patch 800 includes a real-time gradation patch 810 and a color resist measurement patch 820.

The real-time gradation patch 810 is a patch for maintaining the characteristics of the image at the start of printing (for preventing a density change or the like of the image of each color during printing). When images are continuously printed on the roll-shaped medium 120, the color tone or the like of the printed image may change. Therefore, the image forming device 100 prints the real-time gradation patch 810 on the medium 120 during execution of the job, and analyzes the real-time gradation patch 810. Based on the analysis result, the image forming device 100 can adjust print settings and correct the image (can maintain image characteristics).

The color resist measurement patch 820 is a patch for measuring and correcting mutual printing positional deviation of each color, so-called color registration deviation (sometimes referred to as "color resist deviation"), which causes deterioration in quality of color printing. When images are continuously printed on the roll-shaped medium 120, the medium 120 passes through the inside of the image forming device 100 without interruption. The passage of the medium through the inside of the image forming device is also referred to as "sheet passage". At the time of sheet passage, for example, there is a possibility that an environment such as a temperature in the image former 104 that executes a series of processes of exposure, development, and transfer changes due to the influence of the fixing unit 108. Furthermore, the temperature in the image former 104 may change due to the influence of the environment in which the image forming device 100 is installed. When the temperature in the image former 104 rises during the printing process due to these various factors, the belt driving roller 106 and the like may be deformed due to thermal expansion due to the temperature rise. As a result, the distance that the intermediate transfer belt 105 travels per rotation of the belt driving roller 106 changes, and the printing position of each color developing toner may deviate, and furthermore, the color resist deviation may change. Therefore, the image forming device 100 prints the color resist measurement patch 820 on the medium 120 during execution of the job, and analyzes the color resist measurement patch 820. The image forming device 100 can correct the color resist deviation by finely adjusting the print timing of each toner image of YMCKS, for example, based on the analysis result.

The image forming device 100 may print various patches in a margin 851 of the medium 120 during printing of the image 850 of the job. The patches printed in the margin 851 can be printed page by page. The page can be defined by, for example, an image of the job. In the example of FIG. 7, the image forming device 100 prints a toner consumption patch 830 in the margin 851 of the first page and the third page of the medium 120, and prints the real-time adjustment patch 800 in the second page of the medium 120.

The toner consumption patch 830 is a patch for consuming toner. The toner in the image former 104 gradually deteriorates when not used. Therefore, the image forming device 100 prints the toner consumption patch 830 on the medium 120 as necessary in order to use a certain amount or more of each color toner.

The real-time adjustment patch 800 may be printed between periodically printing the toner consumption patches 830, as an example. The image scanner 110 reads a section 840 sufficiently including the real-time adjustment patch 800.

The real-time gradation patch 810 includes a gradation image 811 of each toner and one or more markers 812 for detecting a start position, a central position, an end position, and the like of the real-time gradation patch 810.

The gradation image 811 includes a gradation image in which gradation of each color is changed. In an aspect, the gradation image 811 is not necessarily a complete gradation, and may be an image in which gradation is changed step-wise. In another aspect, the gradation image 811 may include a monochromatic gradation image, a special color gradation image, and a mixed color gradation image. The image forming device 100 can detect a change in the characteristics of the printed image during continuous printing by analyzing the gradation image 811. The image forming device 100 can maintain the characteristics of the image at the start of printing (can prevent the change in the density of each color, and the like) by adjusting the print settings based on the detection of the change in the characteristics of the printed image.

The image scanner 110 can grasp the position of the gradation image 811 by detecting the marker 812. For example, the image scanner 110 may continuously acquire images of the surface of the medium 120, and may set only a range surrounded by the marker 812 as a range in which analysis is to be performed.

The color resist measurement patch 820 includes upper and lower rectangles in K color serving as markers indicating the position of the color resist measurement patch 820, and rectangles in each color of YMC of sandwiched therebetween. By analyzing the change in the positional relationship between the K color rectangles and the YMC color rectangles of the color resist measurement patch 820, the image forming device 100 can detect a change in the printing position of each of the YMC color rectangles with respect to the printing position of the K color rectangle during continuous printing. The image forming device 100 can correct the color resist deviation by adjusting the printing position of the rectangle in each color of YMC in the direction of offsetting the change.

<D. Use of Patches>

The image forming device 100 according to the present embodiment can change the patch to be generated according to the type of toner, the type of the medium 120, or a combination thereof. That is, the image forming device 100 can selectively use a plurality of variations of patches to be generated according to the type of toner, the type of the medium 120, or a combination thereof.

Hereinafter, in the order of the density unevenness measurement patch, the gradation adjustment patch, and the real-time adjustment patch, what kind of patch the image forming device 100 generates according to the type of toner, the type of the medium 120, or a combination thereof will be described. Note that the image forming device 200 can also change the patch to be generated according to the type of toner, the type of the medium 120, or a combination thereof in a procedure similar to that of the image forming device 100.

(a. Density Unevenness Measurement Patch)

First, variations of the density unevenness measurement patch will be described. The image forming device 100 selectively uses variations of the density unevenness measurement patch mainly based on the color of the medium 120 and/or whether the base toner is used.

Figure 9:
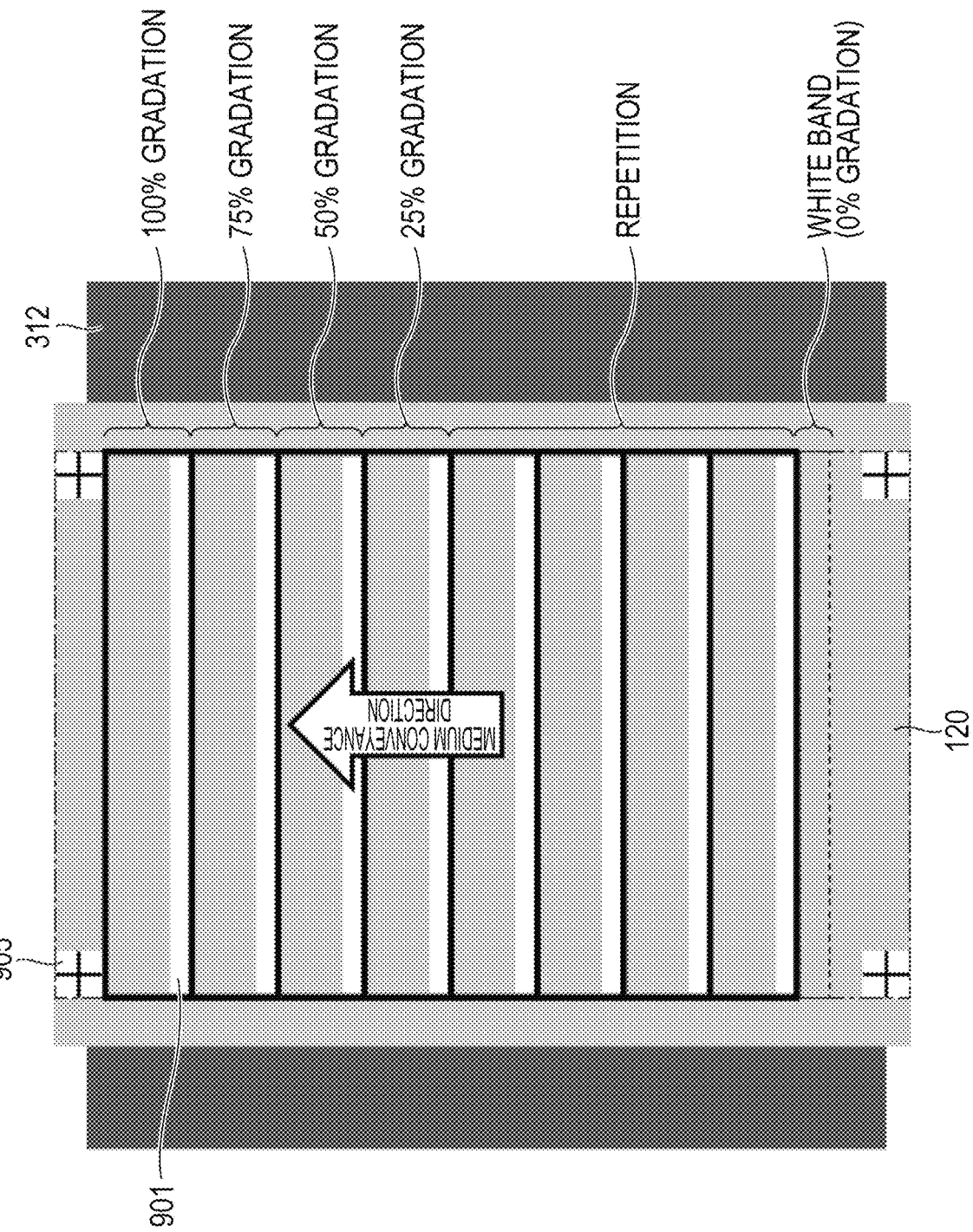
FIG. 9 is a view illustrating a first modification of the density unevenness measurement patch.

FIG. 9 is a view illustrating a first modification of the density unevenness measurement patch. In the example of FIG. 9, the image forming device 100 prints an image on a medium 120 that is a combination of a transparent film (or seal) and colored release paper. In a case where such a transparent film or the like is used, the image forming device 100 may print base toner (for example, white toner or any other toner) on the transparent film before printing an image with color developing toner on the transparent film. In this case, the image forming device 100 prints the density unevenness measurement patch of the base toner on the medium 120 separately from the density unevenness measurement patch of the color developing toner.

The base toner includes, for example, white toner. The white toner can be used for printing of a two-gradation image such as printing of a background of an image and characters with a color developing toner such as YMCK. Therefore, the density unevenness measurement patch of the base toner does not need to include a wide gradation patch unlike the density unevenness measurement patch of the color developing toner. As an example, the patch 910 of the base toner may be composed of gradation patches in narrow ranges such as 100%, 95%, 90%, and 80%. The crossmark 905 at the time of measuring the density unevenness of the base toner may be printed on the image of the base toner with a color developing toner as necessary.

When reading the patch 910 of the base toner, the image forming device 100 can use the black background plate 312 as the background. For example, it is assumed that the patch 901 of the base toner is a patch of the white toner. In this case, when the white background plate 311 is used as the background, there is a possibility that the image forming device 100 (image scanner 110) cannot accurately read the density unevenness of the patch 910 of the white base toner. Therefore, the image forming device 100 uses the black background plate 312 when reading a patch (white toner patch or the like) that may cause a problem in reading when the white background plate 311 is used.

In an aspect, the image forming device 100 may use the white background plate 311 as the background when reading the patch 910 of the base toner. For example, it is assumed that the color of the base toner is other than white. In this case, even when the white background plate 311 is used as the background, there is a possibility that the image forming device 100 (image scanner 110) can appropriately read the patch 910 of the base toner. In such a case, the image forming device 100 can use the white background plate 311. Note that the image forming device 100 may use the black background plate 312 as long as there is no problem in reading the patch 910.

In another aspect, even when the medium 120 is a combination of a transparent film (or a seal) and transparent release paper, the image forming device 100 can measure the density unevenness of the base toner in the main scanning direction by printing the density unevenness measurement patch of the base toner on the medium 120 by the above procedure.

As described above, when using the base toner, the image forming device 100 prints the density unevenness measurement patch of the base toner separately from the density unevenness measurement patch of the color developing toner, and further switches the color of the background plate 303 according to the color of the base toner. Thus, the image forming device 100 can accurately measure the density unevenness of the base toner having a property different from that of the color developing toner, and can correct the density unevenness of the base toner in the main scanning direction. An example of a property different from that of the color developing toner of the base toner is that a change in image gradation or light and shade due to an increase/decrease in the toner used for forming an image or a base image may be reversed between the color developing toner and the base toner. Another example of a property different from that of the color developing toner of the base toner is that the base toner requires only a narrow range of gradation. The base toner may have other properties different from those of the color developing toner.

Figure 10:
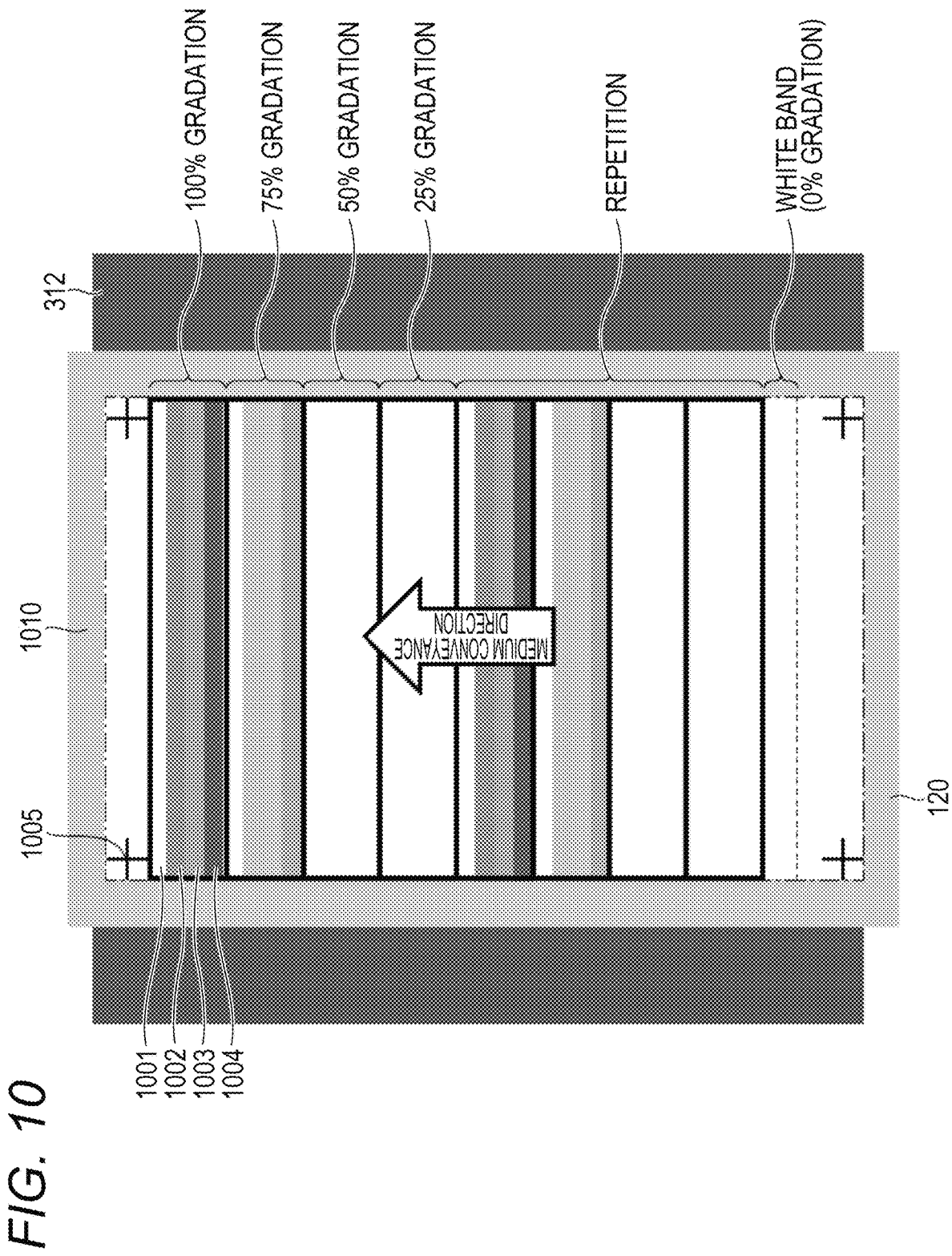
FIG. 10 is a view illustrating a second modification of the density unevenness measurement patch.

FIG. 10 is a view illustrating a second modification of the density unevenness measurement patch. In the example of FIG. 10, as in the example of FIG. 9, the image forming device 100 prints an image on a medium 120 that is a combination of a transparent film (or seal) and colored release paper. When such a transparent film or the like is used, the image forming device 100 may print density unevenness measurement patches (patches 1001, 1002, 1003, and 1004) of the respective color developing toners on a base image 1010 with the base toner. The patches 1001, 1002, 1003, and 1004 may be the same as the patches 601, 602, 603, and 604 of FIG. 6. In the example of FIG. 10, the image forming device 100 may use either the white background plate 311 or the black background plate 312 in order to measure the density unevenness of the color developing toner in the main scanning direction.

In an aspect, even when the medium 120 is a combination of a transparent film (or a seal) and a transparent release paper, the image forming device 100 can measure the density unevenness of the color developing toner in the main scanning direction by printing the patches 1001, 1002, 1003, and 1004 of respective color developing toners on the base image 1010 of the base toner by the above procedure.

As described above, when using the medium 120 requiring the base toner such as the transparent film, the image forming device 100 prints the density unevenness measurement patch of each color developing toner on the base image 1010 with the base toner. Accordingly, the image forming device 100 can solve a problem that may occur when color developing toner is directly printed on a transparent film. An example of a problem that may occur when the color developing toner is directly printed on the transparent film is that unevenness occurs on the surface of the white background plate 311 or the black background plate 312 due to dirt, aged deterioration, or the like at the time of reading an image. As a result, an image reading error may occur. Another example of the problem that may occur when the color developing toner is directly printed on the transparent film is that the tendency of the printing density unevenness of each color developing toner is different between the case where there is the base toner and the case where there is no base toner. Due to these problems, an error may occur in the density unevenness correction when the color developing toner is directly printed on the transparent film. By using the density unevenness measurement patch as illustrated in FIG. 10, the image forming device 100 can accurately measure the density unevenness of each color developing toner on the medium 120 such as a transparent film and correct the density unevenness of each color developing toner in the main scanning direction.

Figure 11:
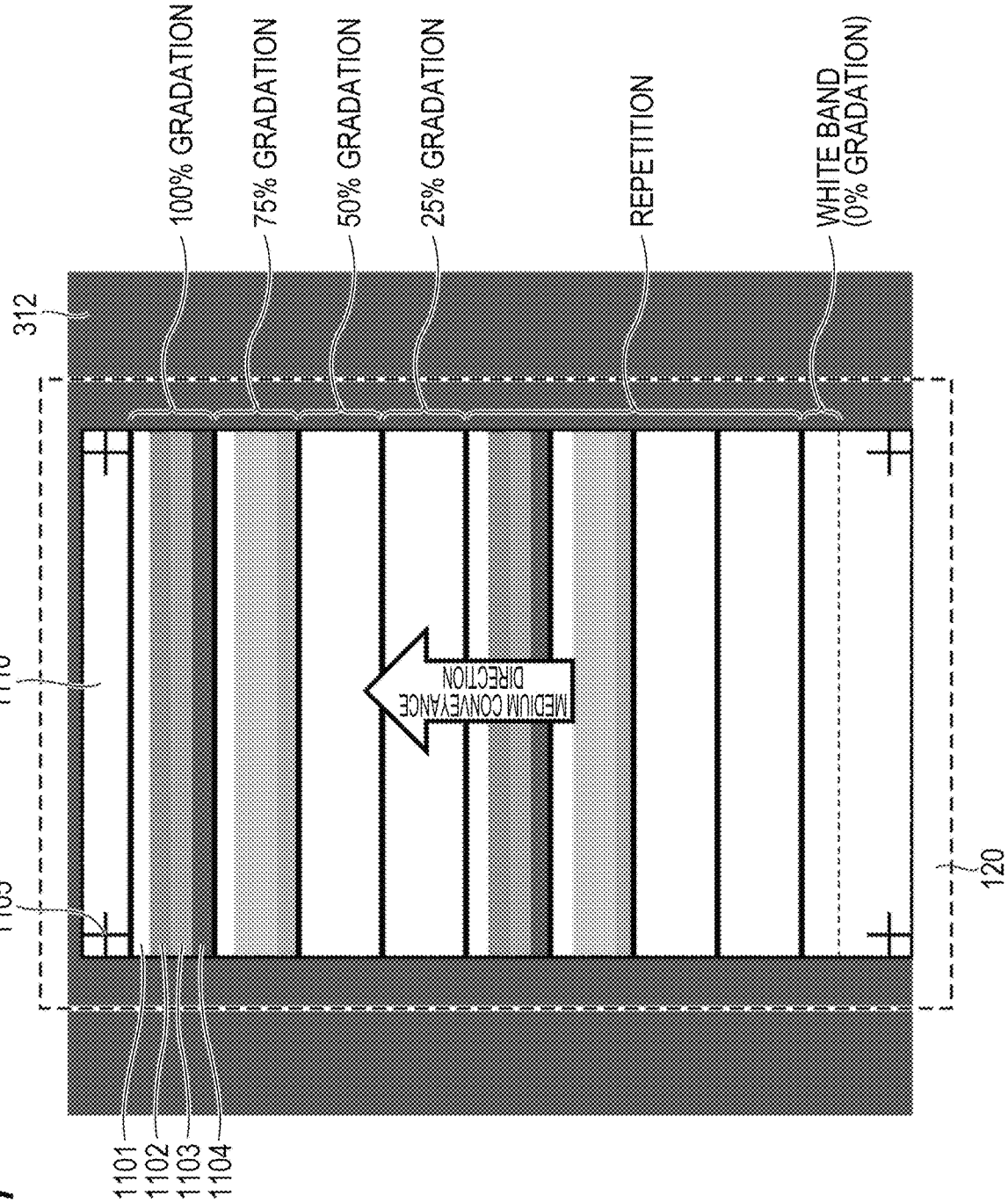
FIG. 11 is a view illustrating a third modification of the density unevenness measurement patch.

FIG. 11 is a view illustrating a third modification of the density unevenness measurement patch. In the example of FIG. 11, unlike the examples of FIGS. 9 and 10, the image forming device 100 prints an image on a medium 120 that is a combination of a transparent film (or seal) and transparent release paper. In this case, the image forming device 100 prints density unevenness measurement patches (patches 1101, 1102, 1103, and 1104) of the respective color developing toners on the base image 1110 with the base toner. The patches 1101, 1102, 1103, and 1104 may be the same as the patch 601, 602, 603, and 604 of FIG. 6.

In a case where the medium 120 is a combination of a transparent film (or a seal) and a transparent release paper, it is assumed that a white toner is used as a base toner. In addition, in a case where density unevenness exists in the base image 1110 of the white toner, the density unevenness of the base image 1110 may greatly affect the measurement result of the density unevenness measurement patch of the color developing toner printed on the base image 1110. Therefore, the image forming device 100 uses the white background plate 311 when printing the white base toner on the transparent medium 120 and further printing the density unevenness measurement patch of the color developing toner thereon. In this way, the image forming device 100 can suppress the influence of the density unevenness of the base image 1110 on the measurement result of the density unevenness measurement patch of the color developing toner.

In an aspect, the image forming device 100 may determine whether there is unevenness in the base image 1110 using the black background plate 312 once. In this case, when determining that there is unevenness in the base image 1110, the image forming device 100 can measure the density unevenness measurement patch of the color developing toner using the white background plate 311. Otherwise, the density unevenness measurement patch of the color developing toner can be measured using the black background plate 312.

In another aspect, the image forming device 100 may determine whether there is unevenness in the base image 1110 using the black background plate 312 once, and correct the base image 1110 so as to eliminate the density unevenness. Then, the image forming device 100 can measure the density unevenness measurement patch of the color developing toner using either the white background plate 311 or the black background plate 312.

On the white background plate 311, the density unevenness of the white toner is small and is often inconspicuous. Therefore, in another aspect, the image forming device 100 may measure the density unevenness measurement patch of the color developing toner and correct the print setting of the color developing toner using the white background plate 311, and then measure the density unevenness of the base image 1110 and correct printing of the white toner.

Figure 12:
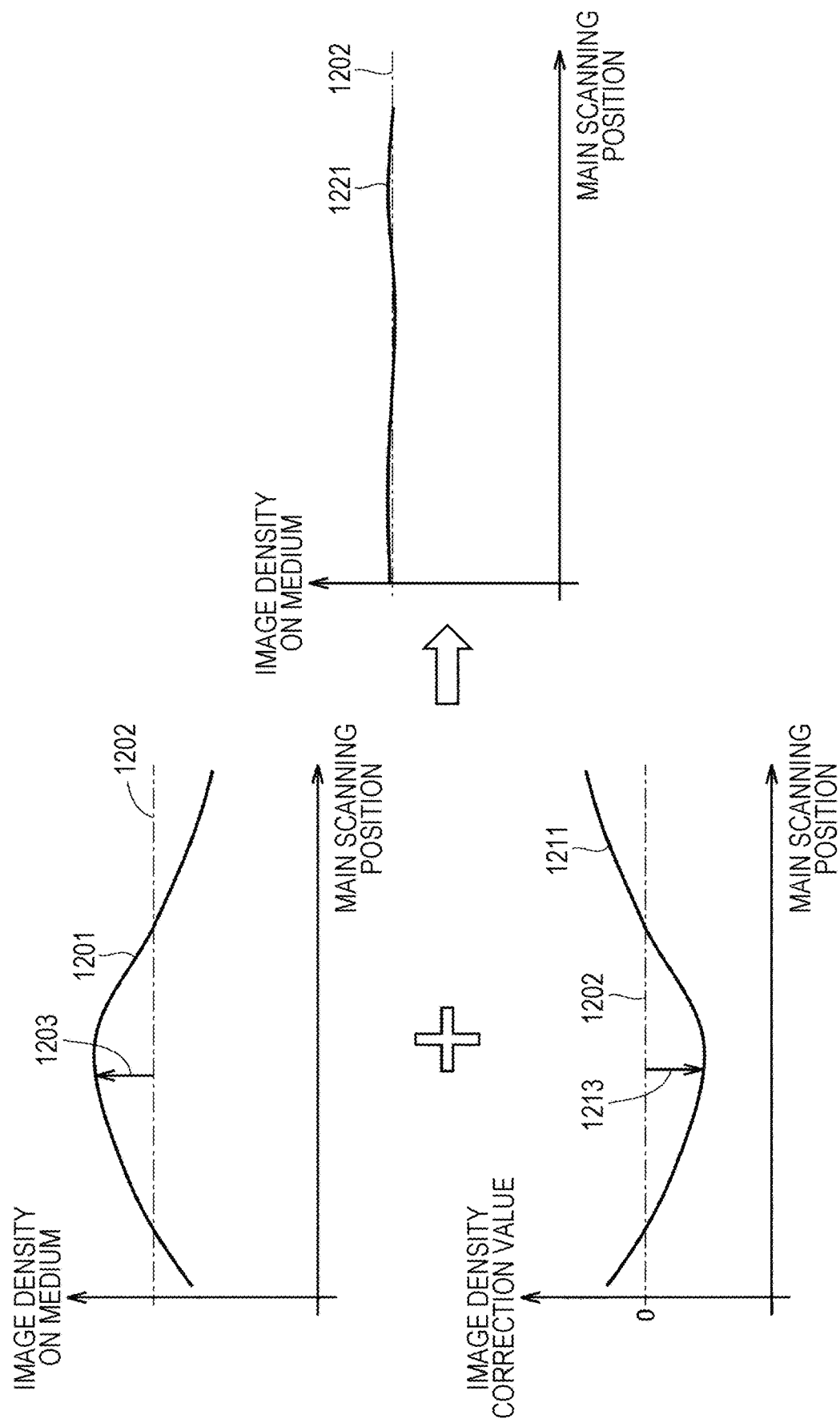
FIG. 12 is a view illustrating an example of an image of correction of density unevenness.

FIG. 12 is a diagram illustrating an example of an image of correction of density unevenness. As an example, the image forming device 100 can measure the density unevenness of the base toner and the color developing toner in the main scanning direction by measuring the density unevenness measurement patch illustrated in FIGS. 6, 9, 10, and 11.

A graph 1201 is an example of measured toner density unevenness. According to the graph 1201, it can be seen that the density of the measured toner is not constant for respective positions in the main scanning direction (also referred to as "main scanning position"). The graph 1201 desirably matches the target value 1202 of the image density. However, according to the actual measurement result, there is a density deviation 1203 between the graph 1201 and the target value 1202 of the image density. The density deviation 1203 is obtained for each main scanning position.

The image forming device 100 generates a correction graph 1211 for correcting the measured toner density unevenness based on the graph 1201 and the target value 1202. More specifically, the image forming device 100 generates a correction value obtained by inverting the density deviation 1203 for each main scanning position, and obtains the correction graph 1211 from the correction value. The image forming device 100 suppresses the density unevenness in the main scanning direction occurring at the time of printing by adding the value of the correction graph 1211 to the document image information. A graph 1221 illustrates an example of the corrected density unevenness in the main scanning direction.

Note that the value of the correction graph 1211 of each color is added to the document image information. For example, when color developing toners in four colors of YMCK are used for printing, the values of the correction graphs 1211 in the four colors of YMCK are added to the document image information.

In an aspect, the image forming device 100 may store the correction graph 1211 as a look-up table in a memory or a storage. In this case, the correction graph 1211 can be expressed as a discrete value of the correction value. As described above, the image forming device 100 can appropriately measure the density unevenness of each toner and correct the print setting of each toner even when various printing conditions such as the type of the medium 120, the presence or absence of the base toner, whether the base toner is the white toner, the type of toner, whether the halftoning method for halftone representation is used, or the type of the halftoning method are different by selectively using variations of the density unevenness measurement patch. Note that the halftoning method is a method of configuring the number of lines, an angle, a screen, or the like of an AM screen by a shape such as a circle, a rectangle, or a line of a minute pattern, error diffusion, an FM screen, or the like.

(b. Gradation Adjustment Patch)

Next, variations of the gradation adjustment patch will be described. The image forming device 100 selectively uses variations of the gradation adjustment patch mainly based on whether the base toner is used.

Figure 13:
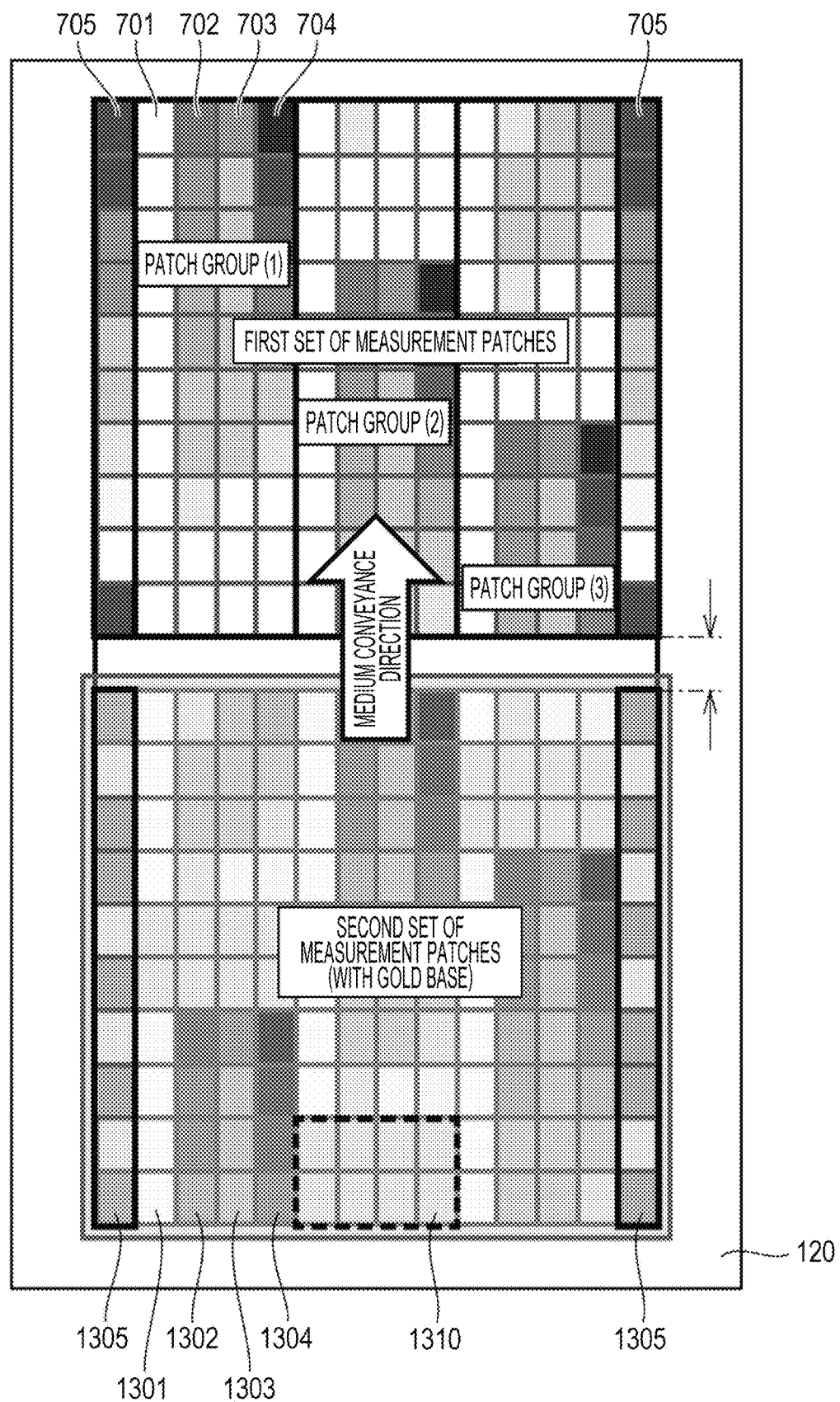
FIG. 13 is a view illustrating a modification of a gradation adjustment patch.

FIG. 13 is a diagram illustrating a modification of the gradation adjustment patch. In the example of FIG. 13, the image forming device 100 uses one or more S color toners as color developing toners in addition to the basic toners such as YMCK. The S color (Special color, additional color or spot color) toner may include red, blue, and fluorescent magenta, for example. In addition, the S color toner may be used in monochrome or may be mixed with another toner to be used for color gamut expansion. For example, a metallic color such as silver or gold may be used as the S color. In this case, by superimposing the image of each color developing toner on the image of the S color toner, a metallic image of each color tone can be obtained. In addition, the S color may include a base toner such as a white toner, and a finishing toner (also referred to as a covering material) such as a clear toner.

In a case where one or more S color toners are used as color developing toners, the image forming device 100 also includes an S color patch in the gradation adjustment patch. More specifically, the image forming device 100 includes, in the gradation adjustment patch, a monochromatic gradation patch with the S color toner, a monochromatic halftone patch, a mixed color patch including other basic colors, and the like as necessary.

The first set of measurement patches in FIG. 13 is gradation adjustment patches of only YMCK. The second set of measurement patches is a gradation adjustment patch to which a metallic color (S color) is added. More specifically, the second set of measurement patches is printed on the base image of metallic color (for example, gold metallic color or the like). That is, the patches 1301, 1302, 1303, and 1304 of respective colors of YMCK are printed on the base image. In addition, since the base image itself is also a printing target, the second set of measurement patches also includes a patch region 1310 of only the base image.

A patch 1305 is a marker (crossmark) for patch position extraction. On white paper or the like, the crossmark with the black toner is used. However, when a black toner patch is printed on the base image in metallic color, the image scanner 110 may have difficulty in recognizing the patch. Therefore, the image forming device 100 prints the patch 1305 by combining the metallic color and a color (cyan or the like) that is easily recognized on the metallic color (for example, gold metallic color or the like). In an aspect, a color having a complementary color relationship with the base color may be selected as the color of the patch of the crossmark.

In an aspect, the image forming device 100 can change the gradation adjustment patch to be printed according to the characteristics of the color developing toner in S color. For example, in a case where the color developing toner in S color is used as a spot color (a color frequently appearing in an image, characterizing the image), there is a possibility that a halftone of the spot color may be used, but there is a low possibility that the color is expressed by superimposing the toner of the spot color on another color developing toner. In such a case, the gradation adjustment patch may not include a mixed color of the S color toner and another color developing toner. On the other hand, an S-color developing toner may be used for color mixing with another color developing toner. In such a case, the gradation adjustment patch may include a mixed color of the S color toner and another color developing toner. As described above, the required patch configuration varies depending on the characteristics or the use method of the added S color toner. Therefore, the image forming device 100 can change the configuration of the patch according to the characteristics or the use method of the added S color toner. In addition, the image forming device 100 can select the background plate 303 and change the reading setting of the image scanner 110 according to the changed patch configuration.

In another aspect, the image forming device 100 may receive identification of toner or setting of a gradation adjustment patch from an operator in advance. This is because the replenishment and preparation of the toner are not frequently performed, and thus the image forming device 100 can use the setting once input for a long period of time.

In another aspect, in a case where there is a toner (replenished or replaced toner or the like) having an update history since the previous patch printing, the image forming device 100 may evaluate the characteristic by printing and reading a patch of the toner having the update history. For example, the image forming device 100 may print and read a solid of the toner having an update history and a monochrome patch of halftone of each gradation, and evaluate the characteristics of the toner having an update history from a change state of the reading gradation. When the degree of change in the reading gradation is large, the image forming device 100 can evaluate that the toner having the update history is the color developing toner (furthermore, a spot color toner for an intermediate color gamut with respect to the basic color, an additional color developing toner for a large color gamut). Otherwise (when the degree of change in the reading gradation is small), the toner having the update history can be evaluated as a covering material such as clear toner. Alternatively, the image forming device 100 may display information about the toner having an update history on the operation display unit 102 and cause the operator to select a characteristic of the toner having an update history.

In another aspect, the image forming device 100 may randomly arrange the patches of the base toner in the first set and the second set of measurement patches. In another aspect, the image forming device 100 may arrange the patches of the base toner in the first set and the second set of measurement patches in a predetermined procedure. In this way, the image forming device 100 can improve the density unevenness in the gradation adjustment patch, reduce the interaction between adjacent patches, and perform leveling.

In another aspect, the image forming device 100 may thin out some of the patches included in the gradation adjustment patch according to the number of toners (the number of colors) used for printing. When the number of toners used for printing increases, the number of patches included in the gradation adjustment patch also rapidly increases. Therefore, the image forming device 100 may thin out the number of gradations of some patch groups according to the priority of each of the plurality of patches, or may not print some patch groups. For example, the image forming device 100 may be configured in three levels of 100%, 80%, and 60% obtained by thinning out the number of gradations with low priority from five levels of 100%, 80%, 60%, 40%, and 20% of the number of gradations of the toner of the gradation adjustment patch.

The image forming device 100 can set a priority for each patch (image) to be printed, such as a solid of a basic color toner, a halftone of a basic color toner, a solid of a color developing toner, a mixed color solid of basic color toners, and a mixed color solid of a basic color toner and another color developing toner. In addition, the image forming device 100 may set a coefficient corresponding to the priority for each patch.

The priority may also include information about the presence or absence of the covering material. For example, the image forming device 100 may set different priorities for each of the "combination of a solid of the basic color toner and a covering material" and the "basic color toner". Alternatively, the image forming device 100 may multiply, divide, add, or subtract a coefficient for the priority of each patch depending on the presence or absence of the covering material. Furthermore, the image forming device 100 may dynamically change the priority of each patch based on the print history (with reference to the frequency of use of the toner and the like).

In another aspect, the image forming device 100 may identify a toner (or a combination of toners) having the best discriminability of the crossmark based on the combination of the medium 120 and the toner, and use the crossmark at the time of patch printing. This is because what kind of toner image is preferably used for the crossmark differs depending on the configuration of the toner, the characteristic of the medium 120, and the background plate 303. This applies not only to the rectangular crossmarks as illustrated in FIGS. 7 and 13, but also to the cross crossmarks as illustrated in FIGS. 6 and 9 to 11 and the marker 812 as illustrated in FIG. 8. Therefore, in another aspect, also at the time of printing the density unevenness measurement patch or the real-time adjustment patch, the image forming device 100 may identify the toner (or the combination of toners) having the best discernability of the crossmark based on the combination of the medium 120 and the toner, and use the crossmark at the time of patch printing.

In another aspect, the image forming device 100 may change the size, the shape, the number, and the like of the crossmark based on the type of the medium 120 or the toner. For example, the crossmark printed on a base image of a metallic color toner that reflects light, the crossmark printed on a medium other than white paper, and the like may lack clarity. In such a case, the image forming device 100 may increase the size of the crossmark (thicken the line in the case of the cross crossmark), print the crossmarks regularly and repeatedly, or change the printing pattern of the plurality of crossmarks so that the image scanner 110 can easily read the crossmarks. In the example of FIG. 13, cyan patches are printed at 5 locations on both sides of the gradation adjustment patch. In addition, one of them has a double size. By disposing the crossmarks characteristically in this manner, it is possible to improve the accuracy of reading the crossmarks by the image scanner 110.

The rectangular crossmark is used for positioning the gradation adjustment patch. Therefore, the image forming device 100 may not necessarily use the patch 705 with the black toner without the base image and the patch 1305 with the base toner and the cyan toner in combination. The image forming device 100 may use a crossmark including the most easily readable color or combination of the colors based on the combination of the medium 120, the toner type, and the background plate 303. As an example, when the boundary between the cyan patch and the magenta patch printed on the base image of the metallic color is easy to identify, the image forming device 100 may use the boundary line between the cyan patch and the magenta patch printed as a crossmark.

Figure 14:
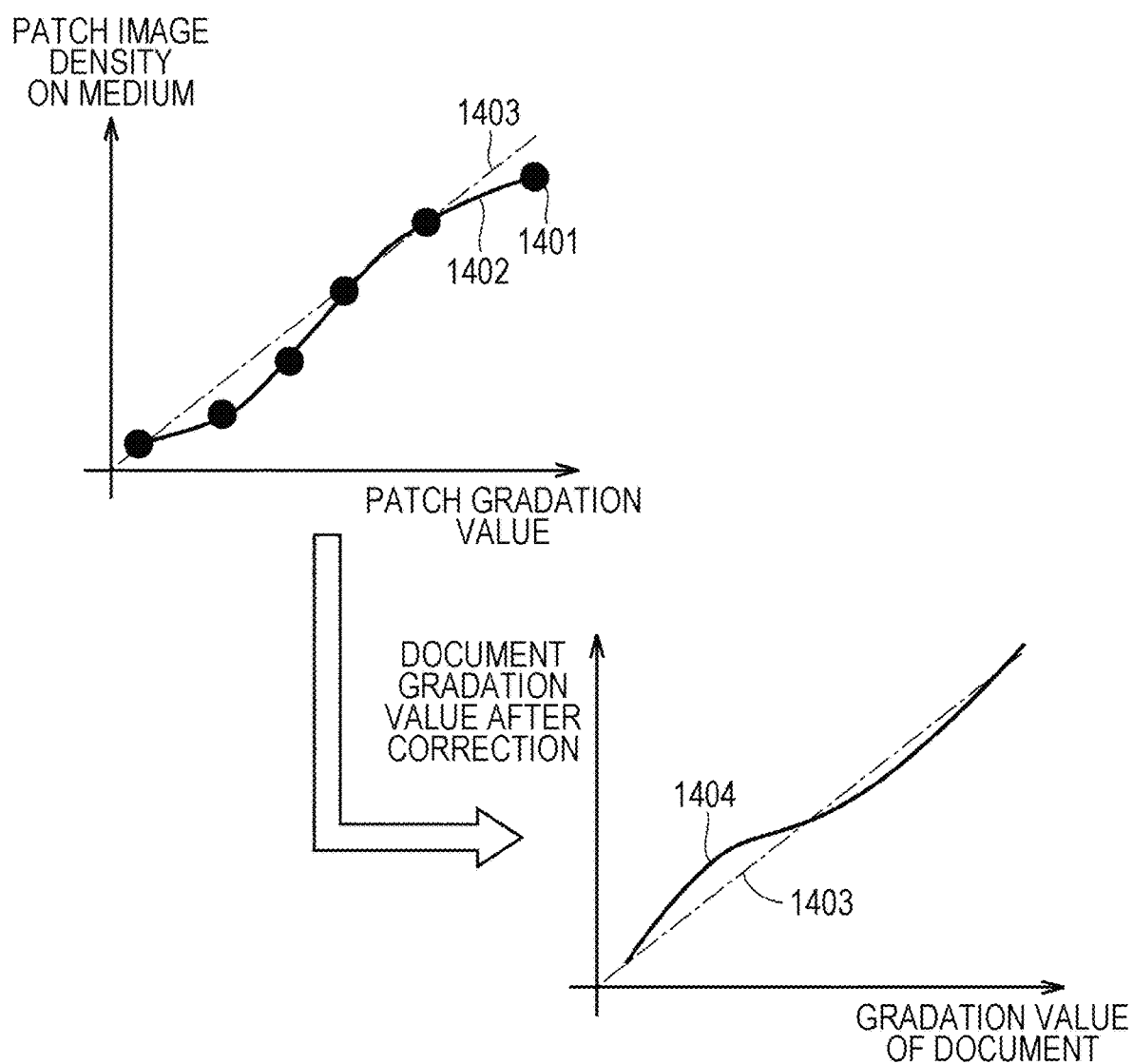
FIG. 14 is a diagram showing an example of a gradation correction curve.

FIG. 14 is a diagram illustrating an example of a gradation correction curve. The image forming device 100 obtains a measured value of the image density of each patch by reading the gradation adjustment patch. A point 1401 is an image density for each gradation value of a certain toner. In the example of FIG. 14, there are 6 points 1401. That is, the image forming device 100 acquires image densities of a certain toner at six gradation values. The image forming device 100 generates a graph 1402 or an expression of the graph 1402 from the set of points 1401. Note that the image forming device 100 executes acquisition of the points 1401 and generation the graph 1402 or the expression for the graph 1402 by the number of toners included in the gradation adjustment patch. For example, when the number of toners included in the gradation adjustment patch is 5, the image forming device 100 generates five graphs 1402 or respective expressions for the graphs 1402.

A graph 1403 is a graph of the target density, and shows an ideal correlation between the gradation value and the image density in each toner. The image forming device 100 brings the graph 1402 close to the graph 1403 to suppress density unevenness of each toner for each gradation. More specifically, the image forming device 100 generates the graph 1404 of the gradation correction curve from the graph 1402 or the expression for the graph 1402. The graph 1404 is obtained by inverting the graph 1403 with respect to the graph 1402, for example. In practice, the graph 1404 may be represented as a look-up table (including respective points (discrete values) of the graph 1404). The image forming device 100 can suppress the density unevenness of each toner for each gradation by correcting the print setting of each toner with the values of the look-up table. Note that the image forming device 100 generates look-up tables by the number of toners included in the gradation adjustment patch, and stores the look-up tables in a memory or a storage. At the time of performing printing, the image forming device 100 acquires a look-up table of each toner generated in the past from the memory or the storage, and reflects values of the look-up table of each toner in the print setting of each toner.

(c. Real-Time Adjustment Patch) Next, variations of the real-time adjustment patch will be described. The image forming device 100 selectively uses variations of the real-time adjustment patch mainly based on whether the base toner and/or the covering material (clear toner or the like) is used.

Figure 15:
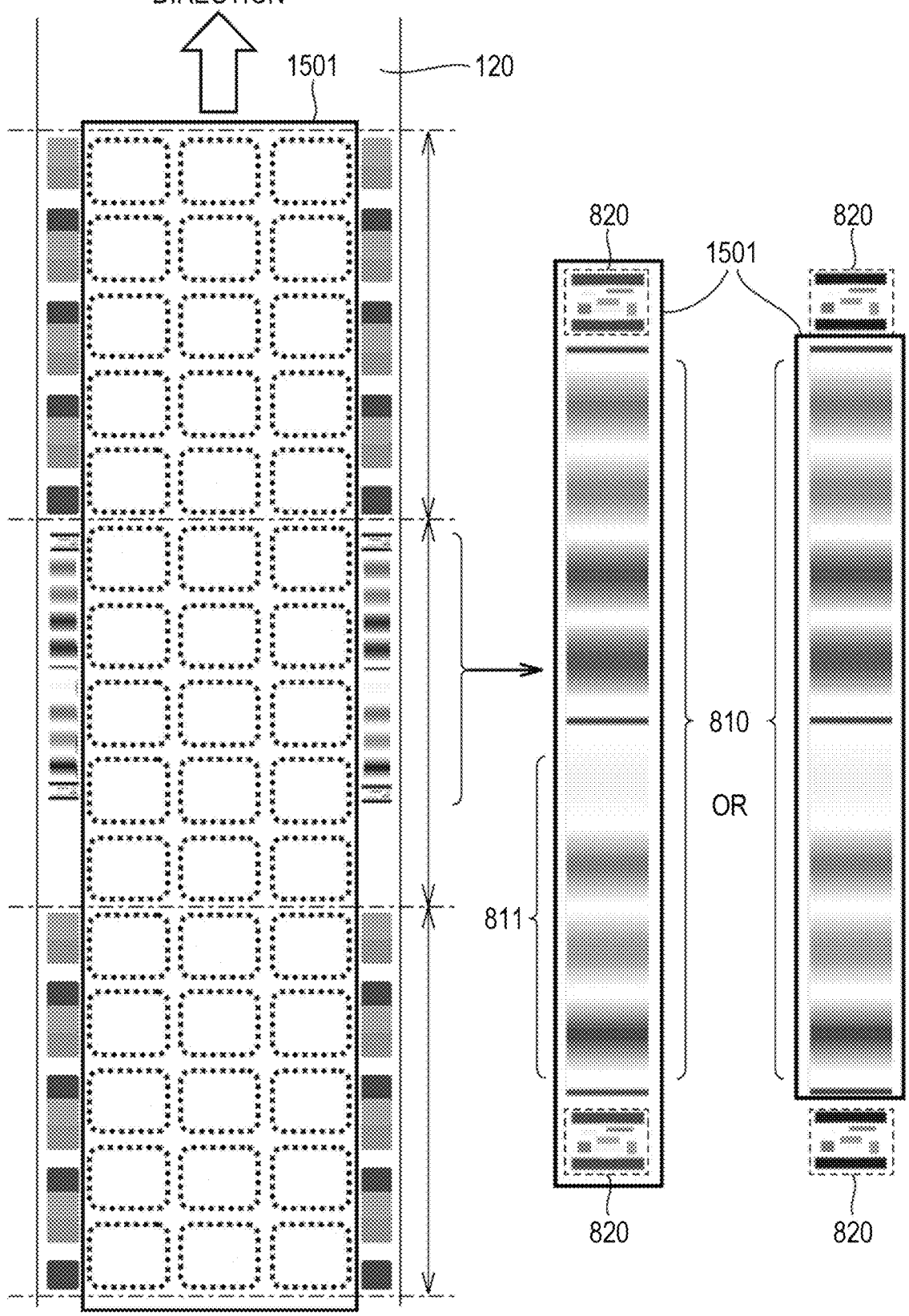
FIG. 15 is a diagram illustrating a first modification of the real-time adjustment patch.

FIG. 15 is a diagram illustrating a first modification of the real-time adjustment patch. In the example of FIG. 15, the image forming device 100 prints an image with the color developing toner on the base image 1501 with the base toner.

In such a case, the image forming device 100 may print the base image 1501 on the medium 120 so as to include all of the real-time gradation patch 810 and the color resist measurement patch 820. In this way, the image forming device 100 can read the real-time gradation patch 810 printed on the base image 1501. That is, the image forming device 100 can read the real-time gradation patch 810 printed under the same condition as the user content. In this way, the image forming device 100 can appropriately measure the change in gradation and color tone of each color included in the user content, and can correct the print setting of each color.

In an aspect, the image forming device 100 may print the base image 1501 on the medium 120 so as to include the real-time gradation patch 810 while avoiding the color resist measurement patch 820. In this way, the image forming device 100 can suppress the influence of noise such as reflection by the metallic-color base image 1501 on the color resist measurement patch 820. Then, the image forming device 100 can read the real-time gradation patch 810 printed under the same condition as the user content.

Note that the image forming device 100 may configure the real-time adjustment patch 800 so as to include both a portion where the base image 1501 is printed and a portion where the base image is not printed. In this way, the image forming device 100 can read the characteristic of the medium 120 itself and more accurately identify the color resist measurement patch 820 directly printed on the medium 120. Alternatively, the image forming device 100 may acquire the characteristic of the medium 120 by reading the margin between the patch and the patch.

In another aspect, in a case where using a covering material such as clear toner for adjusting glossiness, the image forming device 100 may print a finished image by the covering material on the medium 120 so as to include all of the real-time gradation patch 810 and the color resist measurement patch 820. In this way, the image forming device 100 can read the real-time gradation patch 810 printed under the same condition as the user content even when using the covering material.

In another aspect, in a case where using a covering material such as clear toner for adjusting glossiness, the image forming device 100 may print a finished image by the covering material so as to include the real-time gradation patch 810 while avoiding the color resist measurement patch 820. In this way, the image forming device 100 can suppress the influence of noise such as reflection by a finished image such as clear toner on the color resist measurement patch 820. Then, the image forming device 100 can read the real-time gradation patch 810 printed under the same condition as the user content.

In another aspect, the image forming device 100 may appropriately change the color (the color of the gradation image 811) constituting the real-time gradation patch. As an example, the gradation image 811 may include all or some of reference colors (for example, YMCK), a mixed color of the reference colors (for example, a secondary color, a tertiary color), and a spot color (a special color designated by the user).

As an example, in a case where the toner to be added to the reference color toner is a color developing toner, the image forming device 100 may identify the hue of the toner to be added based on the reading result of the pre-patch, and further determine a basic color to be a substitute for the toner, and replace the patch configuration of the gradation image 811.

Note that, since it is convenient to identify whether the color of the printed patch is a basic color (alternative basic color) or a spot color (color of toner to be added), the image forming device 100 may cause the color resist measurement patch 820 to have color information (whether a spot color is included, or the like) included in the gradation image 811 by selectively using the plurality of patterns of color resist measurement patches 820. For example, an added spot color (for example, monochromatic "red": R toner) and a patch color (for example, a mixed color "red" obtained by superimposing M, Y, and the like) prepared in advance as a basic color have a similar color tone, but have different rendering methods. Therefore, the added spot color and the patch color prepared in advance may have different color tone rendering stability depending on the situation of the printing machine. Therefore, the image forming device 100 desirably changes the appearance frequency of the added spot color and the patch color prepared in advance in the real-time adjustment patch according to the situation. By selectively using the plurality of patterns of the color resist measurement patches 820 as described above, the image forming device 100 can determine whether the read patch is an added spot color or a patch color prepared in advance, and can calculate the appearance frequency of each color patch. The image forming device 100 can improve the appearance frequency of the patch of the toner having lower stability by changing the appearance frequency of the added spot color and the patch color prepared in advance based on the discrimination result of the patch color and the calculated appearance frequency of each color patch.

Figure 16:
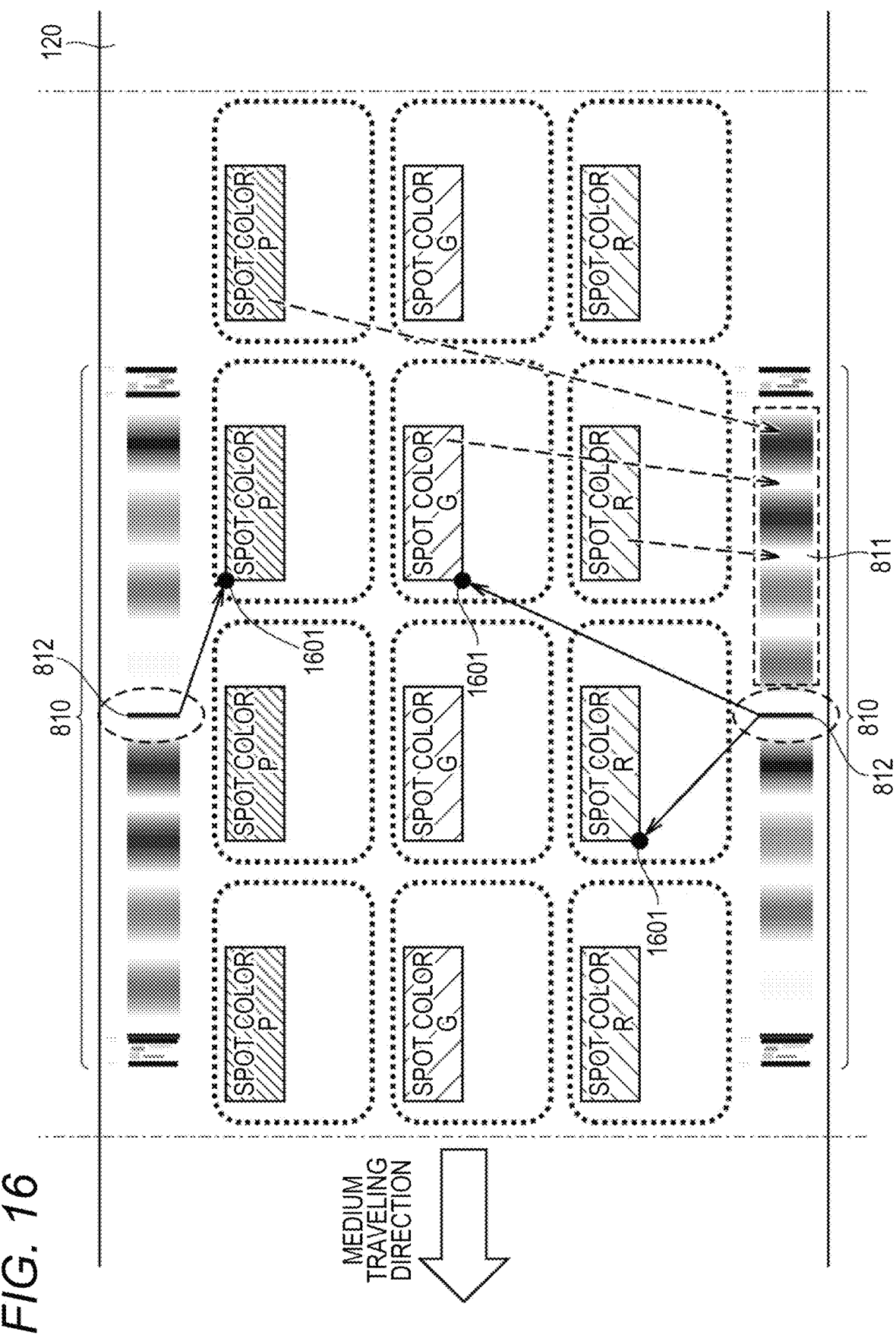
FIG. 16 is a diagram illustrating a second modification of the real-time adjustment patch.

FIG. 16 is a diagram illustrating a second modification of the real-time adjustment patch. In the example of FIG. 16, the image forming device 100 prints an image including a spot color on the medium 120.

The spot color is a color that characterizes user content. In label printers and the like, these spot colors may occupy an important position of the quality or commercial value of printed matter. As the spot color, for example, a mixed color of reference colors such as YMCK or a dedicated spot color toner (fluorescent color or the like) may be used. An image with a spot color may be printed on a base image in a metallic color. When spot colors are used for user content, it is necessary to maintain the quality of these spot colors in addition to maintaining the quality of the reference colors by the real-time adjustment patch 800.

Therefore, the image forming device 100 uses an image of a spot color that highly frequently appears on the user content as an inspection image (real-time adjustment patch for the spot color).

In the example of FIG. 16, a spot color P, a spot color G, and a spot color R repeatedly appear in the user content. The image forming device 100 (image scanner 110) reads the spot color P, the spot color G, and the spot color R that repeatedly appear. More specifically, the image forming device 100 calculates the position of the spot color from the job information about the user content. As an example, the image forming device 100 may calculate the position of each spot color as a relative position from a marker 812. In the example of FIG. 16, the image forming device 100 calculates the relative position 1601 of each of the spot color P, the spot color G, and the spot color R with respect to the marker 812.

The image forming device 100 (image scanner 110) can detect a density change or the like of each spot color by repeating processing of reading each spot color at the relative position 1601. The image forming device 100 can correct the print setting of each spot color based on the detected density change in each spot color.

The spot color highly frequently appears in the user content. Therefore, in an aspect, the image forming device 100 may read some of the spot color images on the user content (for example, reading spot color images that appear at regular intervals) and perform the print setting correction process. Further, the image forming device 100 may read all the spot color images on the user content and perform the print setting correction process.

As described above, the image forming device 100 can maintain the quality of the spot color image by using the spot color image in the user content as the inspection image. Further, the image forming device 100 can use the real-time adjustment patch 800 specialized for reading basic colors. As a result, the image forming device 100 can read the real-time adjustment patch 800 of the basic color with highly frequency, and can also maintain the quality of the image using the basic color at a high level. Alternatively, the image forming device 100 may replace some of the colors of the gradation image 811 with a spot color. For example, the image forming device 100 may delete a color having a low use frequency from the gradation image 811 and add a spot color to the gradation image 811 instead.

In an aspect, in a case where the area of the spot color image in the user content is small and there is a possibility that the accuracy of reading the spot color image by the image scanner 110 is affected, the image forming device 100 may display a warning message on the operation display unit 102.

In another aspect, in a case where the area of the spot color image in the user content is small and there is a possibility that the accuracy of reading the spot color image by the image scanner 110 is affected, the image forming device 100 may reduce the ratio of the participation of the inspection image (spot color reading result) in the user content in the print setting correction process.

In another aspect, the image forming device 100 may change various settings of the image reading process of the image scanner 110 based on various conditions such as the characteristic of the medium 120, the presence or absence of use of the base toner and the covering material. The various settings can include, for example, a change in the background plate 303 at the time of a reading process of the image scanner 110, adjustment of an exposure condition of the image scanner 110, and the like.

As an example, since the user content is a product to be delivered to the client, the image forming device 100 cannot improve the accuracy of reading the image scanner 110 by superimposing the base image on the user content. Therefore, when reading the spot color image included in the user content, the image forming device 100 may set the color and/or the exposure condition of the background plate 303 at the time of reading in accordance with the user content.

In addition, it is assumed that the accuracy of reading the real-time adjustment patch 800 decreases when the image forming device 100 performs various settings of the image reading process of the image scanner 110 in accordance with the user content. In such a case, the image forming device 100 may add a base image with the white toner to the real-time adjustment patch 800. As a result, the image forming device 100 can read the spot color in the user content and the real-time adjustment patch 800 with high accuracy.

Figure 17:
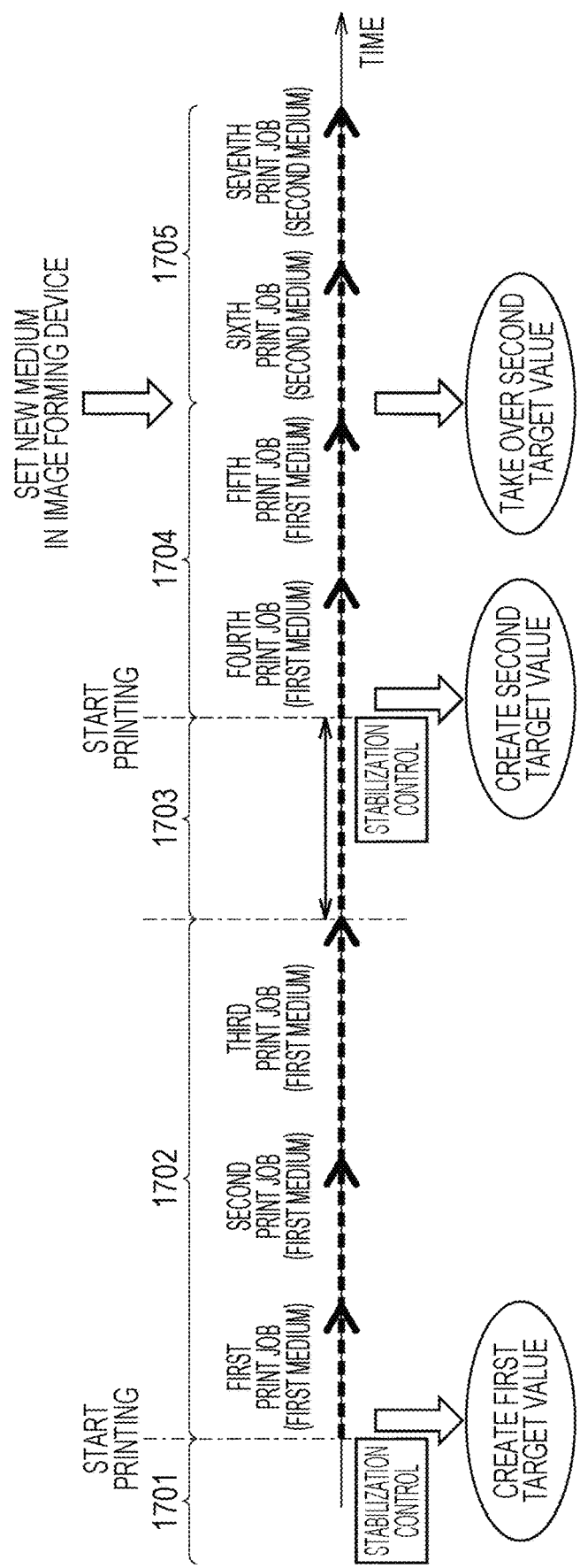
FIG. 17 is a diagram illustrating an example of timing at which the image forming device uses each patch.

FIG. 17 is a diagram illustrating an example of timing at which the image forming device 100 uses respective patches. Timing at which the image forming device 100 uses various patches will be described with reference to FIG. 17. The operation of the image forming device 100 when the medium 120 is replenished or replaced will also be described.

The image forming device 100 alternately repeats a stabilization process (adjustment of print settings, etc.) and a printing process. The printing process may include executing the job a plurality of times.

Referring to FIG. 17 as an example, first, the image forming device 100 executes a stabilization process 1701. In the stabilization process 1701, the image forming device 100 adjusts settings of charging, exposure, and development executed by the image former 104. In addition, the image forming device 100 also executes various kinds of adjustment for maintaining the characteristics of potential control and the like at the time of transferring the developed toner image from the photosensitive member to the intermediate transfer belt in a predetermined state. In addition, in the stabilization process 1701, the image forming device 100 can perform printing and reading of the density unevenness measurement patch as illustrated in FIG. 6, FIG. 9, FIG. 10, or FIG. 11, and printing and reading of the gradation adjustment patch as illustrated in FIG. 7 or FIG. 13. Based on the read information, the image forming device 100 creates a first target value (which is a target value of the gradation value of the document, and corresponds to the graph 1404 of the gradation correction curve of FIG. 14 and the like. Further, the target value of the gradation value of the document may be included in the print setting). Since the stabilization process 1701 is a process before execution of the first print job, it can be said that the image forming device 100 has determined the first target value (or print setting) in the stabilization process 1701. The density unevenness measurement patch and the gradation adjustment patch can be created once or a plurality of times during the execution of the stabilization process.

Next, the image forming device 100 executes a printing process 1702. The printing process 1702 includes a first print job, a second print job, and a third print job. The image forming device 100 continues the printing process 1702 until a change in the environment (change in temperature, humidity, or the like) of the image forming device 100 (the periphery of the image former 104 or the like) is detected or the printing process on the predetermined amount of medium 120 is completed (that is, printing of one job is completed). In the printing process 1702, the image forming device 100 performs printing and reading of the real-time adjustment patch as illustrated in FIG. 8, FIG. 15, or FIG. 16. The image forming device 100 corrects the target value based on the read information. Note that the real-time adjustment patch may be created once or a plurality of times (often a plurality of times according to the length of the print job (number of pages, printed distance, etc.)) during execution of the job print job.

Next, the image forming device 100 executes a stabilization process 1703. In the stabilization process 1703, the image forming device 100 performs printing and reading of the density unevenness measurement patch and printing and reading of the gradation adjustment patch again. The image forming device 100 newly creates a second target value based on the read information.

Next, the image forming device 100 executes a printing process 1704. The printing process 1704 includes a fourth print job and a fifth print job. In the printing process 1704, the image forming device 100 performs printing and reading of the real-time adjustment patch again. The image forming device 100 corrects the target value based on the read information.

After executing the fifth print job, since the medium 120 runs out, the operator sets a new medium 120 in the image forming device 100. At this time, the image forming device 100 determines whether to take over the target value (second target value) used in the immediately preceding print job to the print setting of the newly set medium 120.

More specifically, the image forming device 100 reads the characteristic of the medium 120 every time the medium 120 is set in the image forming device 100, and stores the characteristic of the medium in a memory or a storage. Then, when the medium 120 is replenished or replaced, the image forming device 100 compares the characteristic of the medium 120 (first medium in FIG. 17) used until immediately before with the characteristic of the medium 120 (second medium in FIG. 17) newly set in the image forming device 100. When the characteristics of the first medium and the characteristics of the second medium are the same or a difference therebetween is equal to or less than a predetermined threshold value, the image forming device 100 determines that the first medium and the second medium are the same type of medium and takes over the second target value. Otherwise (when determining that the first medium and the second medium are different types of media), the second target value is not taken over.

In an aspect, the image forming device 100 may store the characteristics of each medium 120 used in the past printing and the target value (the gradation value of the document) in a memory or a storage. In this case, the image forming device 100 compares the characteristic of the medium 120 newly set in the image forming device 100 with the characteristics of the each medium 120 used in the past. In this way, in a case where there is a target value of the medium 120 that matches or is similar to the new medium 120, the image forming device 100 can use the target value.

In another aspect, in a case where not taking over the target value of the immediately preceding print job, the image forming device 100 newly sets the target value. The new target value may be, for example, a target value (ideal target value) corresponding to the graph 1403.

In another aspect, the image forming device 100 may correct the taken over target value or the new target value during execution of the print job. More specifically, the image forming device 100 may read the real-time adjustment patch during execution of the print job, and correct the taken over target value or the new target value based on the result.

In another aspect, the image forming device 100 may create a combined target value obtained by combining the target value of the new medium 120 and the target value of the medium 120 (old medium) used in the immediately preceding print job. In this case, the image forming device 100 may print the image on the new medium 120 using the combined target value. In this way, the print result of the new medium 120 and the print result of the old medium 120 can be brought closer to each other. For example, the image forming device 100 can prevent a change in the printed image from occurring for each printing lot.

In another aspect, the image forming device 100 may use the toner image sensor 109 to determine whether the medium 120 has been replaced with a different type of medium 120. For each medium 120 used by the image forming device 100, there is a medium 120 that exhibits similar characteristics in reading by the image scanner 110 but is different from each other. For example, thick coated paper having high degree of whiteness and paper having a high degree of whiteness, bulkiness, and many voids exhibit similar characteristics in reading by the image scanner 110. Therefore, the image forming device 100 may recognize these media as the same medium 120. However, when an image is printed, an image of coated paper tends to have a higher density than an image of paper having a high degree of whiteness, bulkiness, and many voids.

Therefore, the image forming device 100 acquires density information about the toner image on the intermediate transfer belt acquired from the toner image sensor 109, and further acquires density information about the image on the medium 120 corresponding to the toner image from the image scanner 110. Then, the image forming device 100 compares the density of the toner image with the density of the image. When there is a change in the relationship between the density of the toner image and the density of the image, the image forming device 100 determines that the medium 120 has been replaced with a different type of medium. In this way, the image forming device 100 can determine that the old medium 120 and the new medium 120 are different media even when the medium 120 (old medium) used until immediately before and the new medium 120 exhibit similar characteristics.

After replacing the medium 120, the image forming device 100 executes a printing process 1705. The printing process 1705 includes a sixth print job and a seventh print job. The image forming device 100 executes the printing process using the taken over target value or the newly set target value.

Figure 18:
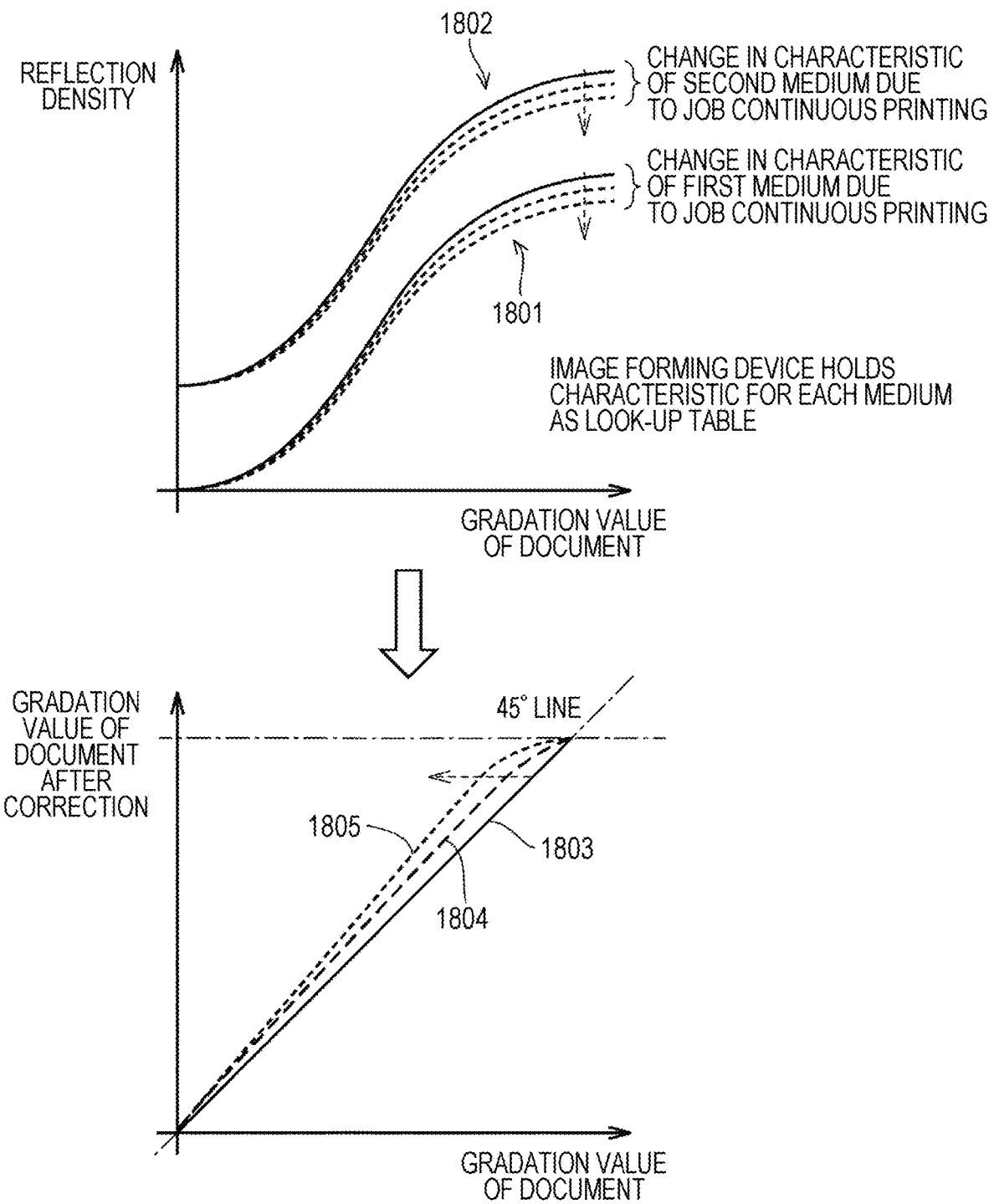
FIG. 18 is a diagram illustrating an example of adjustment of a gradation correction curve.

FIG. 18 is a diagram illustrating an example of adjustment of the gradation correction curve. The image forming device 100 stores a look-up table of the gradation correction curve for each medium 120 used for printing in the past in a memory or a storage. The gradation correction curve (or the look-up table thereof) is the target value described with reference to FIG. 17.

For example, it is assumed that the image forming device 100 has executed the printing process using the first medium and the second medium in the past. In this case, the image forming device 100 stores a look-up table of the gradation correction curve (graph 1801) of the first medium and a look-up table of the gradation correction curve (graph 1802) of the second medium in the memory or the storage. These graphs 1801 and 1802 corresponds to the first target value and the second target value, respectively, described with reference to FIG. 17.

In a case where past target values (graphs 1801, 1802, and the like) can be taken over when printing a new medium 120, the image forming device 100 uses the past target values. Otherwise, the image forming device 100 may use, for example, a gradation correction curve (straight line) (graph 1803) having an inclination of 45 degrees as a new target value. The image forming device 100 can correct the new target value stepwise by reading the real-time adjustment patch during the execution of the printing process (as in the graphs 1804 and 1805).

In an aspect, the image forming device 100 may read the real-time adjustment patch to correct the taken over target value stepwise. In another aspect, the image forming device 100 may combine (average or the like) the corrected new target value (for example, graph 1805) and the target value used for the immediately preceding print job. As a result, the image forming device 100 can suppress occurrence of a large difference in the printed image between the preceding and subsequent print jobs.

Figure 19:
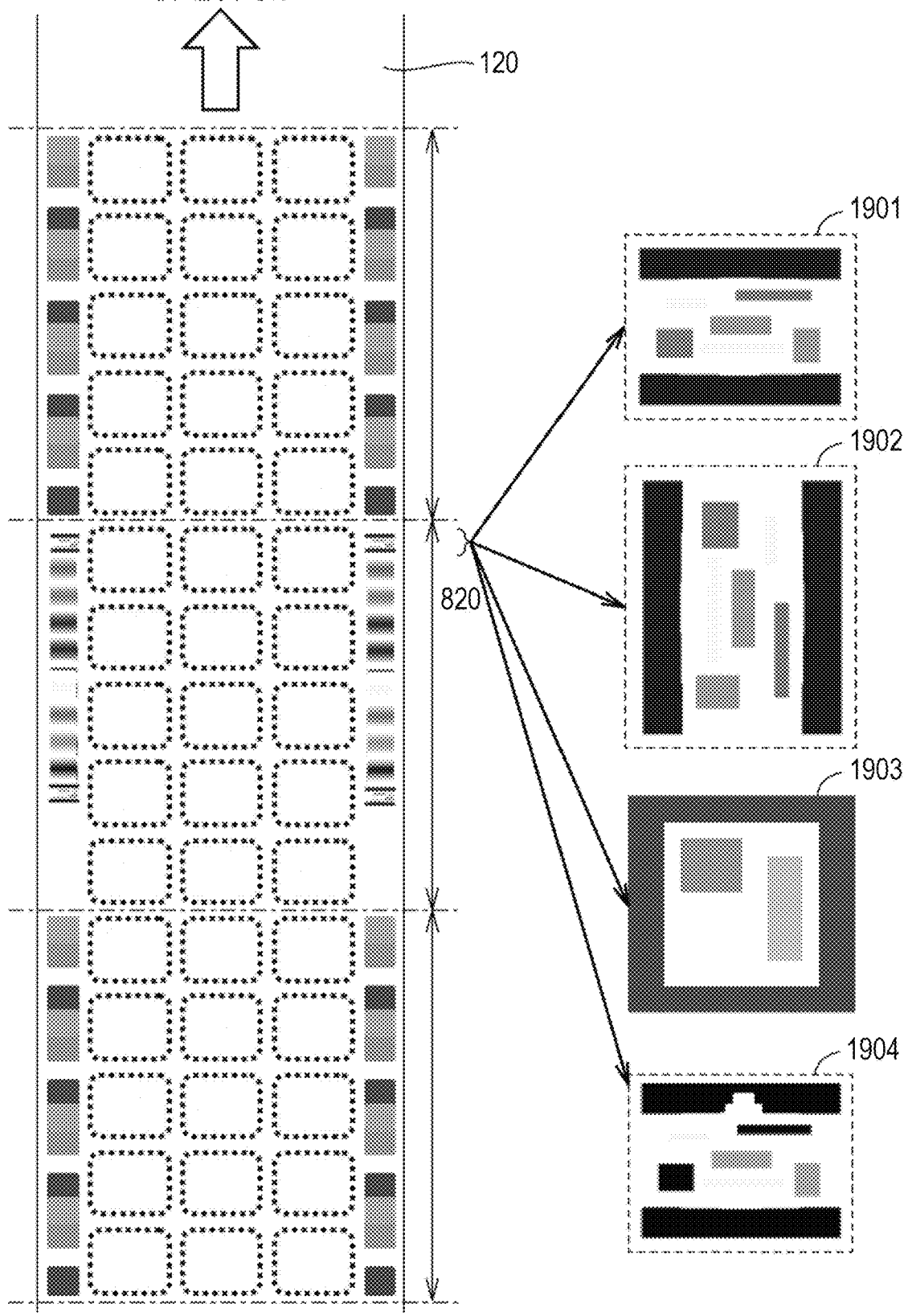
FIG. 19 is a view illustrating an example of a variation of a color resist measurement patch.

FIG. 19 is a view illustrating an example of a variation of the color resist measurement patch. The image forming device 100 can detect the printing deviation (color resist deviation) in the sub-scanning direction as described with reference to FIG. 8 by printing a color resist measurement patch 1901 on the medium 120 and analyzing the color resist measurement patch 1901.

By printing the color resist measurement patch 1902 on the medium 120 and analyzing the color resist measurement patch 1902, the image forming device 100 can detect color resist deviation (for example, it may occur due to twisting of the medium 120) in the main scanning direction by a mechanism similar to that of the color resist measurement patch 1901.

The image forming device 100 can detect both the color resist deviation in the sub-scanning direction and the main scanning direction by a mechanism similar to that of the color resist measurement patch 1901 by printing a color resist measurement patch 1903 (patch example in which black marks are in the vertical and horizontal directions) or 1904 (example patch in which a cut is made in black mark to facilitate location in lateral direction of the figure) on the medium 120 and analyzing the color resist measurement patches 1903 and 1904.

In an aspect, the image forming device 100 may use all or some of the color resist measurement patches 1901, 1902, 1903, and 1904 in combination.

<E. Patch Reading Setting and Patch Process>

Due to the type of the medium 120, the type of toner, or a combination thereof, various problems may occur in the patch reading process. Therefore, based on the type of the medium 120, the type of toner, or a combination thereof, the image forming device 100 not only selectively use the patch but also changes the patch reading setting, and process the patch for improving the patch reading accuracy.

First, with reference to FIGS. 20 to 24, an example of a problem related to the patch reading process that may occur due to the type of the medium 120, the type of toner, or a combination thereof will be described. The combination of the medium 120 and the toner illustrated in FIGS. 20 to 24 is an example. Even a combination of the medium 120 and the toner not shown in FIGS. 20 to 24 can cause a problem related to the patch reading process described later.

The solutions shown in FIG. 25 to FIG. 35 may solve at least one of the problems shown in FIG. 20 to FIG. 24. The solutions shown in FIGS. 25 to 35 may of course solve at least one of the similar problems caused by the combination of the media 120 and the toner not shown in FIGS. 20 to 24.

Figure 20:
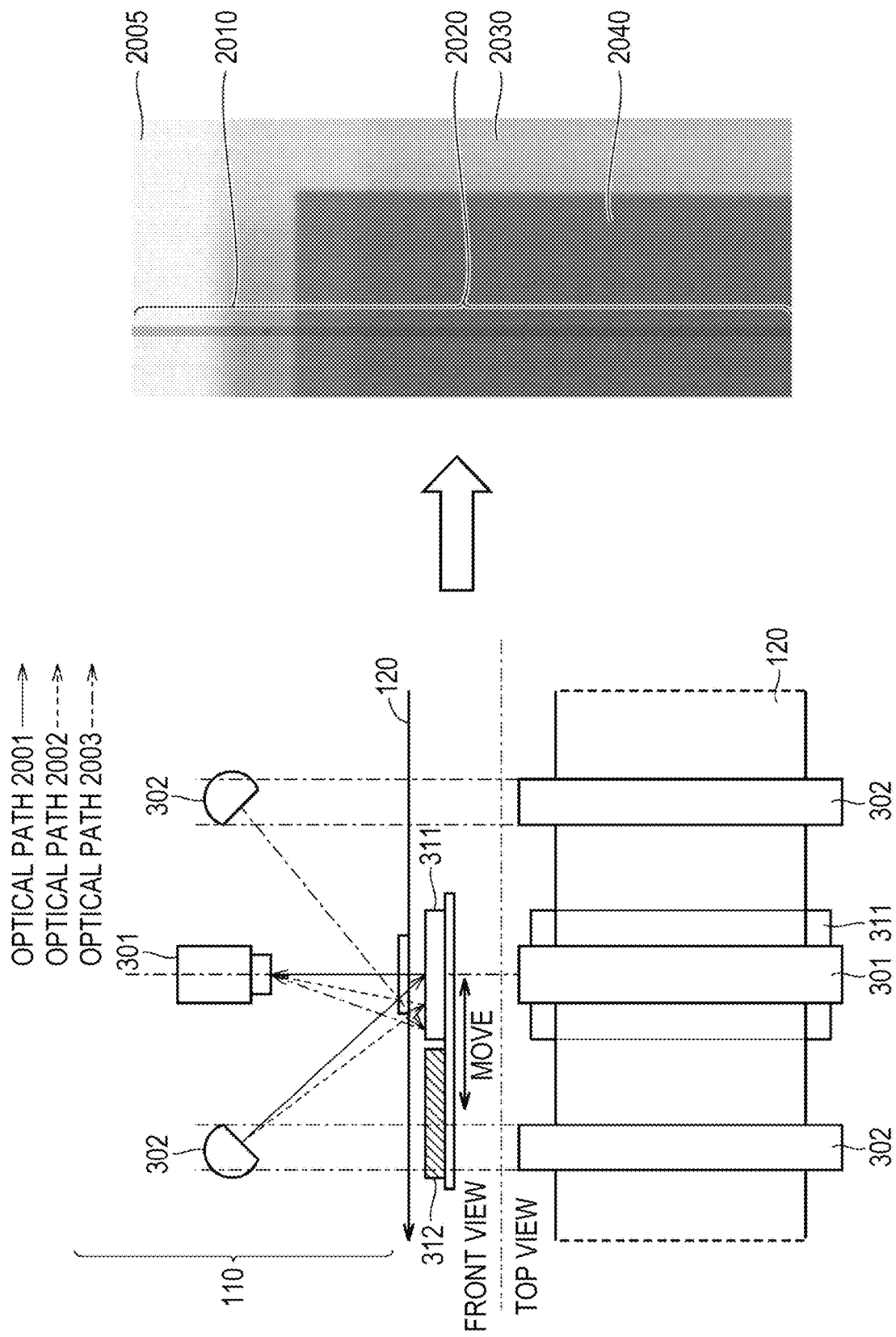
FIG. 20 is a diagram illustrating an example of a first problem in a patch reading process of the image forming device.

FIG. 20 is a diagram illustrating an example of a first problem in the patch reading process of the image forming device 100. The first problem relates to a patch shadow, a contour blur (bleeding), and the like that may occur when the transparent film or the medium 120 similar to the film is used.

In the example of FIG. 20, the image sensor 301 reads the patch on the transparent film (medium 120) using the white background plate 311. In this case, light from light 302 reaches the image sensor 301 through, for example, any one of the three optical paths 2001, 2002, and 2003.

In the optical path 2001, the light passes through the patch and the transparent film, is reflected by the white background plate 311, passes through the patch and the transparent film again, and reaches the image sensor 301.

In the optical path 2002, the light passes through the transparent film without passing through the patch, is reflected by the white background plate 311, passes through the patch and the transparent film, and reaches the image sensor 301.

In the optical path 2003, the light passes through the patch and the transparent film, is reflected by the white background plate 311, passes through the transparent film without passing through the patch, and reaches the image sensor 301.

The image sensor 301 reads each of the light having passed through any of the optical paths 2001, 2002, and 2003. In this case, the read image has noise such as a shadow and/or a contour blur (bleeding) in due to light in each path. The image 2005 is part of the read image read by the image sensor 301. At a location 2010, the patch shadow appears in the transparent film. Further, a streak 2020 is generated when dirt on white background plate 311 is reflected on the transparent film. In addition, in a location 2030, the shadow of the adjacent patch appears in the transparent film. A location 2040 is inside the patch and is less affected by shadows and the like. In addition, due to the too low contrast between the patch and the medium 120 on the outer periphery of the patch, the influence of shadow or other influences, the outer periphery of the patch may be contour blurred (bleeding).

Figure 21:
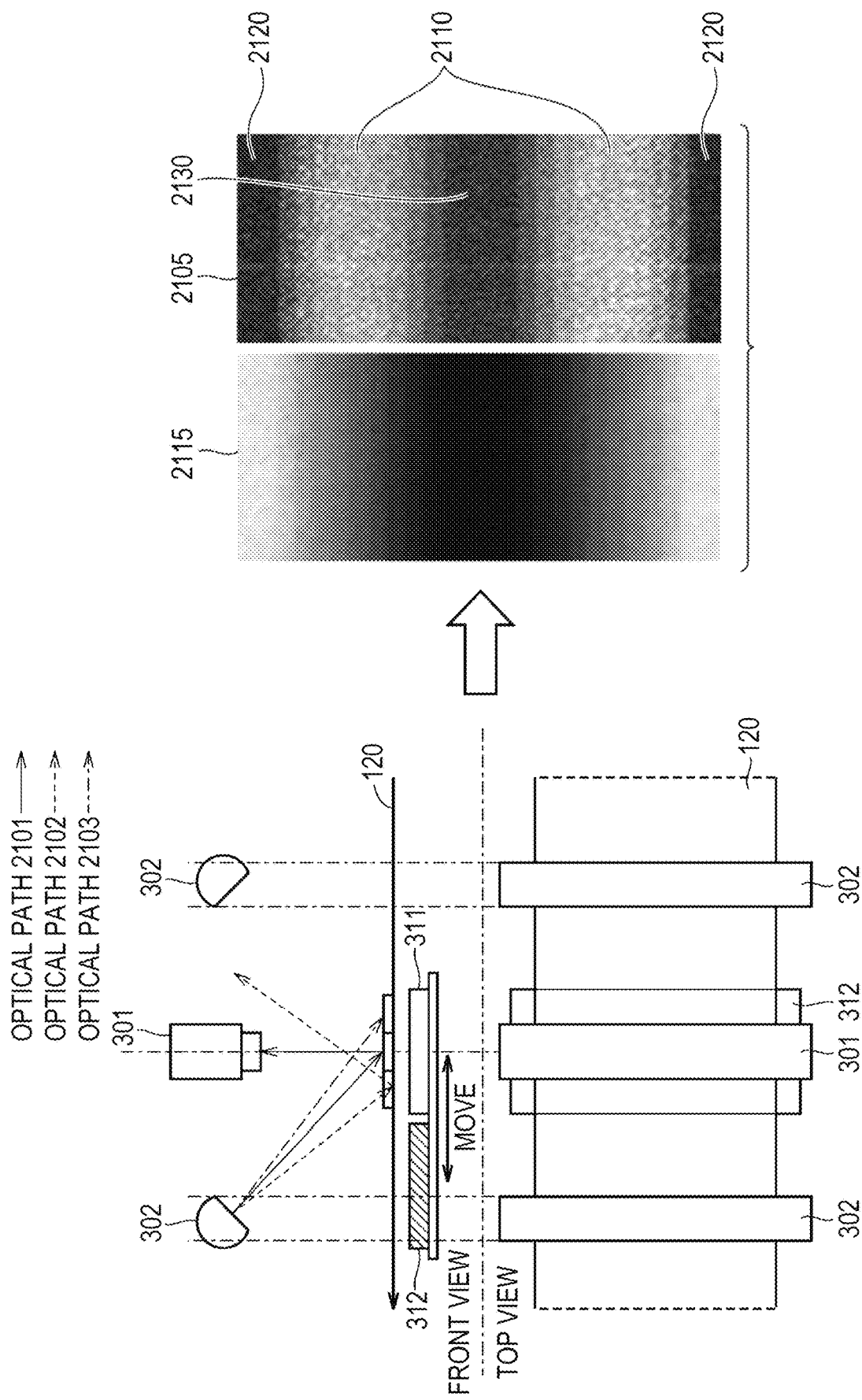
FIG. 21 is a diagram illustrating an example of a second problem in the patch reading process of the image forming device.

FIG. 21 is a diagram illustrating an example of a second problem in the patch reading process of the image forming device 100. The second problem relates to reversal of gradation of a patch, reflection of light, and the like that may occur when the medium 120 having a specular reflection characteristic such as a metal vapor deposited film is used.

An image 2115 is a read image of a patch on a transparent film and blue release paper by the image sensor 301. In the case that the similar patch is printed on the metal vapor deposited film, image sensor 301 acquires the image largely different from the appearance of the original patch (patch of image 2105) such as an image 2115. The cause will be described below.

In the example of FIG. 21, image sensor 301 reads the patch on the metal vapor deposited film (medium 120) using the white background plate 311. In this case, light from the light 302 reaches the image sensor 301 through, for example, any one of the three optical paths 2101, 2102, and 2103.

In an optical path 2101, the light is reflected by a patch on the metal vapor deposited film, the patch having a relatively high gradation (dark to some extent), and reaches the image sensor 301. More specifically, when a patch having a high gradation (dark) on the metal vapor deposited film is irradiated with light, the light is scattered on the patch surface or the patch rendering coloring material. Then, part of the scattered light reaches the image sensor 301. Therefore, a portion 2110 of the patch read through the light passing through the optical path 2101 has a "reverse gradation characteristic" in which the reading gradation is brighter as the patch is darker.

In an optical path 2102, the light is reflected by a patch having a small (thin) gradation on the metal vapor deposited film or a range where no patch is printed, and reaches the image sensor 301. Since the gradation of the patch is low, the light is specularly reflected by the surface of the metal vapor deposited film and reflected in a direction opposite to the incident angle. Therefore, light toward the image sensor 301 decreases. As a result, a portion 2120 of the patch that is read through the optical path 2102 results in a dark image.

In an optical path 2103, the light is reflected by a patch having a high gradation (dark) on the patch on the metal vapor deposited film, and reaches the image sensor 301. Due to the high gradation of the patch, light is likely to be absorbed by the patch. As such, a portion 2130 of the patch that is read through the light through the optical path 2103 results in a dark image.

Figure 22:
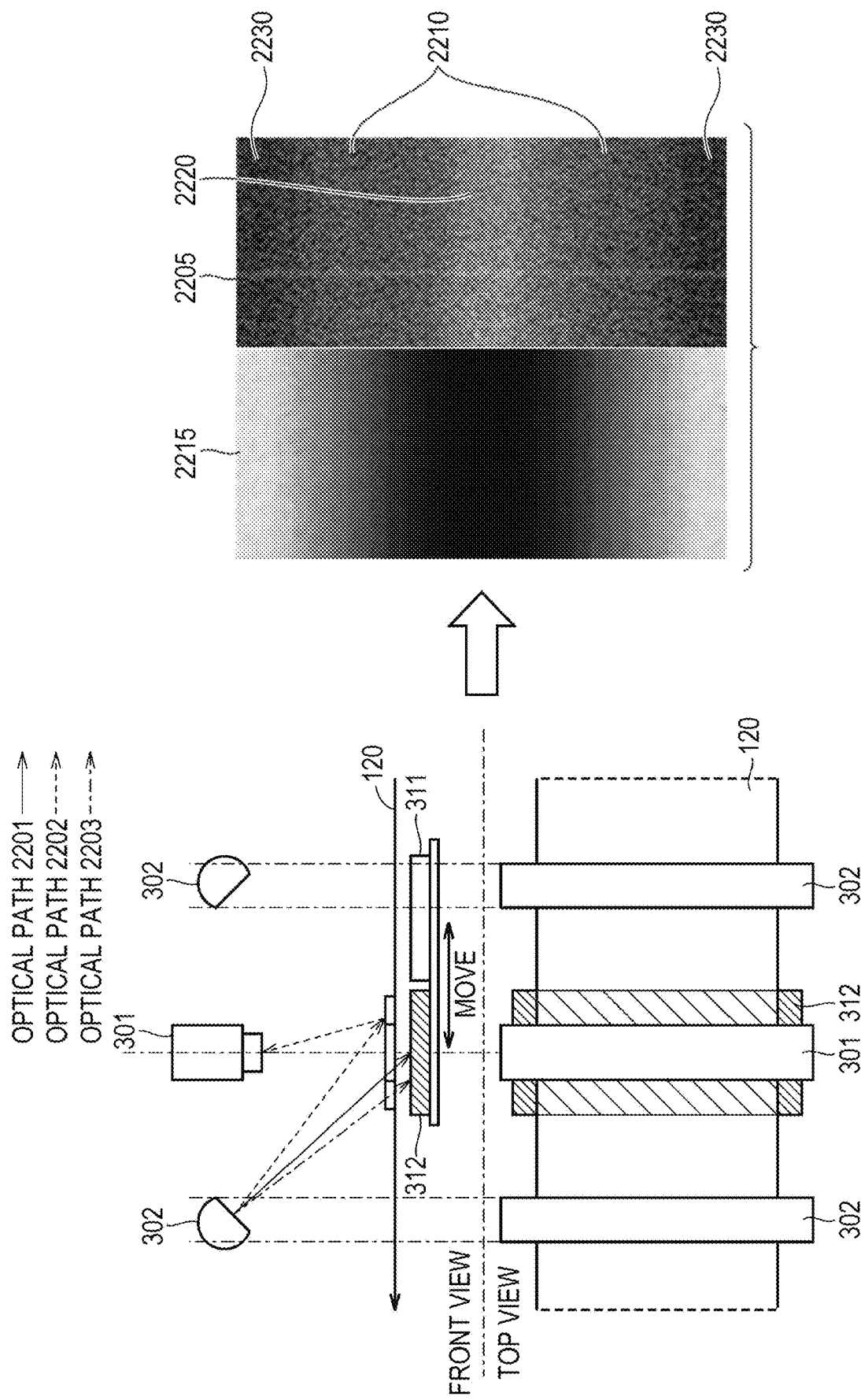
FIG. 22 is a diagram illustrating an example of a third problem in the patch reading process of the image forming device.

FIG. 22 is a diagram illustrating an example of a third problem in the patch reading process of the image forming device 100. The third problem relates to light absorption by the black background plate 312 that may occur when a patch of the transparent film or the medium 120 similar the film is read using the black background plate 312.

An image 2215 is a read image of a patch on a transparent film and blue release paper by the image sensor 301. In a case where a similar patch is printed on a transparent film (alternatively, a transparent film and a transparent release paper) and an image is acquired using the black background plate 312, the image sensor 301 acquires an image significantly different from the appearance of the original patch (patch of the image 2205) such as an image 2215. The cause will be described below.

In the example of FIG. 22, the image sensor 301 reads the patch on the transparent film using the black background plate 312. In this case, light from the light 302 reaches the image sensor 301 through, for example, any one of the three optical paths 2201, 2202, and 2203.

In an optical path 2201, part of the light is reflected by a patch having a high gradation (dark to some extent) on the transparent film, and reaches the image sensor 301. In an optical path 2202, part of the light is reflected by a patch having a high gradation (dark) on the transparent film and reaches the image sensor 301.

As the gradation of the patch on the transparent film is darker, the amount of light reflected by the patch and directed to the image sensor 301 increases. As a result, the darker the patch, the brighter the reading gradation (also referred to as "reverse gradation characteristic"). However, since the amount of light reflected by using the black background plate 312 is small, the read image is dark as a whole, and the gradation change is also small. Therefore, a dark gradation image is obtained from a portion 2210 of the patch read through the optical path 2201 to a portion 2220 of the patch read through the optical path 2202.

In an optical path 2203, a patch having a small gradation (thin) on the transparent film to some extent or a range in which no patch is printed is irradiated with light. The light passes through the transparent film and is absorbed by the black background plate 312. Therefore, almost no light reaches the image sensor 301. As a result, a portion 2230 of the patch that is read through the light through the optical path 2203 is a dark image.

As described above, when the patch on the transparent film is read using the white background plate 311, the shadow of the background plate, the adjacent patch, or the like is a problem, while when the patch on the transparent film is read using the black background plate 312, the absorption of light by the black background plate 312 and the reverse gradation characteristic become a problem. Even when a color patch is printed on black paper, a similar problem occurs.

FIG. 23 is a diagram illustrating an example of a fourth problem in the patch reading process of the image forming device 100. The fourth problem is a problem in the case of using the hologram paper, a problem caused by the order of reading the patches on the transparent film using the white background plate 311, any other problem, and the like.

An image 2300 is a read image of a patch on a transparent film and blue release paper by the image sensor 301. An image 2310 is a read image of a patch on hologram paper by the image sensor 301. An image 2320 is a read image of a patch on a transparent film (alternatively, a transparent film and a transparent release paper) by the image sensor 301. The same patches as in the transparent film and the blue release paper are printed on the hologram paper and the transparent film. However, the image sensor 301 acquires an image different to some extent from the appearance of the original patch (patch of the image 2310) such as the image 2300 and the image 2320. The cause will be described below.

The hologram paper reflects light from the light 302 in various directions due to a diffraction effect in a portion where the gradation of the patch is thin. Therefore, the image read by the image sensor 301 may include a hologram pattern 2311. The pattern 2311 of the hologram may be noise during image analysis.

The gradation (density) of the patch tends to be thin as a whole due to the influence of wraparound or reflection of light in the image 2320 when the patch on the transparent film is read using the white background plate 311 as compared with that the image 2300 when the patch on the transparent film and the blue release paper is read. In addition, depending on the order of reading the patches, for example, the read images may be different because the fact that the amount of light of the two lights 302 are different from each other, the fact that there is the space between the medium 120 and the white background plate 311 overlap, and the like. The order of reading the patches includes the ascending order 2321 (reading a thin patch to a dark patch in this order) and the descending order 2322 (reading a dark patch to a thin patch in this order).

In addition, white patches (not illustrated) and the like on a transparent film and white release paper have a small contrast between the medium 120 and the patches, and are difficult to read by the image scanner 110.

Figure 24:
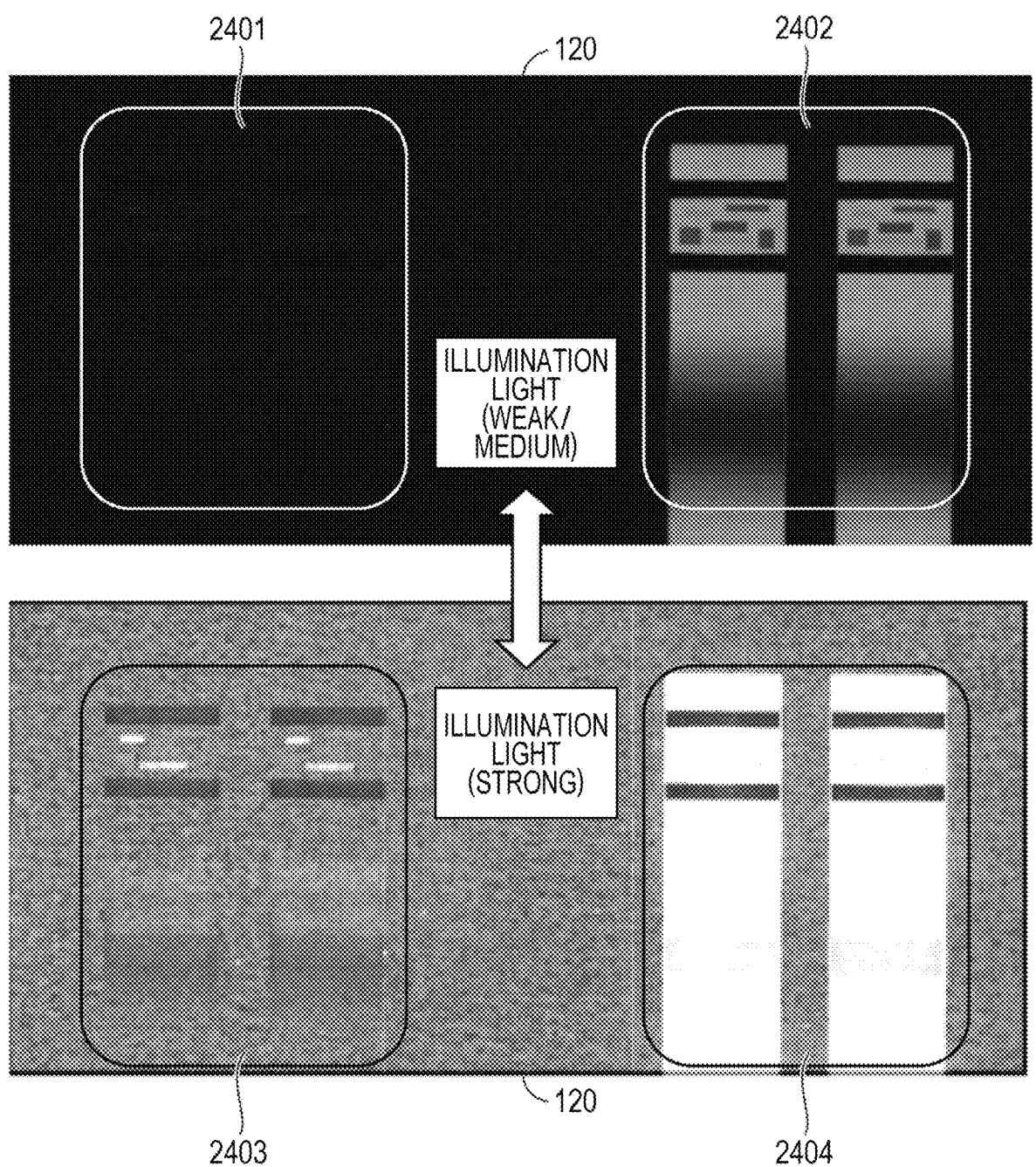
FIG. 24 is a diagram illustrating an example of a fifth problem in the patch reading process of the image forming device.

FIG. 24 is a diagram illustrating an example of a fifth problem in the patch reading process of the image forming device 100. The fifth problem is that black paper absorbs light when reading color patches on the black paper.

The color developing toners itself such as YMCK does not directly reflect the light of each color to represent the color tone (although may be partially reflected), but selectively absorbs the light transmitted through the image with each color developing toner to represent the color tone. For example, a Y (yellow) image selectively absorbs light other than yellow (that is, blue light) and allows yellow light to pass therethrough. Therefore, when reading the color patch using the light from the light 302, the image sensor 301 is required to observe the light reflected by the medium 120 or the background plate 303 on the back side of the color patch. However, since the black paper hardly reflects light, when the color patch is directly printed on the black paper, the image sensor 301 cannot detect reflected light from the color patch. As a result, the obtained read image is an image 2401. Although there is actually a color patch at the position of the image 2401, it appears that there is nothing because the image sensor 301 cannot detect the reflected light.

A first method for solving this problem is to print a base image with the white toner and print a color patch on the base image. In this way, the base image with the white toner reflects the light from the light 302. In this case, the color patch selectively absorbs the reflected light and allows only light of a specific color to pass therethrough. As a result, the obtained read image is an image 2402.

A second method for solving this problem is to brighten the read image by gradation adjustment by the image process or the like or to increase the luminance of the illumination light of the light 302. As a result, since the amount of light reflected from the black paper increases, the image sensor 301 can acquire the color passing through the color patch. For example, an image obtained by adjusting gradation of the image 2401 by the image process is an image 2403. Although noise is generated in the image 2403, the noise can be reduced by adjusting the illumination light as compared with the patch gradation adjustment by the image process.

In another example, an image obtained by gradation adjustment of the image 2402 by the image process is an image 2404. When the luminance of the image is increased in a state where there is the base with the white toner, the gradation of the color patch may be saturated. In an aspect, the image forming device 100 may adjust the amount of light and color tone of the illumination (for example, each amount of light of RGB) according to the patch rendering situation (presence or absence of the base, gradation value of the color patch, and the like). For example, in an embodiment of the present invention, the amount of light or the color tone of the light 302 may be set according to the background or the toner configuration of the patch at the time of printing a pre-patch to be described later.

Figure 25:
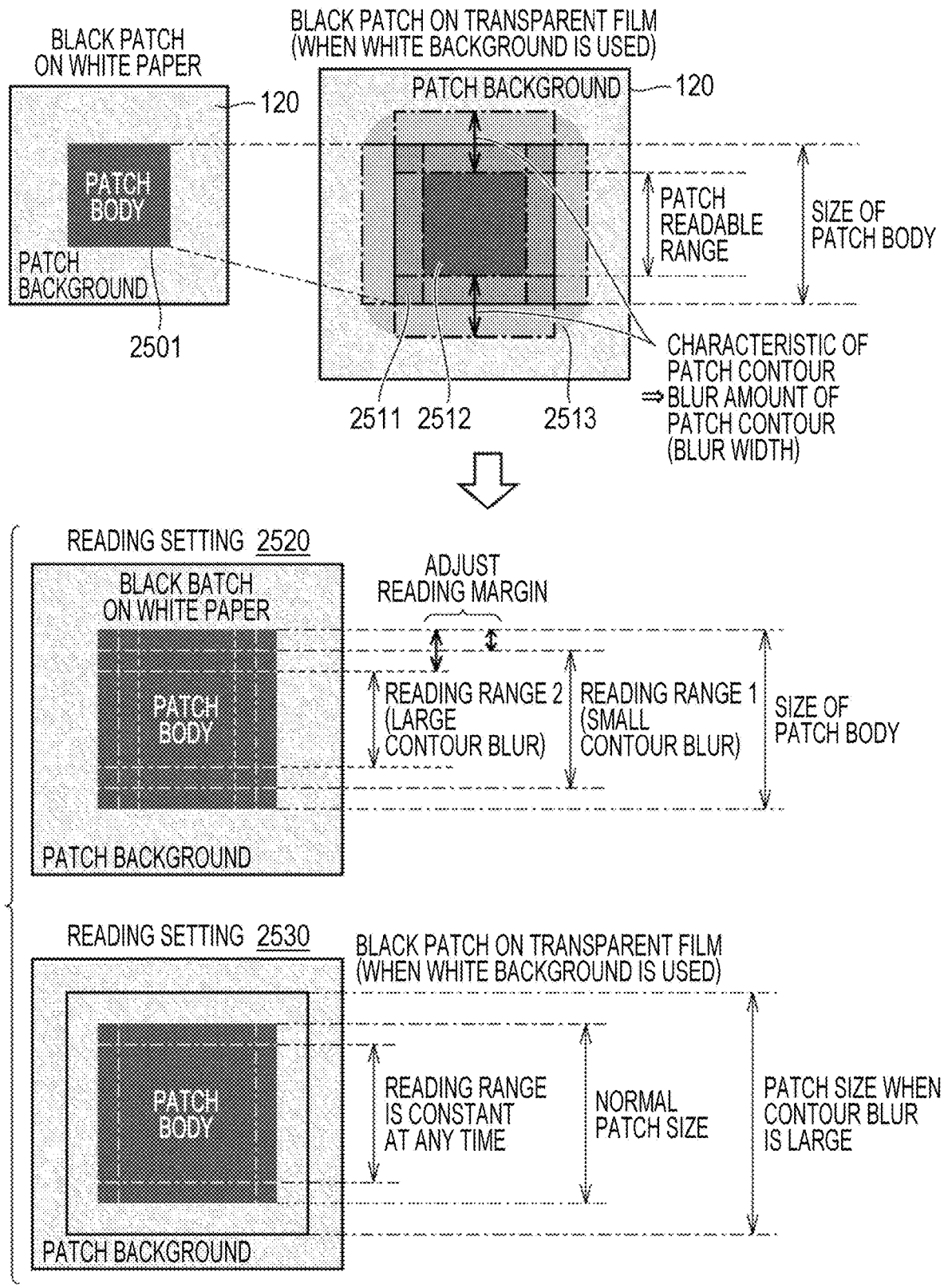
FIG. 25 is a diagram illustrating an example of a first solution method for solving at least one of the first to fifth problems in the patch reading process of the image forming device.

FIG. 25 is a diagram illustrating an example of a first solution method for solving at least one of the first to fifth problems in the patch reading process of the image forming device 100. The first solution method may mainly suppress patch bleeding (contour blur) and/or shadow effects (the problem described with reference to FIG. 20).

When a patch 2501 printed on the white paper is compared with a patch 2511 printed on the transparent film, a contour blur 2513 may occur in the patch 2511 due to the influence of the shadow of the white background plate 311, the shadow of the adjacent patch, and the like. Therefore, the image forming device 100 may provide a certain margin in the reading range of the patch 2511 based on the type of medium so as not to be affected by the contour blur when reading the patch 2511. In addition, the image forming device 100 may not provide a margin in the reading range of the patch 2511 depending on the type of medium. In the example of FIG. 25, the image forming device 100 sets the reading range to an area 2512 when reading the patch 2511. By purposely excluding the outer periphery of the patch from the reading range in this manner, the image forming device 100 can suppress the influence of the shadow or the bleeding of the patch on the analysis of the read image of the patch.

In an aspect, the image forming device 100 may adjust the reading margin. A reading setting 2520 is a setting for adjusting the reading margin of the patch according to the size of the contour blur.

In another aspect, the image forming device 100 may fix the reading margin. A reading setting 2530 is a setting for using a constant patch reading margin regardless of the size of the contour blur.

In another aspect, the image forming device 100 can detect a blur and/or estimate a blur amount from an edge of the marker 812 included in the real-time gradation patch 810. In a case where the reading setting 2520 is used, the image forming device 100 can adjust the reading margin of the patch based on the estimated blur amount. Furthermore, in a case where the reading setting 2530 is used, the image forming device 100 can determine whether to use the patch reading margin based on the presence or absence of the blur.

Furthermore, in another aspect, the image forming device 100 may separately print a contour evaluation patch on the medium 120, and use the contour evaluation patch for detecting a blur and/or estimating the blur amount. The image forming device 100 can determine whether to adjust the reading margin of the patch or to use the reading margin of the patch based on the evaluation result of the contour evaluation patch.

For example, when the medium is white paper, patch rendering on the medium is stable, there is a high possibility that sufficient reading accuracy can be obtained even with a smaller measurement area, and the size of the entire patch image including a plurality of patches does not change, so that the margin adjustment method is suitable.

On the other hand, when the medium is a transparent film, there is a possibility that an influence of dirt or the like (noise) of the background plate may occur in a path in which light transmitted through the transparent film is reflected by the background plate and is transmitted through the transparent film again to be read, and it is preferable to secure a certain reading area or more, so that the reading range fixing method is suitable.

Figure 26:
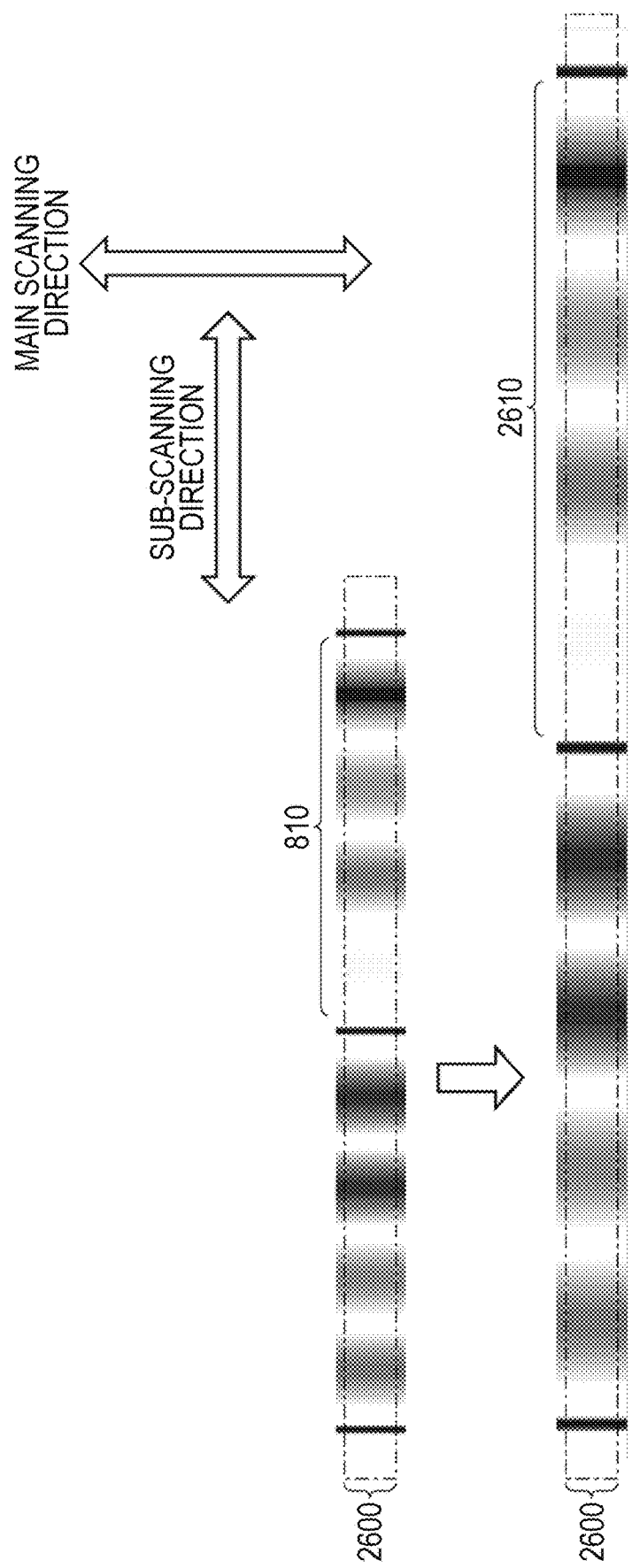
FIG. 26 is a diagram illustrating an example of a second solution method for solving at least one of the first to fifth problems in the patch reading process of the image forming device.

FIG. 26 is a diagram illustrating an example of a second solution method for solving at least one of the first to fifth problems in the patch reading process of the image forming device 100. The second solution method is effective mainly in a case where the contour blur, the bleeding, or the like occurs in the real-time gradation patch 810 (the problem described with reference to FIG. 20).

As a method of suppressing the influence of the contour blur, the bleeding, or the like of the patch on the patch reading accuracy, it is effective to provide the patch with the patch reading margin as described with reference to FIG. 25. The reading range of the real-time gradation patch 810 not affected by the contour blur is, for example, a region 2600. The width of the region 2600 in the main scanning direction is set to be smaller than the width of the real-time gradation patch in the main scanning direction.

Providing the patch with a reading margin of the patch may suppress the influence of the contour blur on the patch reading to some extent, but here, another problem may occur. When providing the patch with a patch reading margin, the patch readable range is reduced, so that the patch reading accuracy of the image sensor 301 may be lowered. Therefore, it is desirable that the image forming device 100 can change the patch size as necessary.

However, since the width of the real-time gradation patch 810 in the main scanning direction corresponds to the print margin, it is difficult to widen the width. On the other hand, there is room for expansion of the width of the real-time gradation patch 810 in the sub-scanning direction (conveyance direction of the medium 120). The image forming device 100 can expand the real-time gradation patch 810 in the sub-scanning direction to a real-time gradation patch 2610, for example, based on the type of the medium. When the real-time gradation patch 810 is expanded in the sub-scanning direction, a region of each patch configured by gradation of each toner such as R, G, B, 3C, Y, M, C, and K in the sub-scanning direction is extended. As a result, the patch reading range of each color toner by the image sensor 301 increases. As a result, the patch reading accuracy by the image sensor 301 can be improved.

In an aspect, the image forming device 100 may also expand the marker 812 and the color resist measurement patch 820 in the sub-scanning direction.

In another aspect, when by expanding the real-time gradation patch 810 in the sub-scanning direction, the real-time gradation patch 2610 after extension is not accommodated in one page, the real-time gradation patch 2610 after extension may be divided into two or more pieces (patches for four colors of R, G, B, and 3C, patches for four colors of Y, M, C, and K, and the like).

In another aspect, the image forming device 100 may change the design of the patch to any shape as necessary so as to increase the reading range of the patch by the image sensor 301.

Furthermore, in another aspect, the image forming device 100 can set the reading margin of the patch and appropriately expand the patch size and/or change the patch design not only for the real-time gradation patch 810 but also for any patch. In this way, the image forming device 100 can increase the reading range of any patch by the image sensor 301 as much as possible while suppressing the influence of the contour blur of the patch on the patch reading accuracy.

Figure 27:
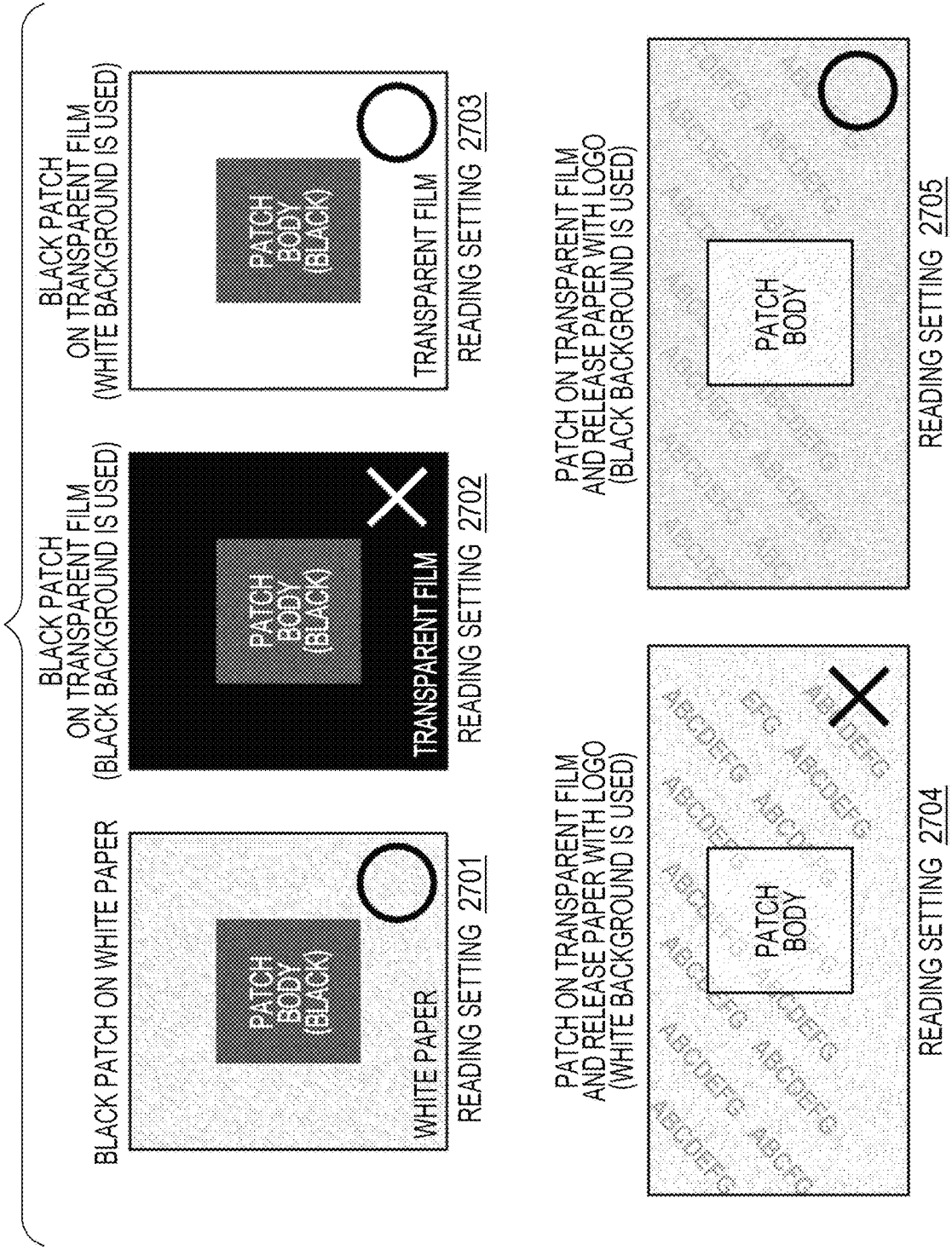
FIG. 27 is a diagram illustrating an example of a third solution method for solving at least one of the first to fifth problems in the patch reading process of the image forming device.

FIG. 27 is a diagram illustrating an example of a third solution method for solving at least one of the first to fifth problems in the patch reading process of the image forming device 100. The third solution method can mainly solve the problem (for example, it includes the problem described with reference to FIG. 20.) that it is difficult to read the patch depending on the combination of the color of the toner, the type of the medium 120, and the color of the background plate 303.

The image forming device 100 can improve the patch reading accuracy by appropriately switching the color of the background plate 303 according to the color of the patch and the type of the medium 120. Hereinafter, an example of a selection criterion for the background plate 303 will be described.

A reading setting 2701 is a setting for reading the black patch on the white paper using the white background plate 311. When reading the patch on the white paper, the image forming device 100 may use either the white background plate 311 or the black background plate 312. In an aspect, the image forming device 100 may read a patch using the black background plate 312 only when a patch with the white toner is printed on a white sheet. Otherwise, the image forming device 100 may read the patch by using the white background plate 311.

A reading setting 2702 is a setting for reading the black patch on the transparent film using the black background plate 312. A reading setting 2703 is a setting for reading the black patch on the transparent film using the white background plate 311. When the patch on the transparent film is read using the black background plate 312, it is difficult for the image forming device 100 to extract the contour of the patch. On the other hand, when the patch on the transparent film is read using the white background plate 311, the image forming device 100 can easily extract the contour of the patch. Therefore, the image forming device 100 uses the white background plate 311 (reading setting 2703) when reading the patch of the color developing toner on the transparent film.

Some media 120 include release paper with a logo. Also in this case, selection of the color of the background plate 303 is important. As an example, a manufacturer name, a paper brand, and the like may be described on the release paper of the label paper. Therefore, when reading the patch printed on the medium 120 including the release paper with the logo, the image forming device 100 desirably switches the background plate 303 to a color that is not easily affected by the logo of the release paper and uses the color.

A reading setting 2704 is a setting for reading the patch on the transparent film and the release paper with the logo using the white background plate 311. A reading setting 2705 is a setting for reading the patch on the transparent film and the release paper with the logo using the black background plate 312. Comparing the reading settings 2704 and 2705, the logos are more clearly displayed in the reading setting 2704, and these logos can be noise during patch analysis. Therefore, in such a case, the image forming device 100 uses the black background plate 312 (reading setting 2705).

Note that the logo printed on the release paper may be a white color, may be subjected to watermark processing, or may have unevenness in whiteness of the release paper itself. In this case, the image forming device 100 desirably uses the white background plate 311.

In an aspect, the image forming device 100 may use each of the white background plate 311 and the black background plate 312 to read a portion, of the medium 120, on which no patch is printed, compare magnitudes of noise, and then determine which background plate is to be used.

FIG. 28 is a diagram illustrating an example of a fourth solution method for solving at least one of the first to fifth problems in the patch reading process of the image forming device 100. The fourth solution method can be used in a wide variety of media 120 such as a transparent film, a metal vapor deposited film, hologram paper, a set of a films and release paper with logos, and black paper (effective for the problem first to fifth).

The image forming device 100 prints a base image under the patch based on the type of toner, the type of the medium 120, or a combination thereof (for example, based on a combination in which patch reading is difficult when a patch is directly printed on the medium 120). Hereinafter, an example of the reading setting in a case where the base image with the toner is added will be described.

A reading setting 2800 is a setting for adding the base 2801 with the white toner and reading the patch using the white background plate 311. A reading setting 2810 is a setting for adding the base 2811 with the white toner and reading the patch using the black background plate 312.

In a case where the base with the white toner is printed on the medium 120 as the background of a patch with color developing toner, the image forming device 100 can read the patch using either the white background plate 311 or the black background plate 312 (using either of the reading settings 2800 or 2810). However, in the case of reading the patch with the white toner, the image forming device 100 uses the black background plate 312.

In an aspect, the image forming device 100 may determine the type of medium (transparent film, metal vapor deposited film, hologram paper, set of film and release paper with logo, black paper, etc.) from information input by an operator or from image information obtained from the image scanner 110, and print a base image with the white toner (or toner of another color) under the patch based on the determination result. In the fourth solution method, it can be said that the patch is processed in that the base image is added to the patch.

FIG. 29 is a diagram illustrating an example of a fifth solution method for solving at least one of the first to fifth problems in the patch reading process of the image forming device 100. The fifth solution method is effective when the contrast between the medium 120 and the patch is low (for the fourth problem described with reference to FIG. 24).

When the patch on the transparent film sheet is read, the color of the release paper greatly affects the accuracy of reading the patch. When the release paper is also transparent, the image forming device 100 can read the white patch on the transparent film without any problem by using the black background plate 312. However, when the color of the release paper is white or close to the color of the patch (when the contrast between the medium 120 and the patch is low), the patch reading accuracy may decrease.

Therefore, the image forming device 100 selects light of a specific color from the light source of the light 302 based on the type of toner, the type of the medium 120, or a combination thereof, and irradiates the patch with the selected light to increase the contrast between the medium 120 and the patch. When the light 302 is a full-color light emitting diode (LED), the light 302 includes a red (R) LED element, a green (G) LED element, and a blue (B) LED element. In this case, the image forming device 100 can irradiate the patch with light of a specific color by energizing a specific element.

As an example, when the release paper is blue as illustrated in FIG. 29, the image forming device 100 uses red light (R light) that maximizes the density difference between the white patch and the medium 120. Similarly, when the release paper is yellow, the image forming device 100 uses blue light (B light) that maximizes the density difference between the white patch and the medium 120.

In an aspect, the image forming device 100 may preferentially use green light (G light). More specifically, when the image scanner 110 is a line charge coupled device (CCD), the accuracy of reading green light (G light) close to human visual sensitivity may be the highest. Therefore, in a case where the contrast between the patch and the medium 120 when red light (R light) is emitted is slightly larger than the contrast between the patch and the medium 120 when green light (G light) is emitted, the image forming device 100 may select green light instead of red light.

Although it is described that the color light (red, green, blue) can be selected by controlling the irradiation light of the light 302, the selection unit of the color light is not limited thereto. In an aspect, when the image scanner is a color sensor having an element selectively sensitive to each color light (red, green, blue), the image forming device 100 may select each color information read by the image scanner instead of being able to select the color light of the light 302. In another aspect, when the image scanner is a monochrome sensor having sensitivity to all color light, the image forming device 100 may insert a color filter of each color for selecting color light in front of the image scanner instead of being able to select the color light of the light 302.

Furthermore, the type of color light is not limited to red, green, and blue. In an aspect, the image forming device 100 may select ultraviolet light, infrared light, or the like as color light. The ultraviolet light is effective for reading the fluorescence of the coloring material or the base material. The infrared light is effective for reading a management number or the like with an invisible but machine-readable infrared ink. Furthermore, the infrared light is also effective for patch reading of the infrared ink, which is essential for quality control of the infrared ink and the like.

FIG. 30 is a diagram illustrating an example of a sixth solution method for solving at least one of the first to fifth problems in the patch reading process of the image forming device 100. The sixth solution method is a method for recognizing the contour of the patch even when the contrast with the patch and the patch background is low.

Note that the "patch background" is a portion other than the patch, and is, for example, the medium 120 for the image scanner 110 or a base image on the medium 120. The patch background also includes a color of background plate 303 on the back side of medium 120. As used herein, the phrase "contrast between the patch and the medium 120" in the present specification including the description in the above includes the meaning of "contrast between the patch and the patch background". In addition, the phrase "medium 120, base, base image, and the like" in the present specification including the description in the above includes the meaning of "patch background".

As a first example of the sixth solution method, the image forming device 100 may read the patch using all RGB lights to increase the contrast between the patch and the patch background.

In an aspect, the image forming device 100 may irradiate the patch with light of a color that increases the contrast between the patch and the patch background by adjusting the luminance of each of the RGB lights.

In another aspect, the image forming device 100 may acquire a read image when the patch is irradiated with only the R light, a read image when the patch is irradiated with only the G light, and a read image when the patch is irradiated with only the B light. In this case, the image forming device 100 may determine the patch position by superimposing and analyzing respective acquired images. Alternatively, the image forming device 100 may determine the patch position by integrating the analysis results of the individual images.

In another aspect, the image forming device 100 may acquire a read image when the patch is irradiated with light in any combination of RGB lights and a read image when the patch is irradiated with light in another combination of RGB lights. Note that the number of combinations of RGB lights may be any number of two or more. In addition, the luminance of each RGB light may be individually set. In this case, the image forming device 100 may determine the patch position by superimposing and analyzing respective acquired images. Alternatively, the image forming device 100 may determine the patch position by integrating the analysis results of the individual images.

As a second example of the sixth solution method, the image forming device 100 may repeatedly print patches having the same gradation on the medium 120. In this way, the image forming device 100 can acquire more patch images for determining the contour of the patch. By analyzing a plurality of identical patch images, the image forming device 100 can determine the contour of the patch even when the contrast between the patch and the patch background is low.

When the patches having the same gradation are repeatedly printed on the medium 120, the time required for measuring the patch and the printing amount of the patch increase. Therefore, in an aspect, the image forming device 100 may output a warning to the operation display unit 102 when repeatedly printing the patches having the same gradation on the medium 120. The user may view the warning message to determine whether to repeatedly print the patches having the same gradation on the medium 120. The image forming device 100 can repeatedly print the patches having the same gradation on the medium 120 based on the acceptance of the input of the approval by the user from the operation display unit 102. Further, the image forming device 100 does not repeatedly print the patches having the same gradation on the medium 120 based on the acceptance of the rejection input by the user from the operation display unit 102.

Furthermore, as a third example of the sixth solution method, the image forming device 100 may change the size or design of the patch. In this way, the image forming device 100 can acquire more images of the boundary line between the patch and the patch background. As a result, the image forming device 100 can determine the contour of the patch even when the contrast between the patch and the patch background is low.

In an aspect, the image forming device 100 may analyze the read patch image and patch background image, and determine the patch reading difficulty level from a contrast value or the like. In a case where the patch reading difficulty level is less than the threshold value, the image forming device 100 may execute any one of the sixth solution methods or a combination thereof. In a case where the patch difficulty level is equal to or greater than the threshold value, the image forming device 100 can display that the patch cannot be read on the operation display unit 102. The user can take solution measures such as changing the medium 120 or the patch image by checking the display of the operation display unit 102.

When there is no change in the patch design or when insufficient contrast is found at the time of reading the patch in the adjustment mode, there is a possibility that an error occurs in the result of correction (correction amount or adjustment amount). The correction result (correction amount or adjustment amount) is, for example, an image density correction value for correcting density unevenness in FIG. 12, various gradation correction values in FIGS. 14 and 18, or an adjustment value of the color resist deviation amount in FIG. 19.

In order to suppress the occurrence of the error, the image forming device 100 reduces the correction amount based on the obtained correction value. As an example, it is assumed that the patch background contrast necessary for creating the adjustment value is 100, but the contrast actually obtained is only 50. In this case, a value (−15) obtained by multiplying the adjustment value (for example, −30) calculated therefrom by 50/100 is set as the correction value (the error is reduced). In another aspect, the image forming device 100 may display on the operation display unit 102 that there is a possibility that sufficient correction has not been performed.

FIG. 31 is a diagram illustrating an example of a seventh solution method for solving at least one of the first to fifth problems in the patch reading process of the image forming device 100. The seventh solution method is effective when a patch on the medium 120 in which noise is likely to occur is read. The medium 120 in which noise is likely to occur is, for example, a film with release paper with logos, hologram paper (image 2310 shown in FIG. 23), or the like.

The same logos are repeatedly printed on the surface of the film with release paper with logos at a constant cycle. The same hologram patterns are repeatedly printed on the surface of the hologram paper at a constant cycle. In the seventh solution method, the image forming device 100 adjusts the size of the patch (the length in the sub-scanning direction) so that the size is n times (n is any number of 1 or more, and is preferably 2 or more) these cycles. In this way, the image forming device 100 can average the values of the noise of the patch background in the sub-scanning direction to suppress the influence of the noise in the patch reading.

In an aspect, the image forming device 100 may set the sampling interval of the density unevenness measurement patch to n times the repetition cycle of the noise pattern when the repetition of the noise pattern such as the logo of the release paper or the hologram pattern is confirmed. For example, the image forming device 100 may repeatedly read patches having the sampling interval of within n times the repetition cycle. In this way, the image forming device 100 can average the values of the noise of the patch background in the sub-scanning direction to suppress the influence of the noise in the patch reading.

In another aspect, when the signal change in the noise pattern is small, the image forming device 100 may perform the density unevenness correction setting only when the value of the density unevenness obtained by the analysis of the density unevenness measurement patch is larger than the value of the signal change in the noise pattern.

In another aspect, the image forming device 100 may repeatedly read the noise pattern of the patch background before the patch reading process, and average the values of the noise of the patch background in advance based on the reading result.

Furthermore, in another aspect, since the repetition cycle differs for each type of the medium 120, the image forming device 100 can read the noise pattern of the patch background and average the values of the noise of the patch background for each type of the medium 120. In addition, the image forming device 100 may store an average value of values of the noise in a memory or a storage for each type of the medium 120, and use the average value. The image forming device 100 may acquire the noise pattern of the medium 120 not only by reading the patch background but also by performing frequency analysis on a region where no patch is to be printed.

Figure 32:
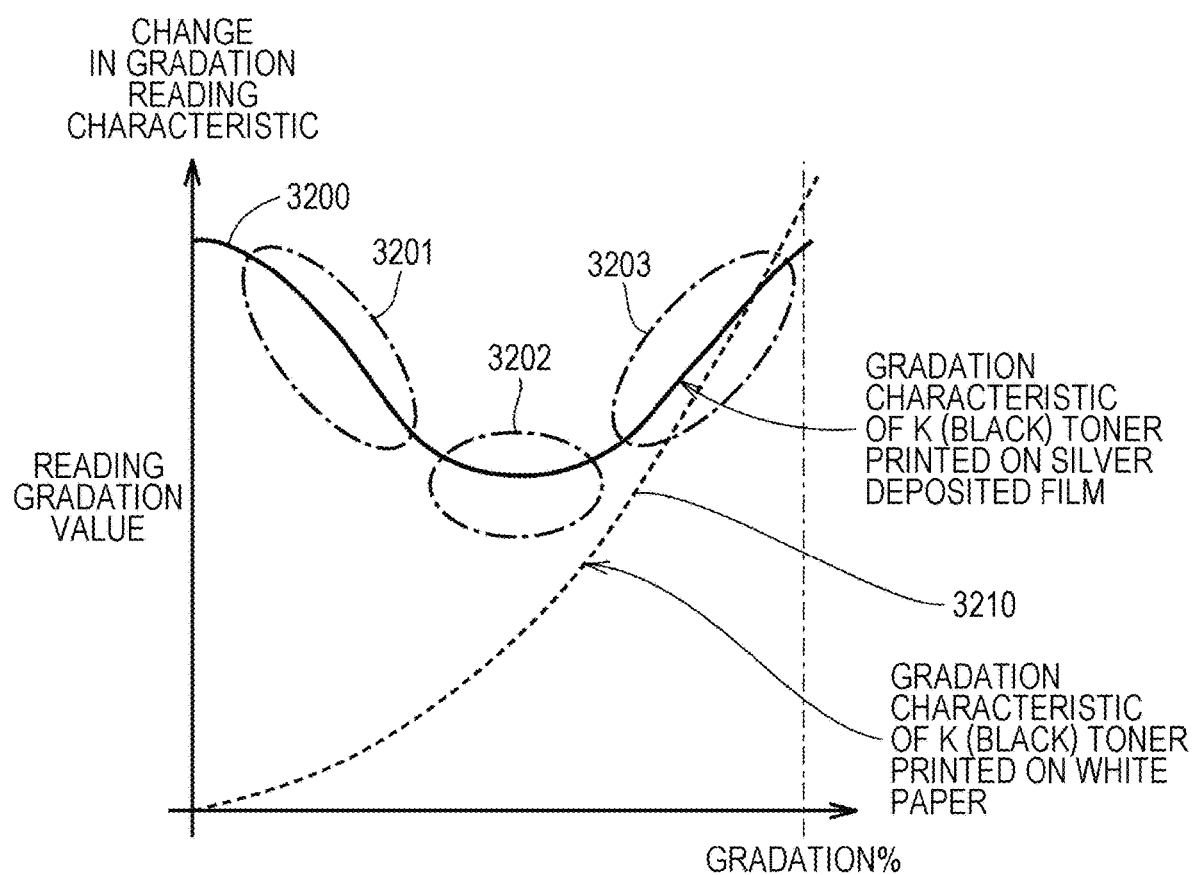
FIG. 32 is a diagram illustrating an application example of an eighth solution method for solving at least one of the first to fifth problems in the patch reading process of the image forming device.

FIG. 32 is a diagram illustrating an application example of an eighth solution method for solving at least one of the first to fifth problems in the patch reading process of the image forming device 100. The eighth solution method is effective for a medium in which a gradation value greatly changes, such as a metal vapor deposited film. When the medium 120 has regularity such as a periodic change in the gradation value, the image forming device 100 can read the patch of the medium 120 using either the seventh solution method or the eighth solution method.

A graph 3200 illustrates gradation characteristics of the K (black) toner printed on the metal vapor deposited film for each region. A graph 3210 illustrates gradation characteristics of K (black) toner printed on the white paper. A horizontal axis indicates a gradation value of an image document including user content, various patches, or the like. The vertical axis represents the gradation value (a higher density state is shown toward the upper side, and a value is opposite in magnitude to a signal value read by the image scanner) of the patch read by the image sensor 301. It can be seen that the graph 3210 monotonously increases, whereas the graph 3200 is a curve including an increase and a decrease.

In the medium 120 that easily reflects light such as a metal vapor deposited film, a gradation value (reading gradation value) read by the image scanner 110 changes due to an influence of light reflection depending on a reading place. This change is due to specular reflection or the like on the medium 120 as shown in FIG. 21. The reading gradation value may be different from the light and shade (gradation value) felt by a person when the medium is viewed directly or on a monitor. Due to this gradation change, the image forming device 100 may not be able to accurately read the light and shade of the toner image on the medium 120 that easily reflects light. That is, the actually obtained reading gradation value may be different from the light and shade (gradation value) felt by a person when the medium is viewed directly or on a monitor.

More specifically, the medium 120 that easily specularly reflects light, such as a metal vapor deposited film, has a first gradation range 3201 in which an increase/decrease in toner density and a change in reading gradation are reversed, a second gradation range 3202 in which an increase/decrease in toner density does not lead to a change in gradation, and a third gradation range 3203 in which an increase/decrease in toner density and a change in gradation match with each other (do not reverse). The first gradation range 3201 is a gradation range in which reading gradation is reversed (an opposite relationship in brightness) with respect to the light and shade of the document image. The second gradation range 3202 is a gradation range in which the light and shade of the document image does not appear on the reading gradation (the change in brightness does not appear on the reading gradation). The third gradation range 3203 is a gradation range in which a relationship in brightness between the light and shade of the document image and the light and shade of the reading gradation match. For example, even when the change amount of the toner density on the medium 120 is constant, when the image forming device 100 reads and analyzes each patch of the first gradation range 3201, the second gradation range 3202, and the third gradation range 3203, there is a possibility that different change amounts of the toner density are observed and measured.

In order to solve this problem, the image forming device 100 determines the type of the medium 120 and the type of the patch based on the patch reading result by the image scanner 110. Next, in a case where the medium 120 is a medium 120 that easily reflects light, such as a metal vapor deposited film, the image forming device 100 executes a patch reading process different from a normal patch reading process.

First, in order to determine the type of the medium 120 and the type of the patch, the image forming device 100 prints a gradation patch on the medium 120, and reads and analyzes the gradation patch. Then, from the analysis result, it is determined whether the first gradation range 3201, the second gradation range 3202, and the third gradation range 3203 exist on the medium 120. As an example, the image forming device 100 may detect the gradation change by reading and analyzing the gradation patches continuously to some extent.

As an example, it is assumed that the image forming device 100 does not detect a gradation change such as changes in the first gradation range 3201, the second gradation range 3202, and the third gradation range 3203 on the medium 120 by analyzing the gradation patch, and detects that the gradation patch has a monotonically increasing gradation characteristic. In this case, the image forming device 100 can determine that the medium 120 is white paper, light color paper, or the like, and the patch is a color developing toner patch.

As another example, it is assumed that the image forming device 100 does not detect a gradation change such as changes in the first gradation range 3201, the second gradation range 3202, and the third gradation range 3203 on the medium 120 by analyzing the gradation patch, and detects that the gradation patch has a monotonically decreasing gradation characteristic when the black background plate 312 is used. In this case, the image forming device 100 can determine that the medium 120 is a medium 120 with less light reflection, and the patch is a white toner patch.

Furthermore, as another example, it is assumed that the image forming device 100 detects gradation changes such as changes in the first gradation range 3201, the second gradation range 3202, and the third gradation range 3203 on the medium 120 by analyzing the gradation patches. In this case, the image forming device 100 can determine that the medium 120 is a medium 120 that easily reflects light, such as a metal vapor deposited film, and the patch is a color developing toner patch.

Next, the image forming device 100 executes a patch reading process for the medium 120 in which the medium 120 easily reflects light such as a metal vapor deposited film.

More specifically, the image forming device 100 cannot use the second gradation range 3202 having no gradation sensitivity as the patch reading region. The gradation sensitivity is a relationship in brightness between the light and shade of the document image and the light and shade of the reading gradation, and is a ratio of the degree of brightness of the reading gradation to the degree of brightness of the document image. When the brightness of the reading gradation appears larger, the gradation sensitivity is high. Since the light and shade of the document image does not appear on the reading gradation (the change in brightness does not appear on the reading gradation), there is no gradation sensitivity in the second gradation range 3202. The image forming device 100 cannot use a region having no gradation sensitivity as a patch reading region because the light and shade of the document image, that is, the change in the amount of developer such as the toner image does not appear on the reading gradation (the change in brightness does not appear on the reading gradation).

Therefore, the image forming device 100 selects whether to use the adjustment value reversed in the first gradation range 3201 or to obtain the adjustment value only in the third gradation range 3203. Note that the adjustment value here is, for example, the image density correction value (or adjustment value) for correcting density unevenness in FIG. 12, and various gradation correction values (or adjustment values) in FIGS. 14 and 18. By reversing the adjustment value in the first gradation range 3201 and using the same, the image forming device 100 can eliminate the characteristic that the reading gradation is reversed (an opposite relationship in brightness) with respect to the light and shade of the document image, and can read the patch on the medium 120. Further, the image forming device 100 obtains the adjustment value only in the third gradation range 3203, so that the gradation range in which the relationship in brightness between the light and shade of the document image and the light and shade of the reading gradation match can be used as it is, and the patch on the medium 120 can be read.

In an aspect, the image forming device 100 may receive a setting input of gradation correction and a setting input of a process parameter from a user via the operation display unit 102. As an example, the user can confirm that the medium 120 has the first gradation range 3201 to the third gradation range 3203 with reference to the medium type setting information and the like via the operation display unit 102. As another example, when the medium 120 has the first gradation range 3201 to the third gradation range 3203, it may be difficult to set an appropriate correction value or adjustment value for all gradation ranges. Therefore, the image forming device 100 may configure a user interface of the operation display unit 102 so that the user cannot input the setting of the gradation correction.

In another aspect, the image forming device 100 may not use the first gradation range 3201 and the second gradation range 3202 for patch reading, and may use the third gradation range 3203 for patch reading. In this case, patch rendering of the first gradation range 3201 and the second gradation range 3202 may be omitted. As a result, the image forming device 100 can measure the patch with a smaller area and adjust the print setting based on the measurement result. Furthermore, the image forming device 100 can perform measurement with a larger patch or larger number of patches (related to the third gradation range 3203) in the area available for patch rendering. As a result, the image forming device 100 can reduce various noise influences.

FIG. 33 is a diagram illustrating an example of a ninth solution method for solving at least one of the first to fifth problems in the patch reading process of the image forming device 100. The ninth solution method has two implementation methods. A ninth solution method (1) and a ninth solution method (2) will be described. The ninth solution method is effective when a patch on a white toner base is read. For example, in order to solve the first problem (reading a patch on a transparent film), the image forming device 100 may print a patch on the white toner base, and further adjust gradation by using the ninth solution method.

First, the ninth solution method (1) will be described with the upper graph in FIG. 33 as an example. The ninth solution method (1) reproduces an original gradation characteristic (graph 3301) from the reading gradation characteristic. A horizontal axis indicates a gradation value of an image document including user content, various patches, or the like. The vertical axis represents the gradation value of the patch read by the image sensor 301 (the density is higher toward the upper side). Note that, in FIG. 33, unlike FIG. 32, there is no gradation range in which the relationship in brightness is reversed (a curve downward to the right), and thus the reading gradation value on the vertical axis is proportional ($\propto$) to the density of the printed image.

The highest density of the image depends on the type of toner and the type of the medium 120. As an example, the highest density of the image on the rough medium 120 is low, and the density of the image on the medium 120 such as coated paper is high. When there is the white toner base on the medium 120, the highest density of the image on the white toner base tends to decrease. A graph 3301 illustrates a gradation characteristic of a patch printed on the medium 120. A graph 3302 illustrates a gradation characteristic of a patch printed on the white toner base on the media 120. In the graph 3302, it can be seen that the density is obviously decreased over almost the entire horizontal axis as compared with the graph 3301.

For example, it is assumed that the image forming device 100 prints a patch on the white toner base on the medium 120 while printing user content directly on the medium 120. In this case, since the adjustment value of the print setting by the patch measurement result is based on the analysis result of the patch on the white toner, there is a possibility that it is not suitable for adjustment or correction of the gradation reduction of the user content. Therefore, the image forming device 100 performs the following processing in order to obtain an adjustment value of the print setting suitable for the user content based on the patch measurement result of the patch on the white toner. In this way, the print result of the user content (density of the printed image which is the numerical value on the vertical axis) can be estimated from the analysis result of the patch on the white toner. Furthermore, the image forming device 100 can correct the print setting of the user content to be directly printed on the medium 120 from the analysis result of the patch on the white toner.

That is, the image forming device 100 can reproduce the original gradation characteristic (graph 3302) from the gradation characteristic (graph 3301) obtained from the density of the patch printed on the white toner base. More specifically, the image forming device 100 multiplies the density (graph 3302) of the patch printed on the measured white toner base by a coefficient. As a result, since the shape of the graph 3301 is generally close to a shape obtained by vertically increasing values by multiplying the graph 3302 by a constant coefficient, the density of the patch printed on the white toner base (graph 3302) is corrected to the density of the patch directly printed on the medium 120 (graph 3301). Here, for example, the image forming device 100 may store the coefficient information in advance in a memory or a storage, the coefficient information, which is a value for correcting the degree of density decrease when the white toner is used for each medium 120.

Next, the ninth solution method (2) will be described with the lower graph in FIG. 33 as an example. The ninth solution method (2) corrects the gradation value of the user content to an intended gradation value based on the gradation characteristic read by the method illustrated in FIG. 14. The image forming device 100 defines the gradation characteristic of all the gradation values including the halftone by using any of the three methods.

A first method is to reproduce the original (no white toner) gradation characteristic (graph 3301) on the medium 120. As a result, the density of the patch (graph 3302) printed on the white toner base is corrected to the density of the patch (graph 3301) directly printed on the medium 120. The image forming device 100 can obtain an adjustment value of the print setting suitable for the user content by adjusting (correcting) the print setting based on the original correction value (graph 3301). In the first method, the region 3310 cannot be expressed. Therefore, a document image having a gradation value smaller than that at the point 3304 where the graph 3301 and the highest density on the white toner base intersect can be reproduced as intended, but a document image having a gradation value larger than that at the point 3304 cannot be reproduced at all in light and shade. The first method is particularly effective in a printing process in which the range of the graph 3301 is narrow and emphasis is placed on the printing result of the gradation value smaller than that at the point 3304.

The second method is to adjust the highest density to the density of the patch on the white toner (create graph 3301) while reproducing the original gradation characteristic (graph 3303). The image forming device 100 may create the graph 3302 (density distribution in which the highest density is adjusted to the density of the patch on the white toner while reproducing the original correction value (graph 3301)) by smoothly interpolating between the graph 3301 reproduced by the first method and the highest point 3304 of the graph 3302. The image forming device 100 adjusts (corrects) the print setting based on the graph 3302, thereby being able to obtain an adjustment value of the print setting suitable for the user content having both the characteristic of the first method and the characteristic of the third method to be described later.

A third way is to use the gradation characteristic of the patch on the white toner (graph 3302). By adjusting (correcting) the print settings based on the graph 3302, the brightness of the entire gradation range of the user content is smoothly reproduced as a print result, and a more natural adjustment value of the print settings can be obtained. Note that the image forming device 100 may correct the adjustment value of the print setting so that the value is close to the adjustment value (correction value) in the case of using the graph 3301.

In an aspect, the image forming device 100 may select the first method when the density of the patch printed on the base with the white toner does not decrease much as compared with the density of the patch directly printed on the medium 120. Furthermore, in a case where the decrease in density is moderate, the image forming device 100 may select the first method or the second method. In addition, the image forming device 100 may select the third method in a case where the density greatly decreases.

In another aspect, in the image forming device 100, when the white toner is used as a base, the highest density and the density curves (graph 3301 to 3303) also change. Therefore, the image forming device 100 may have the target value of the correction value of the print setting for each of the first method to the third method.

In another aspect, the image forming device 100 may be switchable between the first method and the third method according to the situation. For example, in order to maintain the average quality of the entire content, it is necessary to properly use the target value depending on whether the white toner is used. Additionally, a large amount of white toner may be used or a white toner may be used fragmentarily for user content. Therefore, the image forming device 100 may switch between the first method and the third method based on whether paper and toner are used for the user content, paper to be used, and the amount of toner. For example, in a case where the job includes a certain amount or more of white images, the image forming device 100 may use the second method or the third method. Furthermore, the image forming device 100 may select any one of the first method to the third method based on whether the important content (part of the image) in the job includes a white image.

Figure 34:
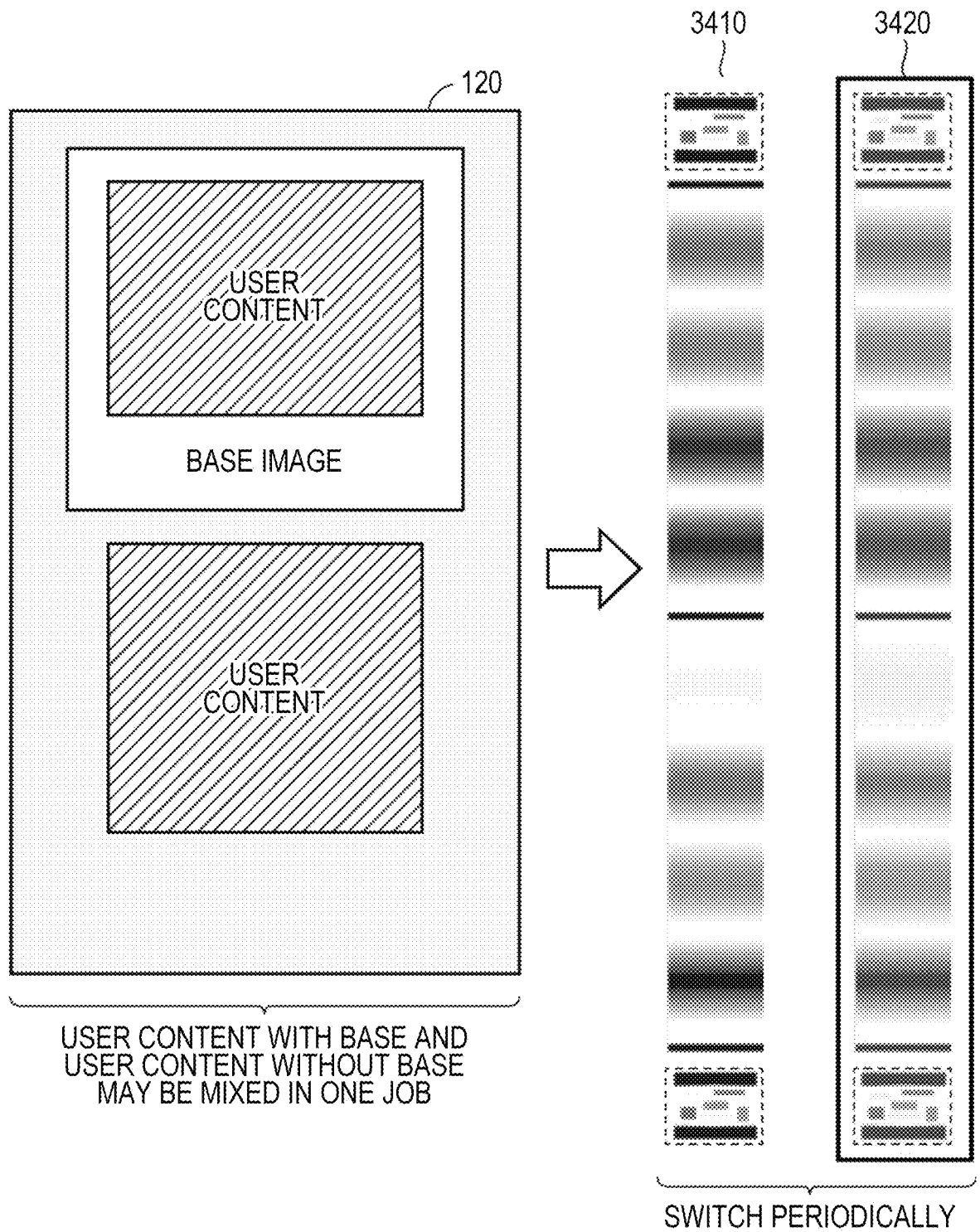
FIG. 34 is a diagram illustrating an example of a sixth problem in patch reading process of the image forming device and a tenth solution method for solving the sixth problem.

FIG. 34 is a diagram illustrating an example of a sixth problem in the patch reading process of the image forming device 100 and a tenth solution method for solving the sixth problem. The sixth problem is that one job includes user content (image) with a base and user content (image) without a base.

As described above, the color development and gradation reproduction of the color developing toner of YMCK are affected by the presence or absence of the base with the white toner. The same applies not only to the patch but also to the user content.

Therefore, the image forming device 100 desirably changes the correction value (target value such as density) of the print setting between the user content using the base with the white toner and the user content not using the base with the white toner.

However, in a case where the user content that uses the base with the white toner and the user content that does not use the base with the white toner are mixed in one job, two problems occur. The first problem is that the correction value (target value) of the user content using the base with the white toner and the correction value (target value) of the user content not using the base with the white toner need to be individually created by a method. The second problem is that it is necessary to use the correction value (target value) of the user content using the base with the white toner and the correction value (target value) of the user content not using the base with the white toner while switching them during execution of the job.

In order to solve the first problem, the image forming device 100 may periodically switch between a real-time adjustment patch 3410 with a base and a real-time adjustment patch 3420 without a base and measure these real-time adjustment patches 3410 and 3420. In this way, the image forming device 100 can acquire the correction value (target value) of the user content using the base with the white toner and the correction value (target value) of the user content not using the base with the white toner.

In an aspect, the image forming device 100 may change patch reading conditions (the color of the background plate 303 or the like) based on the presence or absence of a base.

In another aspect, for example, the image forming device 100 may calculate the correction value (target value) of the user content using the base with the white toner and the correction value (target value) of the user content not using the base with the white toner so that the gradation characteristic of the image at the head of the job (or the average of the reading information in the range of a predetermined time from the head) is maintained.

In another aspect, the image forming device 100 may render a gradation patch in advance before executing a job, and calculate in advance a correction value (target value) of user content using the base with the white toner and a correction value (target value) of user content not using the base with the white toner.

In another aspect, the image forming device 100 may update each correction value calculated in advance as needed by measuring the real-time adjustment patches 3410 and 3420.

In order to solve the second problem, for example, the image forming device 100 determines the presence or absence of a base for each pixel in the image included in the job, and switches and uses a correction value (target value) of the user content using the base with the white toner and a correction value (target value) of the user content not using the base with the base with the white toner on the determination result.

However, depending on the type of the image forming device, there is a case where the processing of switching the correction value for each pixel in the image cannot be performed. For example, some image forming devices use an image processing circuit implemented by an ASIC, an FPGA, or the like. In this case, it is difficult to add processing of switching the correction value for each pixel in the image to the image processing circuit later.

Therefore, in an aspect, the image forming device 100 may set color reproduction characteristics for each image object attribute (image attribute, text, graphics attribute, and the like) in a case where an image processing circuit implemented by an ASIC, an FPGA, or the like is used. The image forming device 100 can include the switching setting of the correction value in the setting of the color reproduction characteristic.

Figure 35:
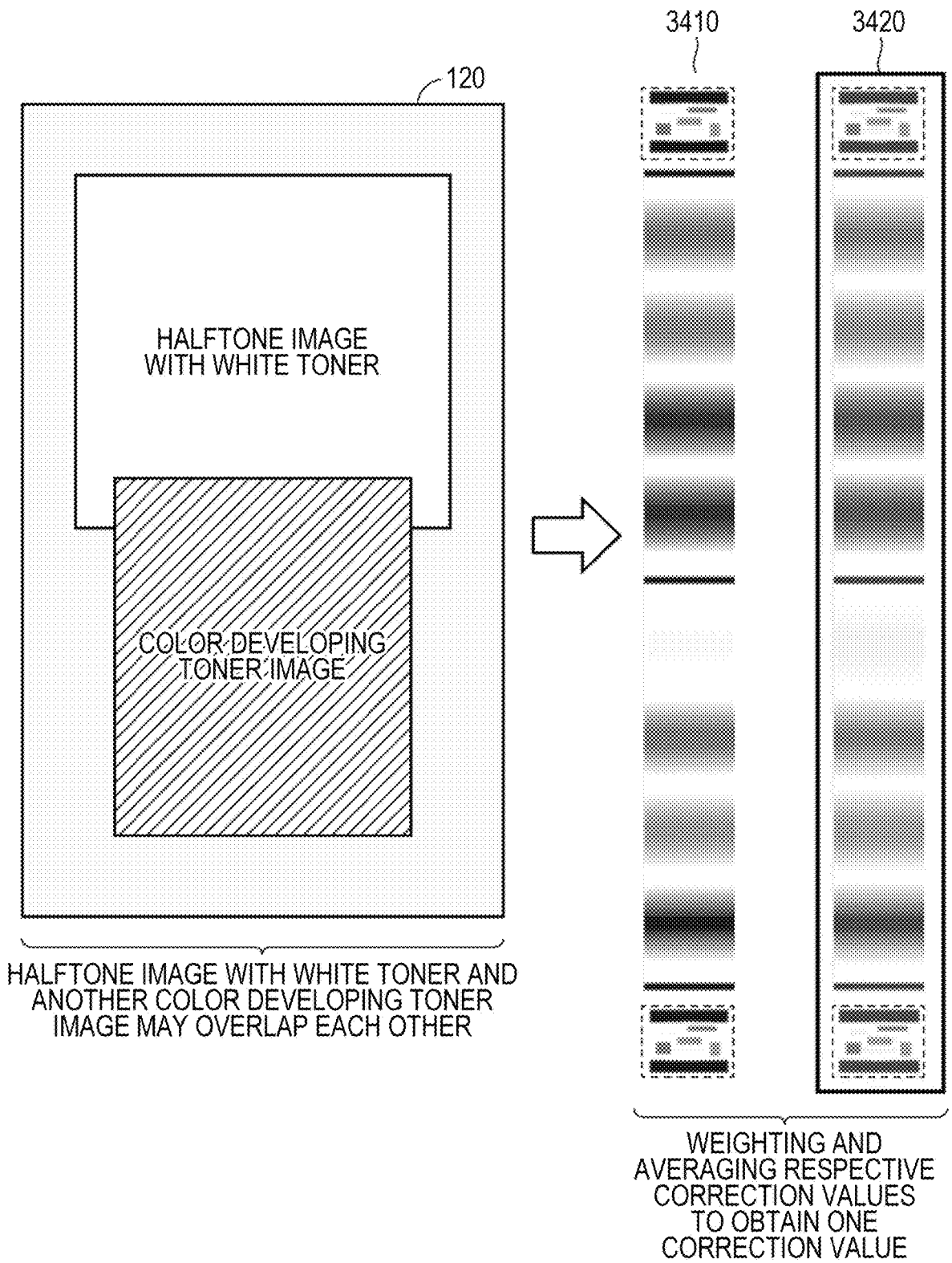
FIG. 35 is a diagram illustrating an example of a seventh problem in the patch reading process of the image forming device and an eleventh solution method for solving the seventh problem.

FIG. 35 is a diagram illustrating an example of a seventh problem in the patch reading process of the image forming device 100 and an eleventh solution method for solving the seventh problem. The seventh problem is that there is a case where the correction value (target value) of the user content using the base with the white toner and the correction value (target value) of the user content not using the base with the white toner cannot be switched for use.

As described with reference to FIG. 34, in a case where an image with a base layer and an image without a base layer are mixed in one job, the image forming device 100 can switch and use the respective correction values. However, in a case where there is a possibility that the halftone image of the white toner used as a base overlaps with an image of another color developing toner, it is not desirable to switch the correction value for each pixel.

This is because the image forming device 100 cannot determine which of the correction value (target value) of the user content using the base with the white toner and the correction value (target value) of the user content not using the base with the white toner is to be applied to the image in which the halftone image of the white toner and the image of another color developing toner overlap with each other.

In addition, in a case where there are a color resist deviation and various types of smoothing processes for smoothly rendering an image contour, the boundary line (or the contour of the image) between the image with the base and the image without the base is ambiguous. As a result, the image forming device 100 may not be able to appropriately switch the correction value for each pixel.

Therefore, the image forming device 100 calculates one correction value by weighting each of the correction value (target value) of the user content using the base with the white toner and the correction value (target value) of the user content not using the base with the white toner to average them. Then, the image forming device 100 can adjust an image (print setting) using the one correction value.

In an aspect, the image forming device 100 may determine weighting based on a ratio of white images to images included in a job.

In another aspect, the image forming device 100 may use only one of the correction value (target value) of the user content using the base with the white toner and the correction value (target value) of the user content not using the base with the white toner. In this case, the user may input which correction value is to be used to the image forming device 100.

However, the deviation between the correction value (target value) of the user content using the base with the white toner and the correction value (target value) of the user content not using the base with the white toner may be very large. In this case, in a case where one correction value is used, the image forming device 100 may not be able to appropriately correct either of the base-provided image and the base-free image, or may be able to appropriately correct none of them.

Therefore, in an aspect, in the above case, the image forming device 100 determines whether the reading result of the correction value that has not been selected or the correction value with the smaller weighting deviates from the target value by a certain value or more. In a case where the reading result of the correction value deviates from the target value by a certain value or more, the image forming device 100 may output a warning to the operation display unit 102 or may automatically stop the execution of the job. At this time, the image forming device 100 may re-adjust the image forming process, re-adjust the characteristics of gradation or color tone reproduction that cannot be corrected by fine adjustment during real-time adjustment, and restart the job. This method is particularly effective in a sheet-fed machine.

Although the method for solving the sixth problem and the seventh problem is described using the medium and the base toner as an example with reference to FIGS. 34 and 35, application examples of the method for solving the sixth problem and the seventh problem are not limited thereto.

In an aspect, the image forming device 100 can use the method for solving the sixth problem and the seventh problem even when using a metallic toner and a clear toner.

The image forming device 100 may use a developer such as a spot color in addition to basic colors such as YMCK. In this case, a spot color is often used as a "spot color" without being mixed with another color, or as a "component color" that mixes with a basic color to form a mixed color. Therefore, in an aspect, when a spot color is used as a "spot color", in the image forming device 100, the real-time adjustment patch may include a spot color patch. In this case, the image forming device 100 can create the correction value of the spot color and the correction value of the basic color, and apply them to the respective images.

In another aspect, in a case where a spot color is used as a component color of a mixed color, in the image forming device 100, the real-time adjustment patch may include a patch of the component color. In this case, the image forming device 100 can create the correction value of the component color and the correction value of the basic color and apply them to the respective images.

On the other hand, in a case where a spot color is used as a component color of a mixed color, a change in gradation or density (on which various corrections and adjustments described above to be performed) in each spot color to be a constituent element of a mixed color may change due to interaction by a mixed color. In such a case, it is conceivable to perform correction by rendering a real-time patch in a color mixing state and measuring a gradation change thereof.

However, there is a possibility that the interactive correction or adjustment cannot be performed depending on the configuration of the image forming device. For example, it is assumed that a certain image forming device normally performs printing with a configuration of only basic colors, and is able to add an image forming mechanism for another color only when a spot color is required. In this case, since the image forming mechanisms are physically separated, the certain image forming device can adjust the gradation of each color image, but cannot execute adjustment caused by a combination of a plurality of colors constituting a mixed color.

Therefore, the image forming device 100 may measure (monitor) the gradation change in a mixed color, and when the gradation change exceeds a predetermined threshold value in a case where the gradation change is caused by the interaction of a mixed color, display a warning on the operation display unit 102 or the like to urge the operator to stop printing or maintain the image forming device 100.

Figure 36:
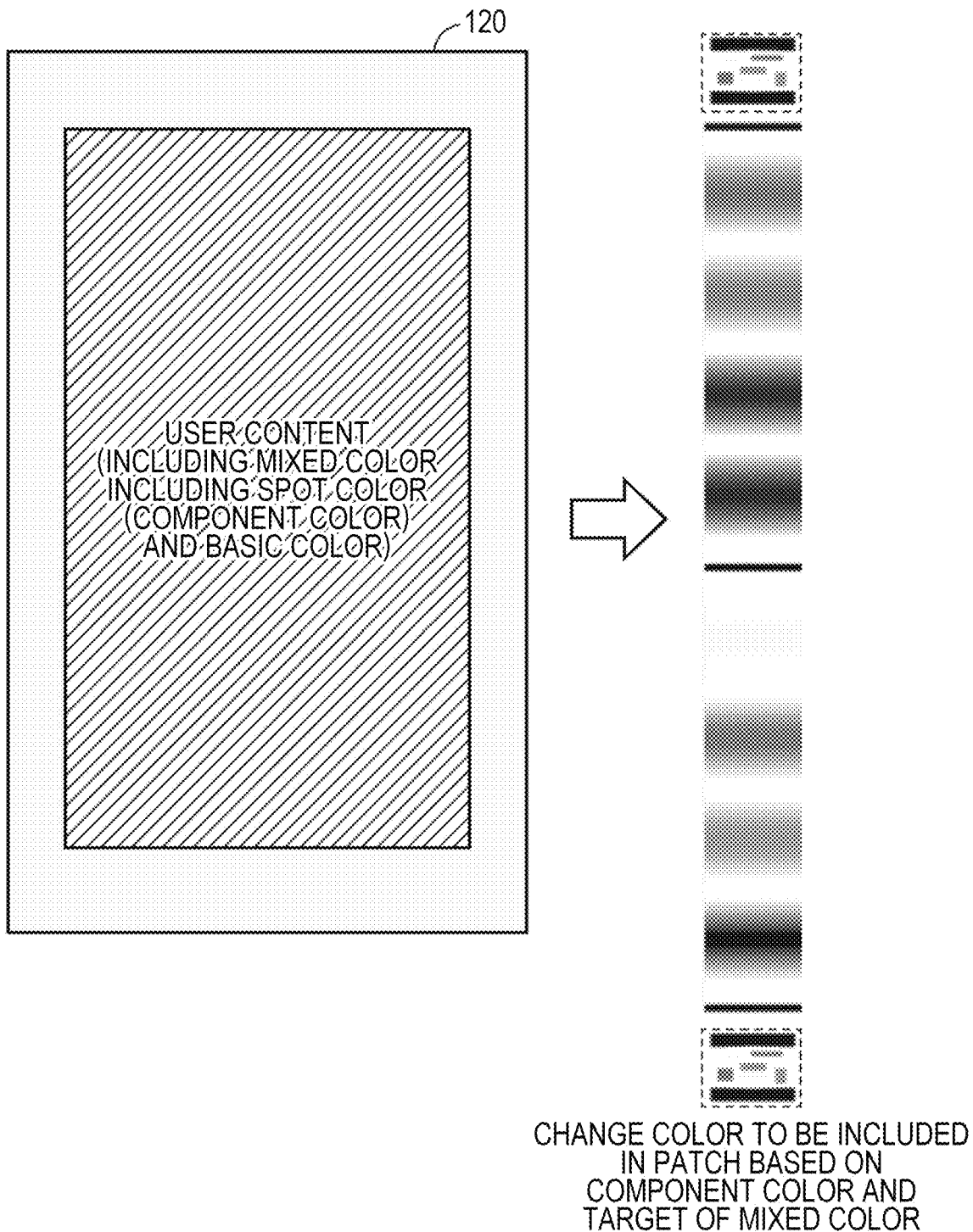
FIG. 36 is a diagram illustrating an example of an eighth problem in patch reading process of the image forming device and a twelfth solution method for solving the eighth problem.

FIG. 36 is a diagram illustrating an example of an eighth problem in the patch reading process of the image forming device 100 and a twelfth solution method for solving the eighth problem. The eighth problem is that the user content may include a mixed color including a spot color (component color) and a basic color. In a case where the user content includes a mixed color, the image forming device 100 can cope with this problem by changing the color included in the real-time gradation patch.

When a mixed color is created from a spot color (component color) and a basic color, a combination of the spot color (component color) and the basic color is often limited. For example, a blue spot color (component color) is often mixed with magenta (M) or cyan (C). This is because a blue spot color (component color) is often used to reduce color tone unevenness and granular roughness caused by M and/or a mixed color of M and K, or the like to reproduce a blue color tone of saturation or brightness that cannot be reproduced by a mixed color. In other words, a blue spot color (component color) is less likely to be mixed with yellow (Y).

Therefore, in a case where the image forming device 100 uses a blue spot color (component color), the real-time gradation patch includes "color mixture with blue spot color (component color) and M or C" that is highly likely to be used for the user content and does not include "color mixture with blue spot color (component color) and Y" that is less likely to be used for the user content. As a result, the image forming device 100 can measure the gradation of a mixed color that is likely to be used in a limited space of the real-time gradation patch.

In an aspect, in a case where the toner is replaced, the image forming device 100 may redefine the configuration of the color included in the real-time gradation patch based on a possibility of a combination (mixed color) of the replaced toner.

In another aspect, when the toner is replaced, the image forming device 100 may print a patch in advance on the medium 120 and read the patch before executing the print job. In this case, the image forming device 100 may determine a color tone of the read image and set two colors among the basic colors having a hue relationship with the color tone interposed therebetween as the mixed color target. Alternatively, the image forming device 100 may select a color close to the color tone of the read image from a plurality of combinations of component colors and basic colors prepared in advance.

In another aspect, in a case where the hue change is larger than the brightness change in the image on the medium 120, the image forming device 100 may determine the change in color tone by detecting the change in hue from, for example, the ratio of the R signal and the G signal instead of the change in intensity based on each of RGB or the average value thereof. Alternatively, in a case where a change in hue of an image on the medium 120 cannot be detected by any method, the image forming device 100 may print a base image on the medium 120 and read an image on the base image. As a result, the image forming device 100 can detect the color tone change in the image by changing the reading method even when the image reading characteristics are different due to factors such as the type of the medium 120, the contrast between the medium 120 and the background plate 303.

In another aspect, the image forming device 100 may increase the number of times of image reading when the S/N ratio of the read image is small. In this way, the image forming device 100 can stably detect the color tone change and adjust the print setting even when the noise of the read image is large (when the S/N ratio is small).

As described above, by using the twelfth solution method, the image forming device 100 can detect a color tone change by appropriately changing a patch reading method or a patch (for example, adding a base) even without reading a detailed chart design in advance or setting a correction method for a wide variety of combinations of the media 120 and the toner configurations. As a result, the image forming device 100 can stably determine the quality of the image for a wide variety of combinations of the media 120 and the toner configurations.

Furthermore, in another aspect, the image forming device 100 may record the patch reading setting and the image quality determination setting for each combination of the media 120 and the toners, and store the settings in a memory or a storage. In this way, the image forming device 100 can use the settings saved in the past.

Figure 37:
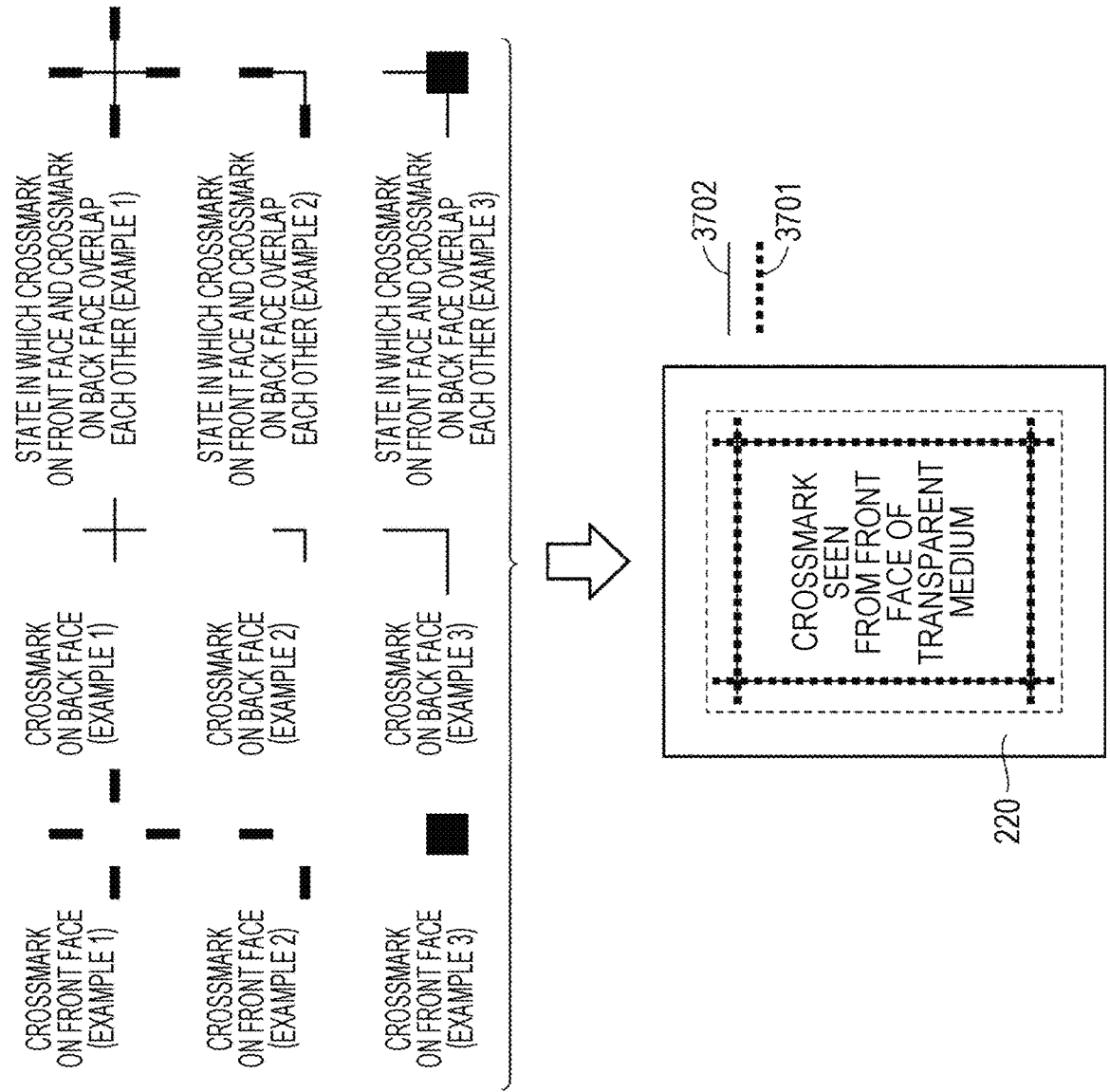
FIG. 37 is a diagram illustrating an example of a design of a crossmark in a sheet-fed machine (image forming device)

FIG. 37 is a diagram illustrating an example of a design of the crossmark in a sheet-fed machine (image forming device 200). The image forming device 200 can accurately read the positions of the various patches disclosed in the present specification by using the crossmarks illustrated in FIG. 37.

Unlike the image forming device 200 using the roll-shaped medium 120, the image forming device 100 that is a sheet-fed machine has an important function of adjusting the image positions of the front face and the back face on the medium 220 cut to a certain size.

A sheet-fed machine generally detects a position of an edge of a medium using a black background plate, and further detects a crossmark on the medium. The sheet-fed machine estimates the position of the image on the medium from the positional relationship between the edge of the medium and the crossmark, and adjusts the printing position of the image.

The image forming device 200 provides a design of a plurality of crossmarks. The image forming device 200 can select a crossmark to be used from among the design of a plurality of crossmarks based on the type of the medium 220. The design of the plurality of crossmarks includes a crossmark printed on the front face of the medium 220 and a crossmark printed on the back face of the medium 220. As illustrated in FIG. 27, these crossmarks are designed so that they can be read by the image scanner 110 even if they overlap each other. The image forming device 200 uses the image scanner 210 for the front of the medium 220 and the image scanner 210 for the back of the medium 220 to read the crossmarks printed on the front and back of the medium 220.

Normally, printing on front and back sides of a transparent film is hardly performed, but for example, in order to reproduce a deeper color tone and clearer base white background, it is conceivable to create and print a set of image content on both sides on a transparent film. In such a case, the crossmarks illustrated in FIG. 37 are effective.

For example, the image forming device 200 prints crossmarks of black (K) on the front and back of the transparent film. The image forming device 200 can read crossmarks by using a white background plate.

In addition, since it is difficult to detect the edge of the transparent film, the image forming device 200 performs alignment so that the crossmarks on the front and back faces overlap. In this way, the image forming device 100 can align the positions of the front and back images of the medium 220. The image forming device 200 can prevent the crossmarks on the front and back faces from completely overlapping by using, for example, a crossmark design in which one side face has a thick crossmark and the other side face has a thin crossmark as illustrated in FIG. 37. As a result, the image forming device 200 can determine whether the crossmarks on the front and back faces accurately overlap. As a result, the image forming device 200 can solve the problem that the patches on the front and back sides overlap and cannot be analyzed when printing on double-sides of thin paper, a transparent film, or the like that can be easily seen through is performed.

Figure 38:
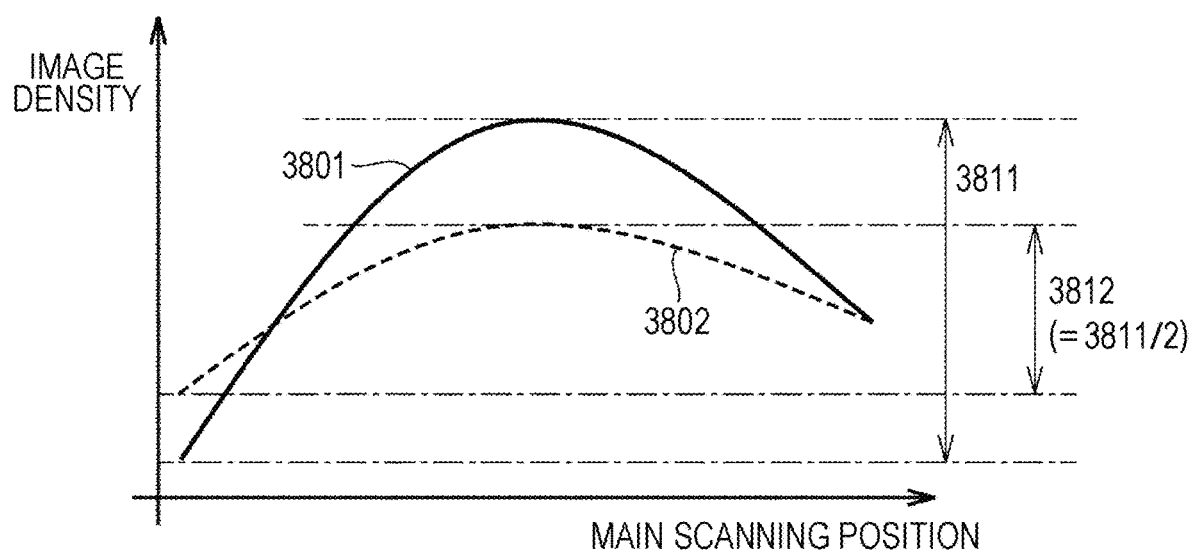
FIG. 38 is a diagram illustrating an example of processing when a base of white toner is used for a patch by the image forming device.

FIG. 38 is a diagram illustrating an example of processing when the base with the white toner is used for a patch by the image forming device 100. The image forming device 100 may use, for example, the processing described with reference to FIG. 33 and the processing described below with reference to FIG. 38 in combination.

White toner is generally used for printing white content or used as a background (base) for clearly printing a color image on a transparent film. For example, the image forming device 100 can print a base image of a patch with the white toner on the medium 120 on which the patch is difficult to read, such as a transparent film or a metal vapor deposited film.

The image forming device 100 prints a base image with the white toner on the medium 120 such as a metal vapor deposited film, and reads a patch printed on the base image. The image forming device 100 may adjust the print settings so as to correct the gradation change in the read patch as it is.

However, depending on the medium 120 or the toner to be used, depending on the presence or absence of the base with the white toner, there is a possibility that a tendency that a change in the gradation characteristic or the characteristic of the image formation appears as density unevenness greatly changes. For example, a uniform gradation image printed on the base image with the white toner may have smaller density unevenness than a uniform gradation image directly printed on the medium 120.

Such a change in density unevenness can occur due to the interaction between the base toner and the color developing toner in each process step of the transfer, layer configuration, and fixing of the powder toner. The image forming device 100 can convert a correction value obtained by analyzing the patch printed on the base with the white toner into a correction value in a case where color printing is directly performed on the medium 120 by measuring in advance the change in the density unevenness due to the presence or absence of the base with the white toner.

More specifically, the image forming device 100 acquires information about the density unevenness of the patch with a base image with the white toner and the density unevenness of the patch without the base with the white toner with a pre-patch or the like before printing. A graph 3801 illustrates a density change (density unevenness) in the main scanning direction of the patch without the base with the white toner. A graph 3802 illustrates a density change (density unevenness) in the main scanning direction of the patch with the base with the white toner. The density range 3811 indicates a range of density unevenness of the patch without the base with the white toner. The density range 3812 indicates the range of the density unevenness of the patch with the base with the white toner. In the example of FIG. 38, the density range 3812 is ½ of the density range 3811.

In this case, the image forming device 100 can use the correction value as a correction value of the user content without the white toner by doubling the correction value obtained by measuring the patch with the base with the white toner.

In an aspect, in a case where there is a possibility that the gradation characteristics of the image change depending on the presence or absence of the base with the white toner, the image forming device 100 may acquire the gradation characteristic of the image in a case where there is the base with the white toner and the gradation characteristic of the image in a case where there is no base with the white toner in advance with a pre-patch or the like before printing. For example, it is assumed that there is a relationship in which the gradation characteristic of the image in a case where there is the base with the white toner is 1/1.2 times the gradation characteristic of the image in a case where there is no base with the white toner. In this case, the image forming device 100 can use the correction value as the correction value (in consideration of the change in the gradation characteristic) of the user content without the white toner by multiplying a correction value obtained by measuring the patch with the base with the white toner by 1/1.2.

In addition, the amount of toner that can be used in image formation is limited. The limitation is a limitation for securing transferability or fixability of the toner image. In addition, the limitation is also a limitation for preventing the printed surface from being uneven or easily peeled off due to an excessive thickness of the printed toner image. Normally, the amount of white toner used as a base tends to be larger than that of another toner used for a color image. Therefore, the image forming device 100 is required to limit the total amount of toner used for an image when the image is printed on the base with the white toner, compared with the total amount of toner used for an image when the image is directly printed on the medium 120. Therefore, in an aspect, the image forming device 100 may change the gradation value, design, size, and/or arrangement of the patch so that the total toner amount of the patch on the base with the white toner is smaller than the total toner amount of the patch on the medium 120.

When paper and toner are used for a base, the total amount of toner printed on the medium 120 (total of white toner and color developing toner) increases, so that it takes time to transfer and fix the image, and the printing speed (conveyance speed of the medium 120) may decrease. Therefore, in an aspect, the image forming device 100 may change the reading speed of the image scanner 110 when reading various patches.

In addition, for the crossmark, there is a possibility that the density or thickness of the rendering line changes due to the presence or absence of the base with the white toner. Furthermore, the contour of the white toner base generates a shadow on the background plate 303, and this shadow may be noise at the time of reading the crossmark. Therefore, in an aspect, the image forming device 100 may change the thickness of the rendering line of the crossmark based on the presence or absence of the base with the white toner in order to suppress the influence on the crossmark of the base with the white toner. In another aspect, the image forming device 100 may change (specifically, change the template) the template matching process used for the image process of searching for the crossmark from the read image based on the presence or absence of the base with the white toner. In another aspect, the image forming device 100 may change a detection threshold value such as a density difference for identifying a rendering line of a crossmark and/or a read image signal value difference based on the presence or absence of the base with the white toner.

In still another aspect, the image forming device 100 can suppress occurrence of a screen moire (a state in which a so-called "rosetta pattern" is conspicuous) at the time of patch rendering. More specifically, the image forming device 100 identifies a combination of colors that can be used as the mixed color based on the measurement result of the spot color (color tone discrimination result). In addition, the image forming device 100 selects a printable screen configuration based on a combination of the selected colors. In an aspect, the image forming device 100 may store, in a storage, the setting of a combination of a mixed color and colors, and the setting of a combination of colors and a screen configuration printable by the combination of the colors. The image forming device 100 can read these settings from the storage into the memory and refer to the settings.

As described above, in rendering the patch, the image forming device 100 can eliminate the influence of the screen moire at the time of reading the patch by selecting the screen configuration in which the screen moire does not occur based on the combination of colors. Furthermore, the image forming device 100 can suppress the occurrence of screen moire and realize smooth image printing also in rendering the user content.

Figure 39:
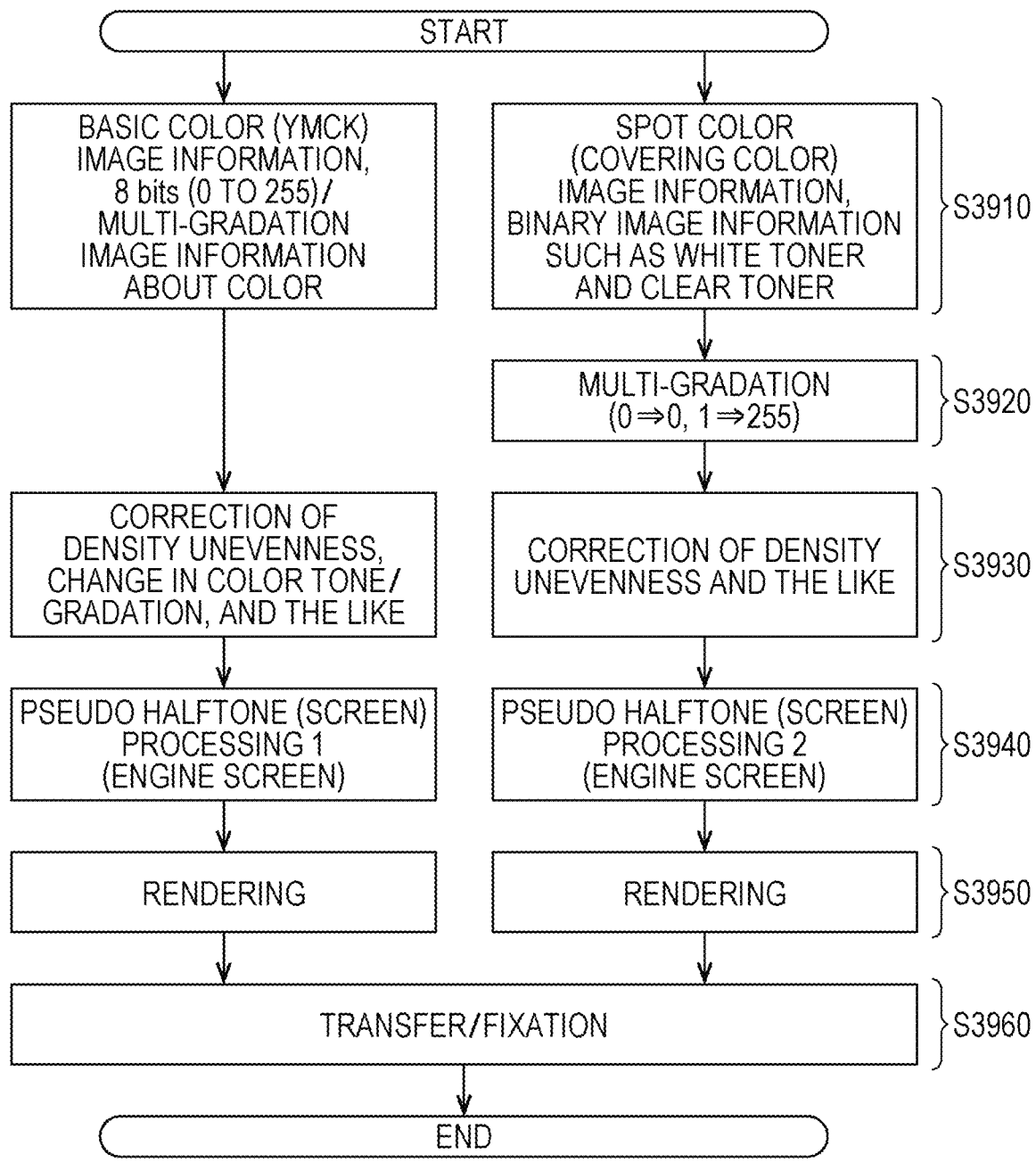
FIG. 39 is a view illustrating an example of a determination procedure of the number of screen lines in a case where there is a covering color toner.

FIG. 39 is a diagram illustrating an example of a determination procedure of the number of screen lines in a case where there is the covering color toner. The "covering color toner" includes a base toner such as a white toner, a finishing toner such as a clear toner, and the like. In addition, the base color and the color of the finishing material may be referred to as "covering color".

In step S3910, the image forming device 100 acquires basic color image information (for example, multi-gradation image information about a color expressed by 8 bits (0 to 255) or the like) via the communication unit 103. Furthermore, the image forming device 100 acquires spot color image information (binary image information about covering color toner such as white toner and clear toner) via the communication unit 103. The covering color toner is often used as a binary image such as a base toner or a finishing toner. Therefore, the image forming device 100 can acquire information about the covering color toner as binary information from a print control device (sometimes referred to as a "controller"). However, the binary information may be acquired as multi-gradation image information as in the basic color image information (in this case, the binary information is expressed by using only two gradation values of multi-gradations, for example, gradation values of 0 and 255.).

In step S3920, the image forming device 100 converts the binary image information into multi-gradations (for example, the binary image information is converted into multi-gradation values up to 0 to 255.). As described above, when the covering color toner information is acquired as information about multi-gradations, conversion into multi-gradations (conversion) is unnecessary. In this way, the image forming device 100 enables gradation expression by the covering color, and can execute the correction process for density unevenness described later on the covering color. In an aspect, the image forming device 100 may receive multi-gradation image information about the covering color toner from the controller. Note that the halftoning process used when generating a halftone (pseudo multi-gradation image) image with the covering color toner generated in the image forming device is also referred to as an "engine screen". In addition, the halftoning process used when generating a halftone (pseudo multi-gradation image) image, with the covering color toner, generated by the controller or originally included in the document image may be referred to as a "controller screen".

The engine screen and the controller screen are desirably designed so as not to interfere with each other. As an example, in a case where a combination of AM screens is utilized as the halftoning process of each of the engine and the controller, it is preferable that the number of lines of the controller screen is less than (preferably less than or equal to half) the number of lines of the engine screen.

While the controller image subjected to the controller screen processing is binary, the engine screen can use a control mechanism in more detail depending on the characteristics of the image forming mechanism. For example, it can finely adjust the exposure intensity or time for each dot of a pixel in the case of scanning exposure of electrophotography using an LD and a polygon mirror, and the intensity of a dot in the case of an inkjet dot. Therefore, since the engine screen can perform fine control as compared with the controller screen, a high-definition (higher number of lines) screen design is possible. Therefore, by setting the controller screen to have a low number of lines than the engine screen, it is possible to prevent image deterioration such as unintended moire caused by mutual interference between the controller screen of the document image and the engine screen.

In an aspect, the image forming device 100 may determine the screen process (image forming process) setting of the engine screen based on the setting of the controller screen set for the "covering color" by the operator.

In step S3930, the image forming device 100 performs the correction process for density unevenness and the like of the basic color image and the covering color image by the correction process described above. As an example, the image forming device 100 may detect and correct a change in the covering color toner by reading and analyzing real-time gradation patches printed on the base toner or finishing toner (covering color toner) by the image scanner 110. As a result, the image forming device 100 can maintain the quality of the covering color constant. Further, the image forming device 100 can also print a density unevenness adjustment chart of the covering color, and read and analyze the density unevenness of the covering color toner by the image scanner 110 to correct the density unevenness. In the correction, the image forming device 100 can use the gradation correction by the engine screen also in the case of forming an image with the covering color toner.

In an aspect, the image scanner 110 may change the illumination light based on the characteristics of the covering color. The scanner reading conditions or the illumination light may be appropriately switched. As an example, in a case where the covering color is white toner, the image forming device 100 may use illumination light used for reading normal basic color toner in reading the covering color. As another example, in a case where the covering color is a clear toner emitting fluorescence, the image forming device 100 may use an ultraviolet (UV) light source as illumination light.

In step S3940, the image forming device 100 performs halftoning (pseudo halftone process) on the basic color and the covering color. The pseudo halftone process may be similarly performed on both the basic color and the covering color. However, for example, it is assumed that the AM screens in the basic color and the covering color have the same number of lines and the same angle. In this case, interference between screens may occur in an image in which the basic color and the covering color are superimposed. Therefore, it is desirable that the halftoning of the basic color (pseudo halftone process) and the halftoning of the covering color (pseudo halftone process) are designed to be different from each other. As an example, the image forming device 100 performs halftoning of the basic color and the covering color using the pseudo halftone process 1 (design 1) of the basic color and the pseudo halftone process 2 (design 2) of the covering color.

In step S3950, the image forming device 100 renders the image in the basic color and the pseudo multi-gradation image in the covering color created in step S3940 by the image former 104.

In step S3960, the image forming device 100 transfers and fixes the image in the basic color and the image in the covering color to the medium 120.

<F. Application Example>

The image forming device 100 can appropriately combine and use the above-described method for generating various patches, the change in patch reading settings, the printed image correction process, and the like. For example, the image forming device 100 can execute the generation of the density unevenness correction patch, the generation of the gradation adjustment patch, the image correction based on the reading result of the patch, and the processing of preventing the screen moire from occurring in combination.

The image forming device 100 has functions (pre-patch printing function, function of allowing a user to select a setting to be used, and the like) for selecting the method for generating various patches, the change in patch reading settings, and the printed image correction process. These functions will be described with reference to FIGS. 40 to 43. The image forming device 100 may use the methods illustrated in FIGS. 40 to 43 in combination as appropriate.

Figure 40:
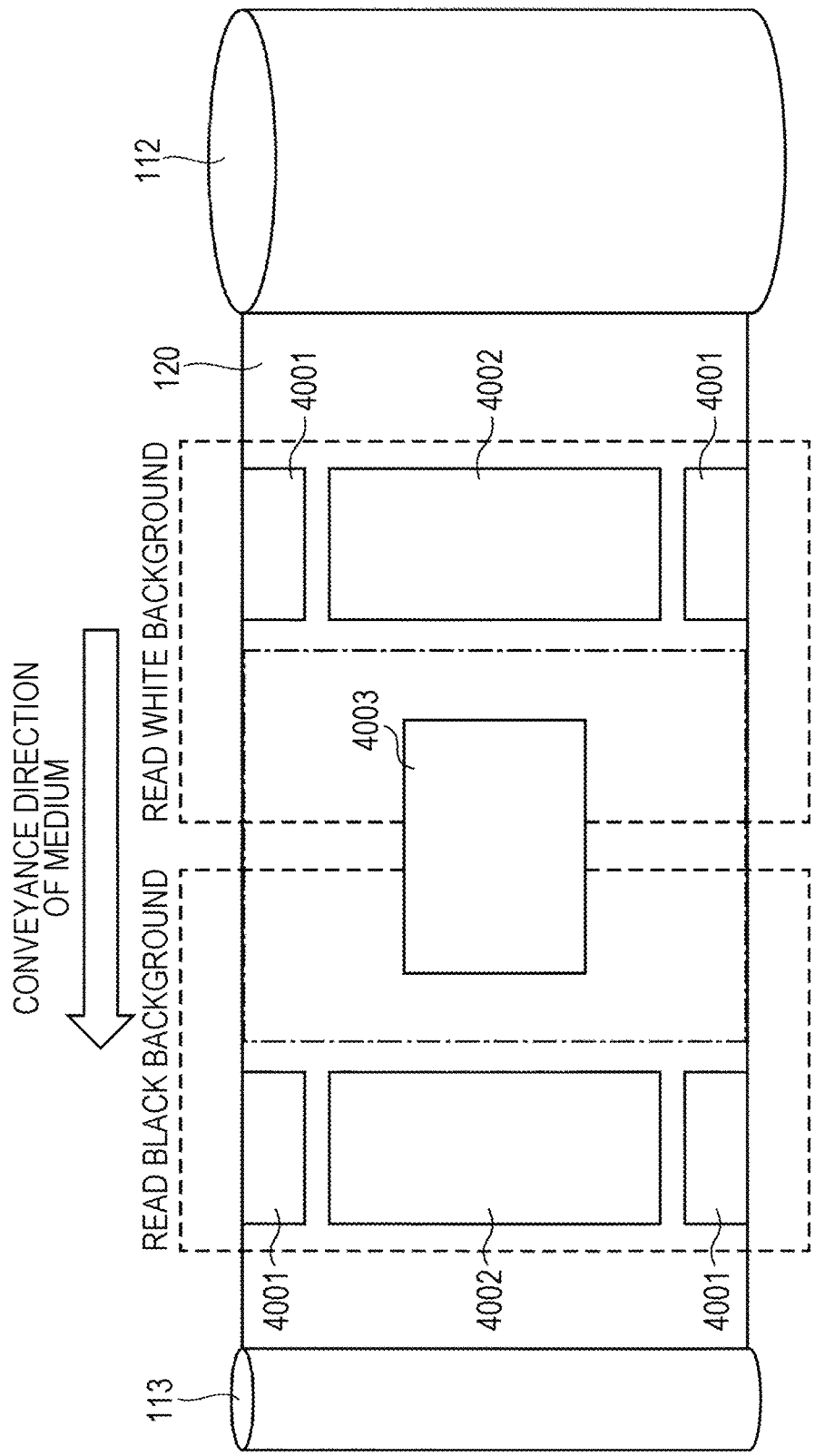
FIG. 40 is a diagram illustrating a first example of a pre-patch.

FIG. 40 is a diagram illustrating a first example of the pre-patch. As described above, when various inspections or adjustments are performed based on the image read by the image scanner 110, the patch to be printed and the adjustment (correction) method of the print setting may change depending on the characteristic of the medium 120. Therefore, the image forming device 100 can print the pre-patch on the medium 120 and check the characteristic of the medium 120 before starting printing the user content.

As an example, the image forming device 100 can print a pre-patch including the patches 4001, 4002, and 4003 on the medium 120 and read the pre-patch.

The patch 4001 is a patch for checking an adhesive. The medium 120 composed of the label and the release paper includes an adhesive. When such a medium 120 is used, the adhesive may be beyond from between the label and the release paper and adhere to a roller or the like inside the image forming device 100. This adhesive may further adhere to the surface of the medium 120, causing dirt. The patch 4001 is a patch for determining whether the medium 120 is contaminated by the dirt due to adhesive. Since dirt due to the adhesive is likely to occur at the end of the medium 120, the image forming device 100 prints the patch 4001 at the end of the medium 120. In a case where dirt due to the adhesive is present on the medium 120, the image forming device 100 may change the reading range of the patch, for example, in order to suppress the influence of dirt at the time of reading the patch.

In an aspect, the image forming device 100 may read the patch 4001 using both or one of the white background plate 311 and the black background plate 312. In another aspect, the patch 4001 may be expressed in halftone.

The patch 4002 is a patch for checking gradation. The patch 4002 is used to check reading characteristics of the patch printed on the medium 120. The image forming device 100 can check the reading characteristics of the patch on the medium 120 based on the reading result of the patch 4002. The image forming device 100 can perform various settings such as a patch configuration during execution of a job or during an adjustment mode, an amount of light setting in the image scanner 110, selection of a background plate to be used, and the like based on the reading characteristics of the patch on the medium 120.

In an aspect, the image forming device 100 may read the patch 4002 using both or one of the white background plate 311 and the black background plate 312.

In another aspect, the image forming device 100 may directly print the patch 4002 on the medium 120, or may print the patch 4002 on the base with the white toner or the like.

In another aspect, the image forming device 100 may directly print the patch 4002 on the medium 120, further print the patch 4002 on the base with the white toner or the like, and compare the reading characteristics of these two types of patches. Based on the comparison result, the image forming device 100 can perform various settings such as a patch configuration (for example, whether a base is used for the patch, and the like) during execution of a job or during an adjustment mode, amount of light setting in the image scanner 110, selection of a background plate to be used, and the like.

The patch 4003 is a non-gradation patch for determining the characteristics of the sheet itself. The image forming device 100 can perform various settings such as a patch configuration during execution of a job or during an adjustment mode, an amount of light setting in the image scanner 110, selection of a background plate to be used, and the like based on the reading result of the patch 4003.

In an aspect, the image forming device 100 may read the patch 4003 using both or one of the white background plate 311 and the black background plate 312.

Note that the configuration of the pre-patch illustrated in FIG. 40 is an example, and the configuration of the pre-patch that can be printed by the image forming device 100 is not limited thereto. In an aspect, the pre-patch may include any type of patch, and the design of each patch and the arrangement of respective patches may be set at any position. Further, each patch may be read using both or one of white background plate 311 and black background plate 312.

Figure 41:
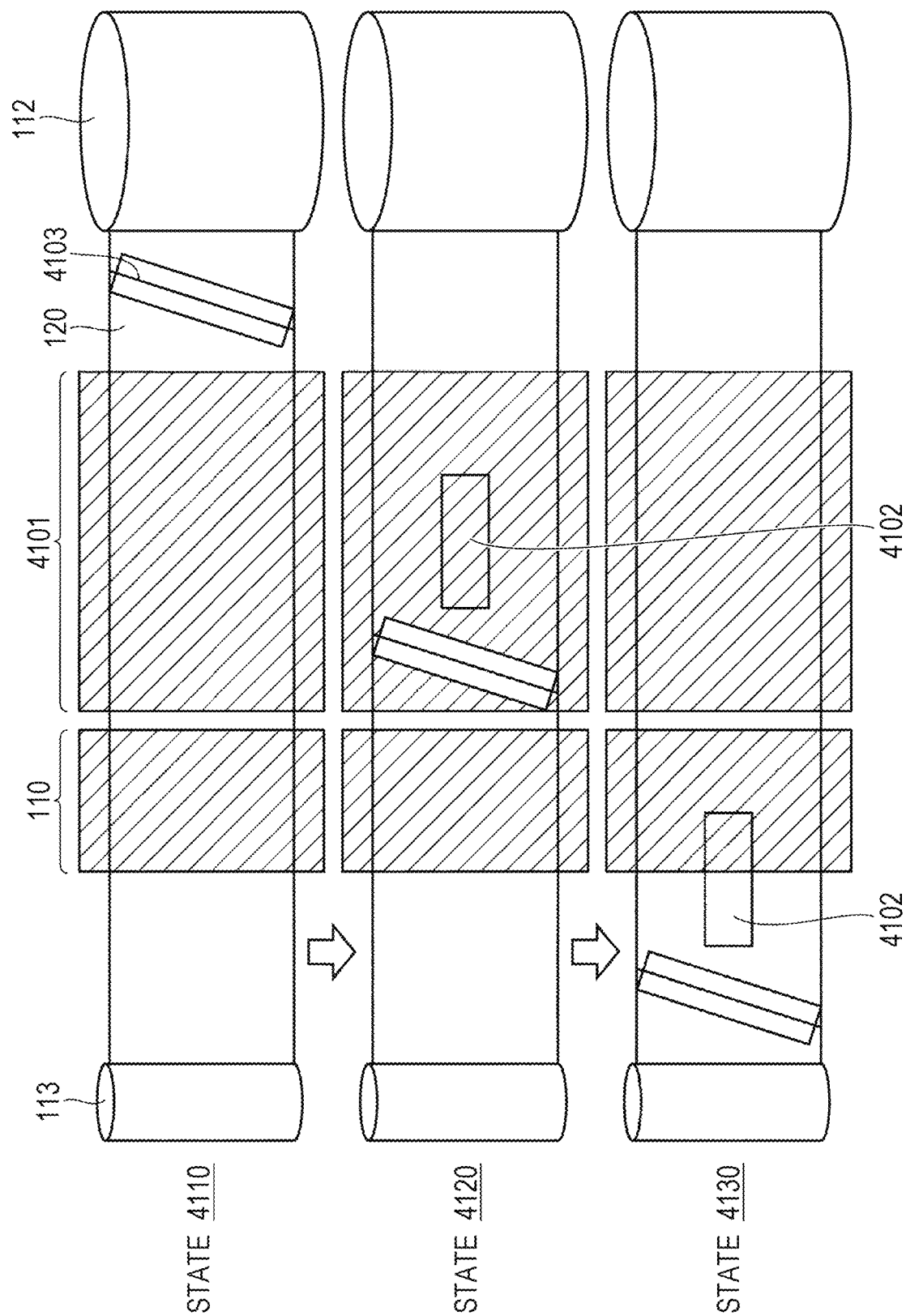
FIG. 41 is a diagram illustrating a second example of a pre-patch.

FIG. 41 is a diagram illustrating a second example of the pre-patch. It is preferable that the image forming device 100 print and read a pre-patch every time a new medium 120 is loaded in the image forming device 100. In addition, the image forming device 100 preferably performs various settings such as a patch configuration during execution of a job or during an adjustment mode, an amount of light setting in the image scanner 110, selection of a background plate to be used, and the like based on a reading result of the pre-patch every time a new medium 120 is loaded in the image forming device 100.

Therefore, every time a new medium 120 is loaded in the image forming device 100, the image forming device 100 prints a pre-patch 4102 on the medium 120 and reads the pre-patch 4102. The pre-patch 4102 is, for example, a pre-patch as illustrated in FIG. 40. States 4110, 4120, 4130 show an example of the flow up to printing and reading of the pre-patch 4102.

The state 4110 is a state immediately after the medium 120 is replaced, and the medium 120 before replacement used in the previous job printing or the like still remains under the image scanner 110. The medium 120 to be used in the next job is connected to the medium 120 before replacement by a locking portion 4103. The locking portion 4103 may be, for example, any locking adhesive tape or the like. As an example, the locking portion 4103 may be a transparent tape, or may be a tape coated with a colored locking agent in dark color or red that is easily recognized by various original color sensors. By using the colored tape, the locking portion 4103 is located before a printing machine body 4101 (image former 104 to fixing unit 108 and the like).

The state 4120 is a state in which the medium 120 is slightly conveyed, and since the locking portion 4103 is passing through the image former, various images can be formed on a new medium 120. Therefore, the image forming device 100 prints the pre-patch 4102 after 4103.

The state 4130 is a state in which the pre-patch 4102 has passed through the image scanner 110, and the image forming device 100 reads the pre-patch 4102 as the pre-patch 4102 passes through the image scanner 110. In addition, the image forming device 100 performs various settings such as a patch configuration during execution of a job or during an adjustment mode, an amount of light setting in the image scanner 110, selection of a background plate to be used, and the like based on the reading result of the pre-patch 4102.

FIG. 42 is a diagram illustrating an example of combination information about settings to be used. The image forming device 100 can change various settings such as a patch configuration, a patch reading setting, and a printed image correction setting. That is, the image forming device 100 can use these various settings in combination.

The image forming device 100 may display a setting screen on the operation display unit 102 so that the operator can select a combination of these various settings. In another aspect, the image forming device 100 may automatically determine a combination of various settings based on an execution result of the pre-patch and/or the real-time gradation patch.

The image forming device 100 may store a combination of various settings as a table 4200 in a storage. In addition, the image forming device 100 may present options of settings to be used to the operator using the table 4200. In an aspect, the image forming device 100 may hold a combination of various settings in any data format other than a table. As an example, the table 4200 includes a combination number item 4201, a background plate color item 4202, a white base presence/absence item 4203, a chart design item 4204, and a selection frequency item 4205.

The combination number item 4201 relates to a number for uniquely identifying a combination of various settings. In an aspect, the combination number may be expressed by any character string such as alphanumeric characters. The background plate color item 4202 relates to which of the white background plate 311 or the black background plate 312 is to be use. The white base presence/absence item 4203 relates to whether to print the patch on the base with the white toner (with white base) or directly print the patch on the medium 120 (without white base). The chart design item 4204 relates to settings of a patch (chart) arrangement, a design, a size, and the like. The selection frequency item 4205 relates to how many times a combination of settings of the same record has been used. A larger number in the selection frequency item 4205 indicates that a combination of settings of the record is frequently used.

The image forming device 100 may display content (such as selective display of a combination of settings) corresponding to the table 4200 on the operation display unit 102. The operator can select a combination of settings based on information such as combination information about respective settings and a selection frequency.

In an aspect, the image forming device 100 may display a combination of settings having a high selection frequency in a higher order. In another aspect, when the medium 120 to be used for the first time or a combination of settings to be used for the first time is selected, the image forming device 100 may output, to the operation display unit 102, a display for confirming to the operator whether there is no problem with the selected combination of settings.

FIG. 43 is a diagram illustrating an example of reading of the crossmark or selection of a design. The image forming device 100 may change the patch configuration during execution of the job or during the adjustment mode and the patch reading setting, and may change the crossmark reading setting and/or design according to the type of the medium 120. Hereinafter, a modification of the crossmark reading setting and the design will be described.

First, an example of the reading settings of a crossmark (first crossmark) on a transparent film will be described. When the transparent film is used, dirt may adhere to a background plate 303, and the dirt may appear in the read image as noise 4303. When there is such noise 4303, the image forming device 100 may fail to read the crossmark. Therefore, the image forming device 100 searches for a crossmark line 4301 perpendicular to the conveyance direction of the medium 120 that is not easily affected by the noise 4303. Next, the image forming device 100 searches for a crossmark line 4302 orthogonal to the crossmark line 4301 (parallel to the conveyance direction of the medium 120). At this time, the image forming device 100 restricts the search range of the crossmark line 4302, and selects an image having the strongest characteristic (such as high density) among the images detected within the limited range as the crossmark line 4302. For example, the image forming device 100 may search for a candidate image of the crossmark line 4301 only from a range existing in a range overlapping with the crossmark line 4302.

In this manner, by finding one crossmark line (crossmark line 4301), the image forming device 100 can limit the search range of the other crossmark line (crossmark line 4302) to the range where the other crossmark line is reliably present. As a result, the image forming device 100 can determine the position of the crossmark while suppressing the influence of noise.

Next, an example of the reading setting of a crossmark (second crossmark) on the white base on the transparent film will be described. In the case of reading the crossmark on the white base, the white toner is reflected on the white background plate 311, whereby a shadow 4304 may be generated on the contour of the white toner base image. In this case, the image forming device 100 may erroneously recognize the shadow 4304 as a crossmark. In such a case, the shadow 4304 is formed on the contour of the white toner base. Therefore, in the case of using the white base, the image forming device 100 searches for a crossmark from the center toward the outside of the white toner base region. In this way, the image forming device 100 can find the crossmark lines 4301 and 4302 before the shadow 4304. As a result, the image forming device 100 can determine the position of the crossmark without being affected by the shadow 4304.

Next, the crossmark (third crossmark) whose design has been changed will be described. The dirt (noise 4303) on the background plate 303 is often parallel to the conveyance direction of the medium 120. Therefore, the image forming device 100 may perform printing by inclining the crossmark lines 4301 and 4302. More specifically, the image forming device 100 may print the crossmark slightly obliquely with respect to the conveyance direction of the medium 120. In this way, the image forming device 100 can easily distinguish the crossmark lines 4301 and 4302 having the inclination from the noise 4303.

In an aspect, the image forming device 100 may use the crossmark reading setting described with reference to FIG. 43 and the design change in the crossmark in combination.
<G. Example of Patch Formation and Reading Process by Image Forming Device>

Next, variations of the process of changing a patch reading method, the process of changing image quality determination, the processing of forming a patch on the medium 120 according to the type of the medium 120, and the process of changing image formation control based on a patch reading result by the image inspection system according to the present embodiment will be described.
(a. Process of Changing Patch Reading Method)

The control unit 510 controls image formation by the image former based on a read image generated by the reader 560 reading the medium on which the patch is formed. Furthermore, the reading control unit 550 changes the method of reading the patch by the reader 560 based on the medium on which the patch is formed.

In an aspect, the change in the reading method may include at least one of a change in a background portion used by the reader to read the medium, a change in a reading range in which the reader reads the medium, a change in a reading procedure of an image formed by the image former, a change in a light source used by the reader to read the medium, a change in control of the light source, and a change in a reading condition in the reader. More specifically, as an example, the reader 560 can adjust the amount of light at the time of reading as illustrated in FIG. 24 and the like according to the type of medium. Furthermore, as another example, the reader 560 can adjust the patch reading range according to the type of medium as described with reference to FIG. 25 and the like. Furthermore, as another example, the reader 560 can change the background plate (background portion) 303 according to the type of medium.

In an aspect, the image inspection system may acquire information about the medium by the identifier 570, and change the method of reading the patch by the reader 560 using the information about the medium. As an example, the image inspection system can increase the amount of light at the time of reading the patch based on the identifier 570 determines that the medium is the black paper. The image inspection system can use a color (black or the like) which is hardly affected by the logo of the release paper as the color of the background plate (background portion) 303 based on the identifier 570 determining that the medium is the release paper with the logo.

In an aspect, the information about the medium may include at least one piece of information about a type of the medium and information about a characteristic of the medium. The type of the medium may include category information about the medium, a model number of a product of the medium, and the like. The characteristic of the medium may include any characteristic information such as color, presence or absence of reflection, and transparency.

In an aspect, the image inspection system may acquire the information about the type of the medium by the acquisitor 530. As an example, the image forming device 100 can acquire information about the type of medium based on input information (medium selection information) from a user or image information obtained by an image sensor before image formation.

In an aspect, the image inspection system may evaluate a noise component included in the read image and select a background portion in which the influence of the noise component is reduced. More specifically, as described with reference to FIG. 27 and the like, the image inspection system can evaluate the noise component included in the read image based on the presence or absence of the logo, the color of the patch and the medium, and the like, and select the white background plate 311 or the black background plate 312 so as to reduce the influence of the noise component.

In an aspect, the reading control unit 550 can further change a reading range in which the reader reads the medium based on a patch rendered on the medium. More specifically, the reading control unit 550 can adjust the reading range of the peripheral portion of the patch based on the characteristic of the contour of the patch. That is, as described with reference to FIG. 25 and the like, the reading control unit can determine the patch readable range based on the patch background and the patch, and can change (for example, reduce) the patch reading range based on the determination. As a result, the reader 560 can accurately read the patch while avoiding the outer peripheral face of the patch where a blur may occur.

In an aspect, the reading control unit 550 can select color light having the largest gradation difference between a background including a medium and a patch. That is, as illustrated in FIG. 24 and the like, for example, in a case where the medium is black paper that hardly reflects light, the reading control unit 550 can increase the amount of light reflected from the black paper by increasing the luminance of the illumination light of the light 302.

In an aspect, the reading control unit 550 may refer to a user use history storage (which may be included in the storage unit 540) when performing patch reading setting. Furthermore, the reading control unit 550 can determine a reading method based on the use history of the user. More specifically, the reading control unit 550 searches the user use history storage based on the ID of the user who has logged in to the image inspection system or the image forming device 100. When the use history of the user is found, the reading control unit 550 can use the setting of the previous patch reading in a case where the characteristic of the medium used in the previous printing process and the characteristic of the medium used in the current printing process are the same. On the other hand, when the use history of the user is not found, the reading control unit 550 uses the setting of the new patch reading. Similarly, in a case where the characteristic of the medium used in the previous printing process are different from the characteristic of the medium used in the current printing process, the reading control unit 550 uses the setting of the new patch reading.

In an aspect, the notifier 580 may make a notification related to the reading method. More specifically, the notifier 580 may notify the user that the previous patch reading setting is used. In addition, the notifier 580 may notify the user that the new patch reading setting is used. Furthermore, the notifier 580 may make a notification that the use history of the user has been found, that the use history of the user has not been found, and that the characteristic of the medium used in the previous printing process and the characteristic of the medium used in the current printing process are the same or different.

In an aspect, the reading control unit 550 may change the reading condition of the reader based on using a specific image included in the user content as a patch. More specifically, as described with reference to FIG. 16 and the like, for example, the reading control unit 550 can change the background plate 303 at the time of the reading process of the image scanner 110, adjust the exposure condition of the image scanner 110, and the like based on various conditions such as the characteristic of the medium 120, and the presence or absence of use of the base toner and the covering material. Furthermore, in a case where the area of the spot color image in the user content is small and there is a possibility that the accuracy of reading the spot color image by the image scanner 110 is affected, the reading control unit 5500 may reduce the ratio of the participation of the inspection image (reading result of the spot color) in the user content in the print setting correction process. Furthermore, in a case of reading the spot color image included in the user content, the reading control unit 550 can set the color and/or the exposure condition of the background plate 303 at the time of reading in accordance with the user content.

(b. Process of Changing Quality Determination of Image)

The control unit 510 controls image formation by the image former based on a read image generated by the reader reading the medium on which the patch is formed. Furthermore, the determination control unit 590 can change a determination method for determining quality of an image formed on a medium based on the medium on which the patch is formed.

In an aspect, the determination control unit 590 can execute, as a change in the determination method, at least one of a change in a gradation range used for determination, a change in an image forming method of an image used for determination, a change in a determination criterion, a change in a patch used for determination, and a change in the number of times of measurement of a patch used for determination. More specifically, as described with reference to FIG. 16 and the like, for example, the determination control unit 590 can change the gradation range used for determination by using a spot color included in the user content as a patch. For example, when the S/N ratio of the read image is small, the determination control unit 590 may increase the number of times of image reading. Furthermore, for example, in a case where the medium is a medium that easily specularly reflects light, such as a metal vapor deposited film, the determination control unit 590 can exclude a gradation range (the second gradation range 3202 in FIG. 32) in which an increase/decrease in toner density does not lead to a change in gradation from targets of patch reading and quality determination.

In an aspect, the image inspection system may acquire the information about the medium by the identifier 570, and change the method of determining the quality of the patch by the reader 560 using the information about the medium.

In an aspect, the information about the medium may include at least about a type of the medium and at least one piece of information about a characteristic of the medium. The type of the medium may include category information about the medium, a model number of a product of the medium, and the like. The characteristic of the medium may include any characteristic information such as color, presence or absence of reflection, and transparency.

In an aspect, the image inspection system may acquire the information about the type of the medium by the acquisitor 530. As an example, the image forming device 100 can acquire information about the type of medium based on input information (medium selection information) from a user or image information obtained by an image sensor before image formation. Furthermore, the control unit 510 can identify the medium based on a result acquired by the acquisitor 530.

In an aspect, the determination control unit 590 can change or select the gradation range used for the quality determination of the patch based on the reading result obtained by reading the medium as illustrated in FIG. 32 and the like.

In an aspect, as illustrated in FIGS. 10, 11, and the like, the determination control unit 590 can change a patch used for determination by forming a patch on a white base (base with the white toner) image formed on a medium.

In an aspect, the determination control unit 590 can determine whether to form a white base image based on the analysis results of the medium and the patch obtained by the control unit 510, the reading control unit 550, the identifier 570, and the like.

In an aspect, the determination control unit 590 can detect noise present in a background including a medium, and can change a determination criterion for determining quality of an image formed on the medium based on the detection result. As illustrated in FIG. 31 and the like, for example, the determination control unit 590 can average the values of the noise of the patch background in the sub-scanning direction, and can suppress the influence of the noise in the patch reading. In addition, the determination control unit 590 may perform the density unevenness correction setting only in a case where the value of the density unevenness obtained by the analysis of the density unevenness measurement patch is larger than the value of the signal change in the noise pattern. In addition, the determination control unit 590 may repeatedly read the noise pattern of the patch background before the patch reading process, and average the values of the noise of the patch background in advance based on the reading result. The determination control unit 590 may use the average value of the noise values for each type of the medium 120 stored in the storage (storage unit 540).

In an aspect, the determination criterion may be a threshold value related to density unevenness. In this case, the determination control unit 590 can change the threshold value for the quality determination of the patch according to the intensity of the noise.

As an example, a change in the threshold value for the quality determination of the patch will be described with reference to FIG. 9. The patch illustrated in FIG. 9 is a chart for measuring and correcting the density unevenness of the toner image on the blue release paper. The patch is a patch assuming that the blue release paper is plain and homogeneous. Therefore, in a case where the blue release paper is release paper with a pattern such as a logo as illustrated in FIG. 27, the determination control unit 590 may erroneously recognize the pattern as the density unevenness of the toner image. Furthermore, there may be paper making unevenness in blue peeling itself. The paper making unevenness also causes patch unevenness. The pattern of the release paper itself or the paper making unevenness as described above is difficult to distinguish from the patch unevenness. Therefore, the determination control unit 590 changes the threshold value so as not to set the relatively fine unevenness as a correction target. Then, the determination control unit 590 calculates the correction value using only the density unevenness component exceeding the changed threshold value as the correction target. The determination control unit 590 does not set unevenness less than the threshold value (pattern of the release paper itself, paper making unevenness, or the like) as a correction target (set correction value in which the correction process is not actually performed, such as 0).

In an aspect, the determination criterion may be a range for detecting noise. In this case, the determination control unit 590 can change the cycle of the noise or the minimum size of the spatial frequency for detecting the noise. As illustrated in FIG. 31 and the like, for example, the determination control unit 590 can change the cycle of the noise or the minimum size of the spatial frequency (patch reading size) for detecting the noise according to the cycle of the detected noise.

In an aspect, the determination control unit 590 can change the patch used for the quality determination by using the specific image included in the user content as the patch. As illustrated in FIG. 16 and the like, for example, the determination control unit 590 can include the spot color image included in the user content in the patch.

In an aspect, the determination control unit 590 can control the contribution rate of the specific image to the determination result according to the validity of the specific image as a patch. As an example, as illustrated in FIG. 16 and the like, the determination control unit 590 can control the contribution rate of the specific image to the determination result according to the ratio or the like of the spot color image included in the user content.

In an aspect, the determination control unit 590 may determine the state of the background portion used by the reader to read the medium based on a reading result obtained by reading a region where no image is formed by the image former in the medium. More specifically, the reader 560 reads a portion, of the medium, where no image is printed or a margin portion of printing during printing, an adjustment mode, a patch reading operation before printing, or the like. Then, the determination control unit 590 can analyze an image of a portion, of the medium, where no image is printed or a margin portion of printing, and can determine whether there is dirt on the background plate 303 to such an extent as to affect image inspection.

(c. Process of Forming Patch on Medium According to Type of Medium)

The control unit 510 controls image formation by the image former 520 based on a read image generated by the reader reading the medium on which the patch is formed. In addition, the control unit 510 causes the image former 520 to form a patch corresponding to the medium on the medium. As an example, as illustrated in FIG. 24, in a case where the medium is black paper, the control unit 510 may print a white base on the medium and print a patch on the white base.

In an aspect, the control unit 510 causes the image former to form, as a patch corresponding to the medium, any one of a patch to which a base image is added, a patch whose design is changed, and a specific image included in user content on the medium. More specifically, as an example, as illustrated in FIGS. 10, 11, and the like, the control unit 510 can cause the image former to form a patch to which a base image is added on the medium. Furthermore, as an example, as illustrated in 13, 15, 26, and the like, the control unit 510 can cause the image former to form a patch whose design is changed on the medium. Furthermore, as an example, as illustrated in FIG. 16 and the like, the control unit 510 can cause the image former to form a specific image included in the user content on the medium.

In an aspect, the image inspection system may acquire information about the medium by the identifier 570 and control image formation by the image former 520 using the information about the medium. As an example, as illustrated in FIG. 10 and the like, in a case where the medium is a combination of a transparent film and colored release paper, the image inspection system can cause the image former to form a density unevenness measurement patch on a white base.

In an aspect, the information about the medium may include at least one piece of information about a type of the medium and information about a characteristic of the medium. The type of the medium may include category information about the medium, a model number of a product of the medium, and the like. The characteristic of the medium may include any characteristic information such as color, presence or absence of reflection, and transparency.

In an aspect, the image inspection system may acquire the information about the type of the medium by the acquisitor 530. As an example, the image forming device 100 can acquire information about the type of medium based on input information (medium selection information) from a user or image information obtained by an image sensor before image formation.

In an aspect, the control unit 510 may cause the image former to form a patch corresponding to the medium based on a result of reading the medium by the reader 560. As an example, as illustrated in FIG. 10 and the like, in a case where the medium is a combination of a transparent film and colored release paper, the image inspection system can cause the image former to form a density unevenness measurement patch on a white base.

In an aspect, the control unit 510 may cause the image former to add a white base to the patch in a case where the reading result by the reader 560 has a characteristic that the relationship between an increase/decrease in the developer and the reading gradation is partially inverted. As an example, as illustrated in FIGS. 21, 22, 23, and the like, in a case where the reading result is a reading result related to a metal vapor deposited film, hologram paper, or a transparent film, there is a possibility that the relationship between an increase/decrease in the developer and the reading gradation is partially reversed. In this case, the control unit 510 can prevent the occurrence of a phenomenon in which the relationship between an increase/decrease in the developer and the reading gradation is partially inverted by adding the white base to the patch.

In an aspect, the control unit 510 causes the image former to add a white base to the patch based on the determination that the reading result is not appropriate for analysis of the patch.

As an example, as illustrated in FIG. 27 and the like, in a case where there is a pattern such as a logo on the back face of the release paper, this also affects the reading of the patch. As a result, for example, an error may occur in the measurement of density unevenness and gradation. In addition, as illustrated in FIGS. 20 to 24 and the like, when only the color developing toner is printed on a medium having characteristics such as dark color, transparent, specular reflection, and hologram, the measurement patch may not be correctly read. In such a case, the image forming device 100 can more appropriately read the degree of light and shade of the color developing toner image by adding a white base having a characteristic of covering the surface of the medium.

In an aspect, in a case of forming, on a medium, a patch to which a white base is added, the control unit 510 may perform control different from control when the white base is added to the user content with respect to addition of the white base. As an example, as illustrated in FIG. 33 and the like, in a case where the user content is directly printed on the medium and the patch is printed on the white base, the control unit 510 can perform control different from control when the white base is added to the user content.

In an aspect, in a case where the specific image is repeatedly included in the background including the medium based on the reading result, the control unit 510 can cause the image former to form a patch corresponding to the repetition of the specific image on the medium.

For example, as illustrated in FIG. 31, the image forming device 100 can change the rectangular patch size to be N times (any integer a plurality of) the repetition cycle of a specific image such as a logo mark printed on the back face of the medium, and render the patch. Furthermore, for example, in a case where a plurality of rectangular patches having the same size is disposed as illustrated in FIG. 7, the image forming device 100 may set the patch size to be N times the repetition cycle as described above. In this way, the image forming device 100 can equalize the influence of the logo mark in the medium background when reading each patch, and can correctly read the density unevenness and the gradation change in the measurement patch.

In an aspect, the control unit 510 may change the gradation range used to form the patch based on the determination that the medium has the characteristic that the relationship between an increase/decrease in the developer and the reading gradation is partially inverted based on the reading result.

For example, when the color developing toner is printed on a glossy medium such as a deposited film as illustrated in FIG. 21, the light and shade of the toner image may change depending on the gradation value (gradation range) of the medium as in a portion 2110 to 2130. As a result, as illustrated in FIG. 32, the reading result of the toner image in the portion 2110 to 2130 changes. Therefore, for example, the image forming device 100 can restrict reading of the first gradation range 3201 and the third gradation range 3203, and can use the restriction for controlling the gradation correction and the like according to each gradation range. The change in the gradation range varies depending on the characteristics of the toner as a developer. Therefore, as illustrated in FIGS. 40, 41, and the like, the image forming device 100 may determine a gradation range in which reading is restricted from the result of the pre-patch reading. Alternatively, the image forming device 100 may store, in a storage, a setting in which the toner type and the gradation range in which reading is restricted are associated in advance.

In an aspect, the control unit 510 may change the design of the patch based on the characteristic of the contour of the patch based on the relationship between the background including the medium and the patch. As an example, as illustrated in FIG. 30 and the like, the change in design may include a change in patch size. In addition, the control unit 510 may change the number of measured patches or the size of the patch based on the degree of difficulty in reading the patch based on the relationship between the background including the medium and the patch.

In an aspect, the image inspection system may further include a first notifier (which may be included in the notifier 580) that makes a notification of correction accuracy of correction using a patch based on determination result of the degree of reading difficulty.

As described above, the patch reading including the process of adding a white base, the process of changing the patch size to an integral multiple of the logo mark, or the process of restricting the patch reading to a specific gradation range has a higher difficulty level than the patch reading on normal plain white paper, and the reliability of correction may be lowered. Therefore, the image forming device 100 may notify the user whether to execute such special processing, that the reliability of correction may decrease, and the like.

In an aspect, the image inspection system may further include a user use history storage (storage unit 540) that stores a patch in association with the user. Furthermore, the control unit 510 may refer to the user use history storage (storage unit 540) when controlling the formation of the patch on the medium by the image former 520. More specifically, the control unit 510 searches the user use history storage based on the ID of the user who has logged in to the image inspection system or the image forming device 100. When the use history of the user is found, the reading control unit 550 can use the setting of the previous patch formation in a case where the characteristic of the medium used in the previous printing process and the characteristic of the medium used in the current printing process are the same. On the other hand, when the use history of the user is not found, the reading control unit 550 uses the setting of the new patch formation.

In an aspect, the image inspection system may further include a second notifier (which may be included in the notifier 580) that makes a notification of patch formation according to the use history of the user. For example, in a case where the characteristic of the medium used in the current printing process and the characteristic of the medium used in the previous printing process are the same, the second notifier may output a notification for confirming the user whether to use the previous setting. On the other hand, when the use history of the user is not found, the second notifier may output a notification for notifying the user that the setting of the new patch formation is used.

In an aspect, the control unit 510 may control the formation of the patch on the medium according to the validity of the specific image as the patch based on using the specific image included in the user content as the patch. As an example, as illustrated in FIG. 16 and the like, the control unit 510 may replace some colors included in the real-time adjustment patch with colors (spot colors) included in the specific image.

(d. Process of Changing of Image Formation Control Based on Patch Reading Result)

In the image inspection system, the control unit 510 may cause the image former to form the image based on a read image generated reading, by the reader 560, a medium on which a patch is formed. The control unit 510 can change the control of image formation by the image former 520 based on the medium on which the patch is formed.

In an aspect, the change in the control of image formation may include at least one of a change in a correction parameter of correction using a patch, a change in a correction method of correction using a patch, and a change in a target value of correction using a patch. As an example, as illustrated in FIG. 17 and the like, when the medium is replaced, the control unit 510 may detect the presence or absence of a change in the medium, take over the correction value (target value), and change the control of image formation by the image former based on the taken over correction value (target value). As another example, as illustrated in FIG. 38 and the like, the control unit 510 can convert the correction value obtained by analyzing the patch printed on the white base into a correction value in a case of directly performing color printing on the medium by measuring in advance the change in the density unevenness due to the presence or absence of the white base.

In an aspect, the image inspection system may cause the identifier 570 to acquire information about the medium based on the read image and identify the medium.

In an aspect, the information about the medium may include at least one piece of information about a type of the medium and information about a characteristic of the medium. The type of the medium may include category information about the medium, a model number of a product of the medium, and the like. The characteristic of the medium may include any characteristic information such as color, presence or absence of reflection, and transparency.

In an aspect, the image inspection system may acquire the information about the type of the medium by the acquisitor 530. As an example, the image forming device 100 can acquire information about the type of medium based on input information (medium selection information) from a user or image information obtained by an image sensor before image formation. The control unit 510 can identify the medium based on a result acquired by the acquisitor 530.

In an aspect, the change in the correction method may include changing control of image formation by the image former by switching between absolute gradation correction, relative gradation correction, and correction by a process parameter.

For example, as illustrated in FIG. 33, in a case where the gradation characteristic of the medium is high, the appropriate correction control method is different depending on with or without the base with the white toner. The image forming device 100 may switch the correction based on the presence or absence of the base with the white toner. Furthermore, the image forming device 100 can select a more effective control method such as selecting correction with particularly effective process parameters for a medium having gloss or the like as illustrated in FIG. 32.

In an aspect, when the image former forms an image using a covering material, the control unit 510 can perform correction using a correction coefficient corresponding to a medium in correction using a patch. As an example, as illustrated in FIG. 33 and the like, the image forming device 100 can reproduce original gradation characteristics from gradation characteristics obtained from the density of the patch printed on the white toner base by using the correction coefficient.

In an aspect, the control unit 510 may perform correction based on a reading result obtained by reading a patch formed on a medium based on a gradation difference between the background including the medium and the patch being small.

As an example, the control unit 510 can change the number or the size of patches as illustrated in FIG. 30 and the like. Furthermore, as illustrated in FIG. 29 and the like, the control unit 510 can select color light used for measurement or correction. Furthermore, in a case where these processes are required, that is, in a case where the patch reading difficulty level is high, the control unit 510 may notify the user of the situation.

In an aspect, the control unit 510 may switch between the absolute gradation correction, the relative gradation correction, and the correction by the process parameter based on a result of reading the medium by the reader.

For example, as illustrated in FIG. 33, an appropriate control method differs depending on differences in gradation characteristics, highest density, and the like for each medium or patch on the medium. For example, the image forming device 100 can select a more effective control method such as selecting correction with particularly effective process parameters for a medium having a characteristic that the reading gradation value changes as illustrated in FIG. 32. Furthermore, as illustrated in FIGS. 40 and 41, from a result of reading the pre-patch, the image forming device 100 may select the above control method and may store a setting in which the above control method is associated with the toner type in advance in the storage.

In an aspect, the control unit 510 may perform switching based on the medium being a medium in which the relationship between an increase/decrease in the developer and the reading gradation is partially inverted based on the reading result.

For example, the image forming device 100 can select a more effective control method such as selecting correction with particularly effective process parameters for a medium having a characteristic that the reading gradation value changes as illustrated in FIG. 32. Furthermore, as illustrated in FIGS. 40 and 41, from a result of reading the pre-patch, the image forming device 100 may select the above control method and may store a setting in which the above control method is associated with the toner type in advance in the storage.

In an aspect, the control unit 510 may generate the correction parameter based on a result of reading the medium by the reader. For example, from a result of reading the pre-patch, the image forming device 100 may select the above control method and may store a setting in which the above control method is associated with the toner type in advance in the storage.

In an aspect, the storage unit 540 may store color tone information about the medium based on a result of reading the medium by the reader 560. Furthermore, the control unit 510 can store the color tone information about the medium based on the read image in the storage unit 540, and can acquire the color tone information about the medium to be used for the current printing before or at the time of printing. The control unit 510 may refer to the storage unit 540 to acquire the color tone information about the medium used for the previous printing, and change the target of the gradation correction based on the characteristic of the color tone information about the medium used for the current printing being different from the characteristic of the color tone information about the medium used for the previous printing.

For example, the image forming device 100 can acquire color tone information by rendering a patch illustrated in FIG. 16, and execute the control illustrated in FIGS. 17 to 18 based on the acquired color tone information, thereby performing image formation and correction control well adapted to the switching of the print medium.

(e. Process of Changing of Patch Reading Method Based on Presence or Absence of White Base)

In the image inspection system, the control unit 510 can cause the image former to form the image based on the read image generated by reading the medium on which the patch is formed by the reader. The reading control unit 550 can change the method of reading the patch by the reader based on the image formed on the medium by the image former.

In an aspect, the reading control unit 550 may change the method of reading the patch by the reader in a case where the image formed on the medium by the image former 520 includes a base image or a covering image (transparent toner or the like).

In an aspect, the change in the reading method may include at least one of a change in a background portion used for reading the medium by the reader, a change in a light source used for reading the medium by the reader, a change in control of the light source, a change in a conveyance speed of the medium at the time of reading by the reader, a change in a reading clock in the reader, a change in a read image generated by the reader, a change in a reading procedure of an image formed by the image former, and a change in a reading range in which the reader reads the medium. More specifically, as an example, as illustrated in FIG. 24 and the like, the reading control unit 550 can adjust the amount of light at the time of reading according to the type of medium. Furthermore, as another example, as illustrated in FIG. 25 and the like, the reading control unit 550 can adjust the reading range of the patch according to the type of medium. Furthermore, as another example, the reading control unit 550 can change the background plate (background portion) 303 according to the presence or absence of the white base. Furthermore, as illustrated in FIG. 29 and the like, the reading control unit 550 can change the light source based on the presence or absence of a white base.

In an aspect, the reading control unit 550 may use a background portion including black color based on the fact that the patch is an image formed on a white base, and may use a background portion including white color in a case where the patch is an image directly formed on the medium. Furthermore, in an aspect, the reading control unit 550 can use a background portion including white color at the time of reading an image in a color other than white included in the patch based on the fact that the patch is an image formed on a white base. As an example, as illustrated in FIG. 11, the reading control unit 550 can select either a background portion including white color or a background portion including black color based on the presence or absence of a white base.

In an aspect, in a case where the patch is an image formed on a white base, the reading control unit 550 can change the image reading procedure based on the background portion used for reading the patch. For example, it is assumed that the image forming device 100 reads the crossmarks illustrated in FIG. 43. At this time, in a case where there is no white base, for example, when a crossmark is rendered on a transparent medium, a shadow of the crossmark may appear in the read image as in the image illustrated in FIG. 20. Therefore, the image forming device 100 is required to adjust a detection threshold value used for detecting the crossmark, for example, a detection threshold value in edge detection processing so as not to erroneously detect a shadow of the crossmark. On the other hand, in a case where the crossmark is rendered on a white base, the influence of the shadow of the crossmark on the transparent medium can be ignored, and thus the image forming device 100 does not need to adjust the detection threshold value.

As another example, it is assumed that the image forming device 100 reads the crossmark 905 on a rectangular white base having a small area as illustrated in FIG. 9. When the crossmark 905 is rendered on the transparent medium, a white base rectangular shadow is generated, and this may be erroneously detected as a crossmark image. Furthermore, even when the white base has a large area, there may be a shadow that is erroneously detected as a shadow 4304 illustrated in FIG. 43. Therefore, for example, the image forming device 100 can change the crossmark design to the third crossmark not to react to the rectangular shadow of the white base, or can first search for the rectangular shadow and then change the crossmark detection sequence so as to detect the crossmark itself.

In an aspect, the reading control unit 550 can detect the position of the image formed on the medium by the image former based on a result of reading the patch by the reader. For example, as illustrated in FIG. 16 and the like, the reading control unit 550 can calculate a position or the like of a specific image in the user content based on a result of reading the patch (patch position).

In an aspect, the reading control unit 550 may change the patch reading control based on the reading result by the reader 560. For example, the image forming device 100 can select a preferable reading method for reading the patch rendered on the medium based on a result of reading the patch formed on the medium by the control illustrated in FIGS. 40 to 41. For example, as illustrated in FIG. 24, the image forming device 100 can change the reading control such as controlling the intensity of the illumination light (in the case of color light, for example, adjustment of the intensity of color light of rgb is also included).

In an aspect, the reading control unit 550 can change the background portion used for reading the patch based on changing the reading control. For example, as illustrated in FIG. 22, when detecting a combination of a medium and a toner image that are difficult to read on a black background, the image forming device 100 can appropriately control the background plate 410 and select a white background that is easy to read.

In an aspect, the reading control unit 550 can change the reading range of the medium by the reader based on detection of adhesion of foreign matter to the surface of the medium from the read image. As an example, as illustrated in FIG. 40 and the like, the reading control unit 550 may change the reading range of the patch in order to suppress the influence of dirt at the time of reading the patch in a case where dirt due to the adhesive or the like exists on the medium.

In an aspect, the reading control unit 550 may refer to a user use history storage (which may be included in the storage unit 540) when performing patch reading setting. Furthermore, the reading control unit 550 can determine a reading method based on the use history of the user. More specifically, the reading control unit 550 searches the user use history storage based on the ID of the user who has logged in to the image inspection system or the image forming device 100. When the use history of the user is found, the reading control unit 550 can use the setting of the previous patch reading in a case where the characteristic of the medium used in the previous printing process and the characteristic of the medium used in the current printing process are the same. On the other hand, when the use history of the user is not found, the reading control unit 550 uses the setting of the new patch reading. Similarly, in a case where the characteristic of the medium used in the previous printing process are different from the characteristic of the medium used in the current printing process, the reading control unit 550 uses the setting of the new patch reading.

In an aspect, the notifier 580 may make a notification related to the reading method. More specifically, the notifier 580 may notify the user that the previous patch reading setting is used. In addition, the notifier 580 may notify the user that the new patch reading setting is used. Furthermore, the notifier 580 may make a notification that the use history of the user has been found, that the use history of the user has not been found, and that the characteristic of the medium used in the previous printing process and the characteristic of the medium used in the current printing process are the same or different.

In an aspect, the control unit 510 can determine whether to add a white base to the patch based on the read image generated by reading the medium on which the patch is formed by the reader in order to improve the correction effect of the correction using the patch.

For example, the image forming device 100 can reliably perform patch reading even in a situation where it is difficult to perform patch reading as illustrated in FIG. 21, FIG. 24, or FIG. 27 by providing a white base to increase the accuracy of patch reading as described above. However, as illustrated in the graphs 3801 and 3802 of FIG. 38, the addition of the white base to the base of the color developing toner image may change the magnitude of the change in the density unevenness or the gradation characteristic to be measured.

Therefore, for example, in a case where the change in the density unevenness or the gradation characteristic is small, the image forming device 100 can more appropriately and stably read the patch by adding a white base to the patch. For example, in a case where the change in the density unevenness or the gradation characteristic is large and the change in reading is small when the white base is added, it is possible to determine which of (1) a state in which the white base is added and the sensitivity is lowered and (2) a state in which the white base is not added and the sensitivity for reading remains lowered is preferable for reading and to select the presence or absence of the white base.

In an aspect, the reading control unit 550 can change the reading condition of the reader based on using the specific image included in the user content as a patch. More specifically, as described with reference to FIG. 16 and the like, the reading control unit 550 can change the background plate 303 at the time of the reading process of the image scanner 110, adjust the exposure condition of the image scanner 110, and the like based on various conditions such as the characteristic of the medium 120, and the presence or absence of use of the base toner and the covering material. Furthermore, in a case where the area of the spot color image in the user content is small and there is a possibility that the accuracy of reading the spot color image by the image scanner 110 is affected, the reading control unit 550 may reduce the ratio of the participation of the inspection image (spot color reading result) in the user content in the print setting correction process. Furthermore, in a case of reading the spot color image included in the user content, the reading control unit 550 can set the color and/or the exposure condition of the background plate 303 at the time of reading in accordance with the user content.

In an aspect, the control unit 510 can generate an additional patch based on a result of reading the patch and a result of reading the specific image. For example, it is assumed that there is a patch having the same color as the specific image (image of spot colors P, G, and R) as illustrated in FIG. 16. In this case, the image forming device 100 can read the patches of these specific images by the reader 560. Then, the image forming device 100 can manage how the color of the read patch is used in the user content (specifically, the presence or absence of a base in white color or the like).

For example, it is assumed that the color included in the patch and the color included in the user content are the same color, but the patch includes a base in white color or the like, and the user content does not include the base. In this way, in a case where the color used for the patch and the user content is the same but they are different in the presence or absence of the base, the appearance and change in color of the patch are different from those of the user content. Therefore, there is a possibility that the image forming device 100 cannot appropriately read the characteristic change in the image in the same color on the user content from the reading result of the patch of the specific image.

In such a case, the image forming device 100 can add a patch of a combination of the missing toner (such as a combination of a white base and a spot color) to the patch illustrated in the gradation image 811 or FIG. 13 and read the added patch. Furthermore, the image forming device 100 can change various settings such as the color of the background plate, the intensity and color of the illumination light in the case of reading the patch as illustrated in FIG. 13 to preferable settings for reading the patch.

In an aspect, the reading control unit 550 can determine the state of the background portion used for reading the medium by the reader based on a reading result obtained by reading a region where no image is formed by the image former 520 in the medium. More specifically, the reader 560 reads a portion, of the medium, where no image is printed or a margin portion of printing during printing, an adjustment mode, a patch reading operation before printing, or the like. Then, the reading control unit 550 can analyze an image of a portion, of the medium, where no image is printed or a margin portion of printing, and can determine whether there is dirt on the background plate 303 to such an extent as to affect image inspection.

Further, the reading control unit 550 reads a region where no image is formed by the image former 520 in the medium, and reads a region corresponding to a portion where the background plate 303 does not overlap the medium. The reading control unit 550 can determine the state of the reader, particularly the degree of variation in the reading characteristic of the image scanner 110, 210, based on at least one of the reading results. The variation in the reading characteristic of the image scanner 110, 210 includes, for example, a variation in brightness of the light 302 and a variation in sensitivity of the image sensor 301 constituting the image scanner. These variations may occur due to, for example, an increase in environmental temperature caused by the thermally fixed high-temperature medium continuously passing through the image scanner 110, 210 during continuous printing. The reading control unit 550 can correct the reading characteristic of the image scanner 110, 210 to a state close to a state at the time point when at least job printing is started based on the determination result.

More specifically, it is assumed that the image former 520 repeatedly and periodically prints the real-time adjustment patch 800 as illustrated in FIG. 8 during job printing, and the reader 560 reads the real-time adjustment patch 800. At this time, in a case where the base with the white toner is added to the real-time adjustment patch 800, the reading control unit 550 uses the black background plate 312 so that the gradation change in the white toner can be easily read.

The white toner image is brighter as the white toner amount is larger. Therefore, the reading result of the white toner image tends to be affected by the reading characteristic of the image scanner 110, 210, particularly the variation in brightness of the light 302 or the variation in sensitivity of the image sensor 301. Therefore, at the time of printing using the white toner, the reading control unit 550 performs control not to render (desirably not to render the user content in the region) the real-time adjustment patch 800 in part (for example, at a ratio of 1 out of 5 times) of rendering and reading of the real-time adjustment patch 800 that are periodically repeated as described above, and to switch the background at the time of reading to the white background plate 311 only that time, and reads the white background plate 311 or the medium itself.

The white background plate 311 or the medium is considered to have a constant color tone regardless of the printing state. Therefore, in a case where the reading result of the background plate or the medium has changed from the start of the job (or the initial state for a certain period), the reading control unit 550 can determine that the reading characteristic of the image scanner 110, 210 has changed. Furthermore, the reading control unit 550 can read the direction of variation (bright reading? dark reading?) and the magnitude of variation in the image scanner 110, 210, and can correct the reading result. For example, when the read brightness (gradation) changes so as to be read 1.05 times brightly, the reading control unit 550 can perform correction such that a value obtained by dividing the reading result of the gradation of the subsequent real-time adjustment patch 800 by 1.05 is the original reading result.

Here, the long roll paper formed by joining two or more long papers may be used as the medium. When such a medium is used, the color tone may be slightly different on the surface of the medium before and after joining. Therefore, the reading control unit 550 may erroneously detect this slight change in color tone as a variation in reading characteristic of the image scanner 110, 210. Therefore, when detecting the joint portion of the medium, or detecting a state in which the reading result of the medium changes at a "certain time point" and is stable before and after the certain time point, the reading control unit 550 may determine that the paper characteristic changes at the "certain time point" and estimate a net variation in the reading characteristic obtained by eliminating the change in the paper characteristic.

Although the variation in sensitivity of the image sensor 301 is described above as influence on the reading characteristic of the image scanner 110, 210, the variation in sensitivity has two major factors. One is the magnitude of response to the intensity of light received by the image sensor 301, which is sensitivity in a narrow sense, and is also generally referred to as a "gain". In addition, the other is a phenomenon in which the response of the image sensor 301 is raised and lowered as a whole, and is generally called an "offset" (may also be referred to as a "bias" or a "0 point error, 0 point potential").

The reading control unit 550 can determine a change in the reading characteristic of the image scanner 110, 210 mainly corresponding to the "gain" by reading the white background plate 311 or the medium itself described above. In order to determine the change in the reading characteristic of the image scanner 110, 210 including the change in the factor corresponding to the "offset", the reading control unit 550 may acquire the reading result of the black background plate 312 itself (at the time of reading using the black background plate 312) in addition to the white background plate 311 or the medium itself described above, capture the change in the "offset" based on the reading result of the black background plate 312, then capture the change in the "gain" based on the reading result of the white background plate 311, and correct them as necessary.

Specifically, when correcting the "gain", the reading control unit 550 may multiply or divide the amount of light detected by the image sensor 301. When correcting the "offset", the reading control unit 550 may add or subtract the amount of light detected by the image sensor 301. When correcting both of them, the reading control unit 550 corrects the "offset" and then corrects the "gain".

As described above, the reading control unit 550 may correct the "offset" or the "gain" by numerical calculation of the digital image signal value or by numerical conversion using a look-up table corresponding thereto. Furthermore, the reading control unit 550 may use an adjustment mechanism of the "offset" or the "gain" included in an analog front end (AFE) in which an electric circuit used in a process of converting an analog signal of the image sensor 301 configured by a device such as a charge coupled device (CCD) into a digital image signal, for example, an analog to digital (AD) converter, or a circuit such as a voltage amplifier or a signal filter is incorporated.

(f. Process of Changing Image Quality Determination)

The control unit 510 controls image formation by the image former 520 based on a read image generated by the reader reading the medium on which the patch is formed. Furthermore, the determination control unit 590 can change a determination method for determining the quality of the image formed on the medium based on the image formed on the medium by the image former 520. As an example, as illustrated in FIG. 25 and the like, the determination control unit 590 or the control unit 510 can change the patch reading setting based on the presence or absence of the white base. Furthermore, as an example, as illustrated in FIG. 33 and the like, the determination control unit 590 or the control unit 510 can change the target value of the gradation characteristic of the patch based on the presence or absence of the white base in the image formed on the medium.

In an aspect, the determination control unit 590 may change a determination method for determining quality of an image formed on a medium in a case where the image formed on the medium by the image former 520 includes a base image or a covering image (transparent toner or the like).

In an aspect, the determination control unit 590 can execute, as a change in the determination method, at least one of a change in a gradation range used for determination, a change in an image forming method of an image used for determination, a change in a determination criterion, a change in a patch used for determination, and a change in the number of times of measurement of a patch used for determination. More specifically, as described with reference to FIG. 16 and the like, for example, the determination control unit 590 can change the gradation range used for determination by using a spot color included in the user content as a patch. For example, when the S/N ratio of the read image is small, the determination control unit 590 may increase the number of times of image reading. Furthermore, for example, in a case where the medium is a medium that easily specularly reflects light, such as a metal vapor deposited film, the determination control unit 590 can exclude a gradation range (the second gradation range 3202 in FIG. 32) in which an increase/decrease in toner density does not lead to a change in gradation from targets of patch reading and quality determination.

In an aspect, the image inspection system may acquire the information about the medium by the identifier 570, and change the method of determining the quality of the patch by the reader 560 using the information about the medium.

In an aspect, the information about the medium may include at least about a type of the medium and at least one piece of information about a characteristic of the medium. The type of the medium may include category information about the medium, a model number of a product of the medium, and the like. The characteristic of the medium may include any characteristic information such as color, presence or absence of reflection, and transparency.

In an aspect, the image inspection system may acquire the information about the type of the medium by the acquisitor 530. As an example, the image forming device 100 can acquire information about the type of medium based on input information (medium selection information) from a user or image information obtained by an image sensor before image formation. Furthermore, the control unit 510 can identify the medium based on a result acquired by the acquisitor 530.

In an aspect, the determination control unit 590 can change or select the gradation range used for the quality determination of the patch based on the reading result obtained by reading the medium as illustrated in FIG. 32 and the like.

In an aspect, as illustrated in FIGS. 10, 11, and the like, the determination control unit 590 can change a patch used for determination by forming a patch on a white base (base with the white toner) image formed on a medium.

In an aspect, the determination control unit 590 can determine whether to form a white base image based on the analysis results of the medium and the patch obtained by the control unit 510, the reading control unit 550, the identifier 570, and the like.

In an aspect, the determination control unit 590 can detect noise present in a background including a medium, and can change a determination criterion for determining quality of an image formed on the medium based on the detection result. As illustrated in FIG. 31 and the like, for example, the determination control unit 590 can average the values of the noise of the patch background in the sub-scanning direction, and can suppress the influence of the noise in the patch reading. In addition, the determination control unit 590 may perform the density unevenness correction setting only in a case where the value of the density unevenness obtained by the analysis of the density unevenness measurement patch is larger than the value of the signal change in the noise pattern. In addition, the determination control unit 590 may repeatedly read the noise pattern of the patch background before the patch reading process, and average the values of the noise of the patch background in advance based on the reading result. The determination control unit 590 may use the average value of the noise values for each type of the medium 120 stored in the storage (storage unit 540).

In an aspect, the determination criterion may be a threshold value related to density unevenness. In this case, the determination control unit 590 can change the threshold value for the quality determination of the patch according to the intensity of the noise. As an example, a change in the threshold value for the quality determination of the patch will be described with reference to FIG. 9. The patch illustrated in FIG. 9 is a chart for measuring and correcting the density unevenness of the toner image on the blue release paper. The patch is a patch assuming that the blue release paper is plain and homogeneous. Therefore, in a case where the blue release paper is release paper with a pattern such as a logo as illustrated in FIG. 27, the determination control unit 590 may erroneously recognize the pattern as the density unevenness of the toner image. Furthermore, there may be paper making unevenness in blue peeling itself. The paper making unevenness also causes patch unevenness. The pattern of the release paper itself or the paper making unevenness as described above is difficult to distinguish from the patch unevenness. Therefore, the determination control unit 590 changes the threshold value so as not to set the relatively fine unevenness as a correction target. Then, the determination control unit 590 calculates the correction value using only the density unevenness component exceeding the changed threshold value as the correction target. The determination control unit 590 does not set unevenness less than the threshold value (pattern of the release paper itself, paper making unevenness, or the like) as a correction target (set correction value in which the correction process is not actually performed, such as 0).

In an aspect, the determination criterion may be a range for detecting noise. In this case, the determination control unit 590 can change the cycle of the noise or the minimum size of the spatial frequency for detecting the noise. As illustrated in FIG. 31 and the like, for example, the determination control unit 590 can change the cycle of the noise or the minimum size of the spatial frequency (patch reading size) for detecting the noise according to the cycle of the detected noise.

In an aspect, the determination control unit 590 can change the patch used for the quality determination by using the specific image included in the user content as the patch. As an example, as illustrated in FIG. 16 and the like, the determination control unit 590 can include a spot color image included in the user content in the patch.

In an aspect, the determination control unit 590 can control the contribution rate of the specific image to the determination result according to the validity of the specific image as a patch. As illustrated in FIG. 16 and the like, for example, the determination control unit 590 can control the contribution rate of the specific image to the determination result according to the ratio or the like of the spot color image included in the user content.

In an aspect, the determination control unit 590 may determine the state of the background portion used by the reader to read the medium based on a reading result obtained by reading a region where no image is formed by the image former in the medium. More specifically, the reader 560 reads a portion, of the medium, where no image is printed or a margin portion of printing during printing, an adjustment mode, a patch reading operation before printing, or the like. Then, the determination control unit 590 can analyze an image of a portion, of the medium, where no image is printed or a margin portion of printing, and can determine whether there is dirt on the background plate 303 to such an extent as to affect image inspection.

(g. Process of Forming Patch on Medium According to Presence or Absence of White Base in Image Formed on Medium)

The control unit 510 controls image formation by the image former 520 based on a read image generated by the reader reading the medium on which the patch is formed. In addition, the control unit 510 causes the image former 520 to form a patch, on the medium, corresponding to the image formed on the medium by the image former 520. As an example, as illustrated in FIG. 24 and the like, in a case where the medium is black paper, the control unit 510 may print a white base on the medium and print a patch on the white base. Furthermore, as another example, as illustrated in FIGS. 13, 34 to 36, and the like, the control unit 510 can change the patch based on the presence or absence of the white base in the image formed on the medium. For example, the control unit 510 can select a patch with a base or a patch without a base, or use these patches while switching between these patches.

In an aspect, in a case where the image formed on the medium by the image former 520 includes a base image, the control unit 510 can cause the image former 520 to form a patch corresponding to the base image on the medium. In a case where the image formed on the medium by the image former 520 includes a covering image (transparent toner or the like), the control unit 510 can cause the image former 520 to form a patch corresponding to the covering image on the medium.

In an aspect, the control unit 510 causes the image former to form, as a patch corresponding to the medium, any one of a patch to which a base image is added, a patch whose design is changed, and a specific image included in user content on the medium. More specifically, as an example, as illustrated in FIGS. 10, 11, and the like, the control unit 510 can cause the image former to form a patch to which a base image is added on the medium. Furthermore, as an example, as illustrated in 13, 15, 26, and the like, the control unit 510 can cause the image former to form a patch whose design is changed on the medium. Furthermore, as an example, as illustrated in FIG. 16 and the like, the control unit 510 can cause the image former to form a specific image included in the user content on the medium.

In an aspect, the image inspection system may acquire information about the medium by the identifier 570 and control image formation by the image former 520 using the information about the medium. As an example, as illustrated in FIG. 10 and the like, in a case where the medium is a combination of a transparent film and colored release paper, the image inspection system can cause the image former to form a density unevenness measurement patch on a white base.

In an aspect, the information about the medium may include at least one piece of information about a type of the medium and information about a characteristic of the medium. The type of the medium may include category information about the medium, a model number of a product of the medium, and the like. The characteristic of the medium may include any characteristic information such as color, presence or absence of reflection, and transparency.

In an aspect, the image inspection system may acquire the information about the type of the medium by the acquisitor 530. As an example, the image forming device 100 can acquire information about the type of medium based on input information (medium selection information) from a user or image information obtained by an image sensor before image formation.

In an aspect, the control unit 510 may cause the image former to form a patch corresponding to the medium based on a result of reading the medium by the reader 560. As an example, as illustrated in FIG. 10 and the like, in a case where the medium is a combination of a transparent film and colored release paper, the image inspection system can cause the image former to form a density unevenness measurement patch on a white base.

In an aspect, the control unit 510 may cause the image former to add a white base to the patch in a case where the reading result by the reader 560 has a characteristic that the relationship between an increase/decrease in the developer and the reading gradation is partially inverted. As an example, as illustrated in FIGS. 21, 22, 23, and the like, in a case where the reading result is a reading result related to a metal vapor deposited film, hologram paper, or a transparent film, there is a possibility that the relationship between an increase/decrease in the developer and the reading gradation is partially reversed. In this case, the control unit 510 can prevent the occurrence of a phenomenon in which the relationship between an increase/decrease in the developer and the reading gradation is partially inverted by adding the white base to the patch.

In an aspect, the control unit 510 causes the image former to add a white base to the patch based on the determination that the reading result is not appropriate for analysis of the patch. As an example, as illustrated in FIG. 27 and the like, in a case where there is a pattern such as a logo on the back face of the release paper, this also affects the reading of the patch. As a result, for example, an error may occur in the measurement of density unevenness and gradation. In addition, as illustrated in FIGS. 20 to 24 and the like, when only the color developing toner is printed on a medium having characteristics such as dark color, transparent, specular reflection, and hologram, the measurement patch may not be correctly read. In such a case, the image forming device 100 can more appropriately read the degree of light and shade of the color developing toner image by adding a white base having a characteristic of covering the surface of the medium.

In an aspect, in a case of forming, on a medium, a patch to which a white base is added, the control unit 510 may perform control different from control when the white base is added to the user content with respect to addition of the white base. As an example, as illustrated in FIG. 33 and the like, in a case where the user content is directly printed on the medium and the patch is printed on the white base, the control unit 510 can perform control different from control when the white base is added to the user content.

In an aspect, in a case where the specific image is repeatedly included in the background including the medium based on the reading result, the control unit 510 can cause the image former to form a patch corresponding to the repetition of the specific image on the medium. For example, as illustrated in FIG. 31, the image forming device 100 can change the rectangular patch size to be N times (any integer a plurality of) the repetition cycle of a specific image such as a logo mark printed on the back face of the medium, and render the patch. Furthermore, for example, in a case where a plurality of rectangular patches having the same size is disposed as illustrated in FIG. 7, the image forming device 100 may set the patch size to be N times the repetition cycle as described above. In this way, the image forming device 100 can equalize the influence of the logo mark in the medium background when reading each patch, and can correctly read the density unevenness and the gradation change in the measurement patch.

In an aspect, the control unit 510 may change the gradation range used to form the patch based on the determination that the medium has the characteristic that the relationship between an increase/decrease in the developer and the reading gradation is partially inverted based on the reading result. For example, when the color developing toner is printed on a glossy medium such as a deposited film as illustrated in FIG. 21, the light and shade of the toner image may change depending on the gradation value (gradation range) of the medium as in a portion 2110 to 2130. As a result, as illustrated in FIG. 32, the reading result of the toner image in the portion 2110 to 2130 changes. Therefore, for example, the image forming device 100 can restrict reading of the first gradation range 3201 and the third gradation range 3203, and can use the restriction for controlling the gradation correction and the like according to each gradation range. The change in the gradation range varies depending on the characteristics of the toner as a developer. Therefore, as illustrated in FIGS. 40, 41, and the like, the image forming device 100 may determine a gradation range in which reading is restricted from the result of the pre-patch reading. Alternatively, the image forming device 100 may store, in a storage, a setting in which the toner type and the gradation range in which reading is restricted are associated in advance.

In an aspect, the control unit 510 may change the design of the patch based on the characteristic of the contour of the patch based on the relationship between the background including the medium and the patch. As an example, as illustrated in FIG. 30 and the like, the change in design may include a change in patch size. In addition, the control unit 510 may change the number of measured patches or the size of the patch based on the degree of difficulty in reading the patch based on the relationship between the background including the medium and the patch.

In an aspect, the image inspection system may further include a first notifier (which may be included in the notifier 580) that makes a notification of correction accuracy of correction using a patch based on the determination result of the degree of reading difficulty. As described above, the patch reading including the process of adding a white base, the process of changing the patch size to an integral multiple of the logo mark, or the process of restricting the patch reading to a specific gradation range has a higher difficulty level than the patch reading on normal plain white paper, and the reliability of correction may be lowered. Therefore, the image forming device 100 may notify the user whether to execute such special processing, that the reliability of correction may decrease, and the like.

In an aspect, the image inspection system may further include a user use history storage (storage unit 540) that stores a patch in association with the user. Furthermore, the control unit 510 may refer to the user use history storage (storage unit 540) when controlling the formation of the patch on the medium by the image former 520. More specifically, the control unit 510 searches the user use history storage based on the ID of the user who has logged in to the image inspection system or the image forming device 100. When the use history of the user is found, the reading control unit 550 can use the setting of the previous patch formation in a case where the characteristic of the medium used in the previous printing process and the characteristic of the medium used in the current printing process are the same. On the other hand, when the use history of the user is not found, the reading control unit 550 uses the setting of the new patch formation.

In an aspect, the image inspection system may further include a second notifier (which may be included in the notifier 580) that makes a notification of patch formation according to the use history of the user. For example, in a case where the characteristic of the medium used in the current printing process and the characteristic of the medium used in the previous printing process are the same, the second notifier may output a notification for confirming the user whether to use the previous setting. On the other hand, when the use history of the user is not found, the second notifier may output a notification for notifying the user that the setting of the new patch formation is used.

In an aspect, the control unit 510 may control the formation of the patch on the medium according to the validity of the specific image as the patch based on using the specific image included in the user content as the patch. As an example, as illustrated in FIG. 16 and the like, the control unit 510 may replace some colors included in the real-time adjustment patch with colors (spot colors) included in the specific image.

As described above, the image inspection system or the image forming device according to the present embodiment can change at least one of the patch print setting, the patch reading setting, the patch quality determination setting, and the image correction setting based on the medium or the image printed on the medium. As a result, the image inspection system or the image forming device according to the present embodiment can perform correction control of the print setting according to various media.

Although embodiments of the present invention have been described and illustrated in detail, the disclosed embodiments are made for purposes of illustration and example only and not limitation. The scope of the present invention should be interpreted by terms of the appended claims, and is intended to include all modifications within the meaning and scope equivalent to the claims. In addition, the disclosed contents described in the exemplary embodiment and the modifications are intended to be implemented alone or in combination as far as it is possible.

What is claimed is:

1. An image inspection system comprising:
a hardware processor that controls image formation by an image former based on a read image generated by reading, by a reader, a medium on which a patch is formed, wherein
in a case where an image formed on a medium by the image former includes a base image, the hardware processor causes the image former to
form, on the medium, the base image; and
form, on the base image, a patch corresponding to an image formed on a medium by the image former,
the hardware processor causes the image former to
form a patch corresponding to the medium based on a result of reading the medium by the reader; and
add a white base to the patch corresponding to the medium based on determination that the reading result is not appropriate for analysis of the patch corresponding to the medium.

2. The image inspection system according to claim 1, wherein
in a case where an image formed on a medium by the image former includes a covering image, the hardware processor causes the image former to form a patch corresponding to the covering image on the medium.

3. The image inspection system according to claim 1, further comprising:
an identifier that acquires information about the medium based on the read image and identifies the medium.

4. The image inspection system according to claim 3, wherein
the information about the medium includes at least one piece of information about a type of the medium and information about a characteristic of the medium.

5. The image inspection system according to claim 1, further comprising:
an acquisitor that acquires information about a type of the medium, wherein
the hardware processor identifies the medium based on a result acquired by the acquisitor.

6. The image inspection system according to claim 1, wherein
the hardware processor causes the image former to add a white base to the patch in a case where the reading result includes a characteristic that a relationship between an increase/decrease in a developer and a reading gradation is partially inverted.

7. The image inspection system according to claim 1, wherein
in a case of forming, on the medium, the patch to which a white base is added, the hardware processor performs control different from control when the white base is added to user content with respect to addition of the white base.

8. The image inspection system according to claim 1, wherein
in a case where a specific image is repeatedly included in a background including the medium based on the reading result, the hardware processor causes the image former to form a patch corresponding to repetition of the specific image on the medium.

9. The image inspection system according to claim 1, wherein
the hardware processor changes a gradation range used for forming the patch based on determination that the medium is a medium having a characteristic that a relationship between an increase/decrease in a developer and a reading gradation is partially inverted based on the reading result.

10. The image inspection system according to claim 1, wherein
the hardware processor changes a design of the patch based on a characteristic of a contour of the patch based on a relationship between a background including the medium and the patch.

11. The image inspection system according to claim 10, wherein
a change in the design includes a change in size of the patch.

12. The image inspection system according to claim 1, wherein
the hardware processor changes the number of measurements of the patch or a size of the patch based on a degree of difficulty in reading the patch based on a relationship between a background including the medium and the patch.

13. The image inspection system according to claim 12, further comprising:
a first notifier that makes a notification of correction accuracy of correction using the patch based on determination result of the degree of reading difficulty.

14. The image inspection system according to claim 1, further comprising:
a user use history storage that stores the patch in association with a user.

15. The image inspection system according to claim 14, wherein
the hardware processor controls formation of the patch on the medium according to a use history of the user.

16. The image inspection system according to claim 14, further comprising:
a second notifier that makes a notification of formation of the patch according to a use history of the user.

17. The image inspection system according to claim 1, wherein
the hardware processor controls, based on using a specific image included in user content as a patch, formation of the patch on the medium according to validity of the specific image as the patch.

* * * * *